US007567203B2

(12) United States Patent
Dizaji et al.

(10) Patent No.: US 7,567,203 B2
(45) Date of Patent: Jul. 28, 2009

(54) CLASSIFICATION SYSTEM FOR RADAR AND SONAR APPLICATIONS

(75) Inventors: Reza M. Dizaji, Waterloo (CA); Hamid Ghadaki, Toronto (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 172 days.

(21) Appl. No.: 11/401,097

(22) Filed: Apr. 10, 2006

(65) Prior Publication Data

US 2007/0024494 A1 Feb. 1, 2007

Related U.S. Application Data

(60) Provisional application No. 60/669,874, filed on Apr. 11, 2005.

(51) Int. Cl.
*G01S 7/41* (2006.01)
*G01S 13/87* (2006.01)

(52) U.S. Cl. .............................. 342/90; 342/37; 342/43

(58) Field of Classification Search ............. 342/36–40, 342/43, 63, 159–164, 195, 90, 192
See application file for complete search history.

(56) References Cited

U.S. PATENT DOCUMENTS

| 4,894,658 | A | * | 1/1990 | Hecht-Nielsen et al. ........ 342/90 |
| 5,263,097 | A | * | 11/1993 | Katz et al. ................... 382/190 |
| 5,302,955 | A | | 4/1994 | Schutte et al. |
| 5,321,406 | A | * | 6/1994 | Bishop et al. ................. 342/32 |
| 5,414,643 | A | * | 5/1995 | Blackman et al. ............. 342/95 |
| 5,497,158 | A | | 3/1996 | Schmid et al. |
| 5,612,928 | A | * | 3/1997 | Haley et al. .................... 367/11 |
| 5,798,942 | A | * | 8/1998 | Danchick et al. .............. 342/96 |
| 5,877,721 | A | | 3/1999 | Tsang et al. |
| 5,909,190 | A | * | 6/1999 | Lo et al. ....................... 342/159 |
| 6,002,358 | A | * | 12/1999 | Tsang .......................... 342/195 |
| 6,218,979 | B1 | | 4/2001 | Barnes et al. |
| 6,222,481 | B1 | | 4/2001 | Abrahamson et al. |

(Continued)

FOREIGN PATENT DOCUMENTS

EP 0901641 3/1999

(Continued)

OTHER PUBLICATIONS

Object Recognition Juan Andrade-Cetto and Michael Villamizar Wiley Encyclopedia of Electrical and Electronics Engineering Article Online Posting Date: Dec. 27, 1999 DOI: 10.1002/047134608X.W5512.*

(Continued)

*Primary Examiner*—Thomas H Tarcza
*Assistant Examiner*—Cassi Galt
(74) *Attorney, Agent, or Firm*—Daly, Crowley, Mofford & Durkee, LLP

(57) ABSTRACT

A system and method for target classification for an aircraft surveillance radar is provided. In one implementation, the track classifier provides tracks with an updated probability value based on its likelihood to conform to aircraft and non-aircraft target behavior. The track classifier identifies false tracks that may arise from weather and biological targets, and can detect aircrafts lacking Secondary Surveillance Radar (SSR) data. Various features and combinations of features are evaluated using a proposed clustering performance index (CPI) and used to discriminate between aircrafts and false tracks.

32 Claims, 30 Drawing Sheets

U.S. PATENT DOCUMENTS

| | | | |
|---|---|---|---|
| 6,573,861 | B1 | 6/2003 | Hommel et al. |
| 6,757,668 | B1 * | 6/2004 | Goebel et al. ............... 706/59 |
| 6,801,155 | B2 | 10/2004 | Jahangir et al. |
| 6,845,325 | B2 * | 1/2005 | Valero et al. ............... 702/14 |
| 6,897,802 | B1 * | 5/2005 | Daniell et al. ............... 342/90 |
| 6,943,724 | B1 * | 9/2005 | Brace et al. ............... 342/25 B |
| 6,977,610 | B2 | 12/2005 | Brookner et al. |
| 2002/0180631 | A1 | 12/2002 | Alon |
| 2005/0140540 | A1 * | 6/2005 | Rees et al. ............... 342/29 |

FOREIGN PATENT DOCUMENTS

| | | |
|---|---|---|
| EP | 0943101 | 9/1999 |
| WO | WO 98/01770 | 1/1998 |
| WO | WO 98/36289 | 8/1998 |

OTHER PUBLICATIONS

Andrew Hauter, Kuo Chu Chang, and Sherman Karp Polarimetric fusion for synthetic aperture radar target classification Pattern Recognition, vol. 30, No. 5 pp. 769-775, 1997.*

Target track classification for airport surveillance radar (ASR) Ghadaki, H.; Dizaji, R.; Radar, 2006 IEEE Conference on Apr. 24-27, 2006 p. 4 pp.*

PCT Search Report and Written Opinion of the ISA for PCT/CA2006/000547 dated Jul. 27, 2006.

Zyweck et al.; "Radar Target Classification of Commercial Aircraft;" IEEE Transactions on Aerospace and Electronic Systems, vol. 32, No. 2; Apr. 1996; pp. 598-606.

* cited by examiner

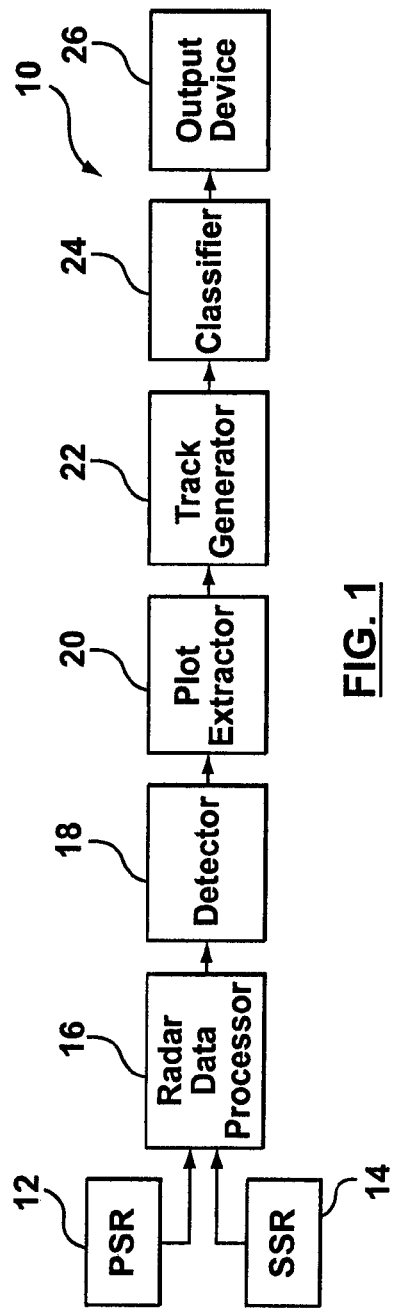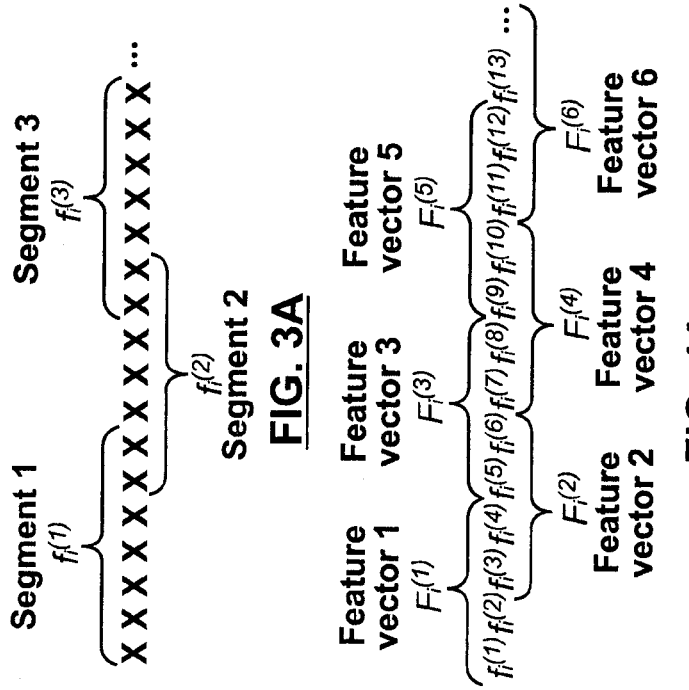

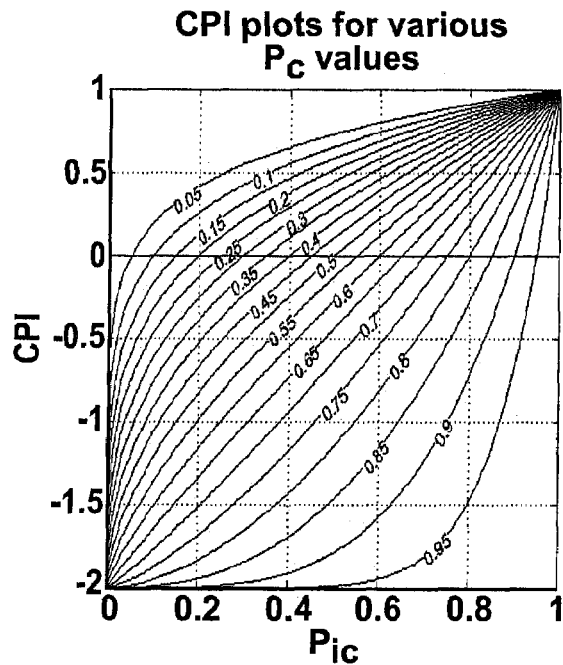 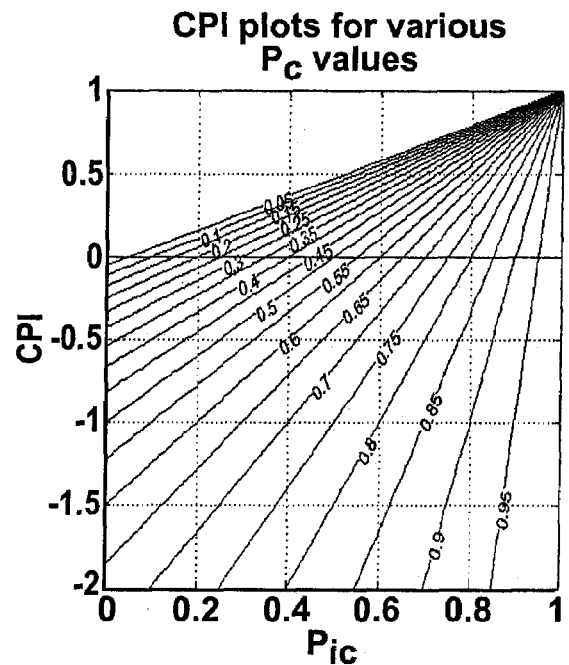
FIG. 5a  FIG. 5b
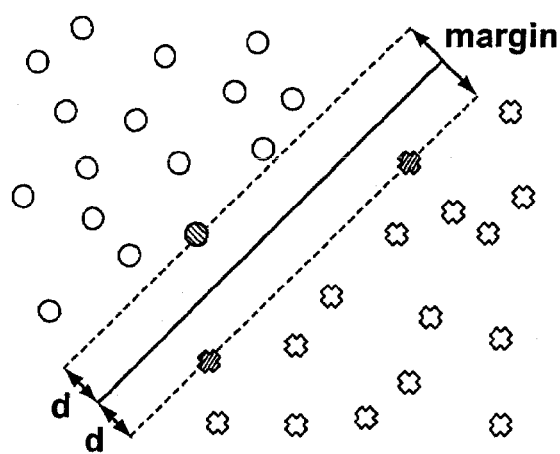
FIG. 6

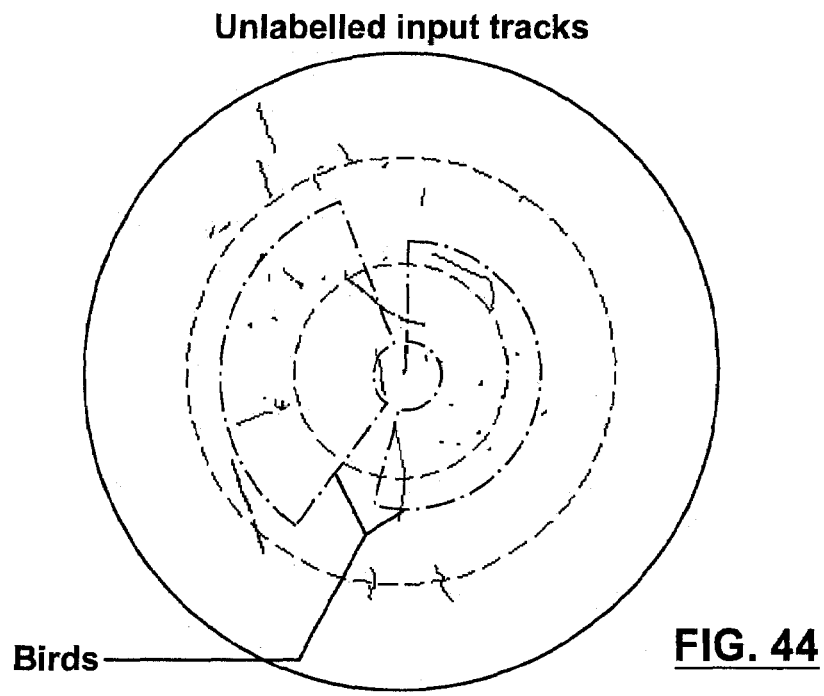
FIG. 44
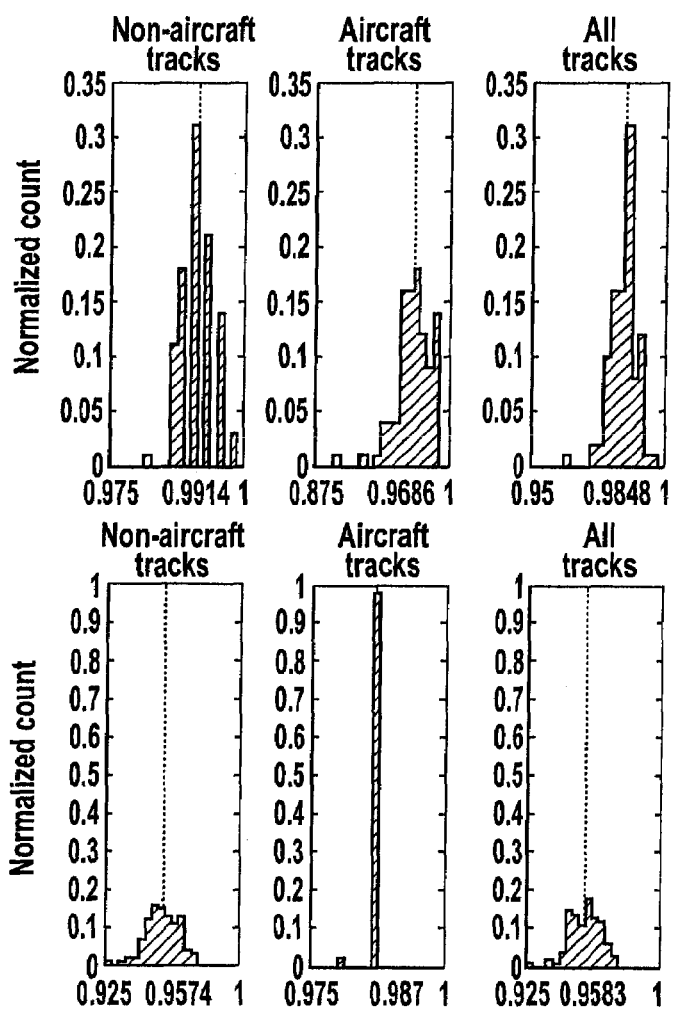
FIG. 45a
FIG. 45b

CLASSIFICATION SYSTEM FOR RADAR AND SONAR APPLICATIONS

CROSS REFERENCE TO RELATED APPLICATIONS

This application claims the benefit under 35 U.S.C. §119 (e) of U.S. Provisional Patent Application No. 60/669,874, entitled "CLASSIFICATION SYSTEM FOR RADAR AND SONAR APPLICATIONS," filed on Apr. 11, 2005

FIELD OF THE INVENTION

The invention relates to a radar or sonar system. More particularly, the invention relates to a classifier for classifying targets detected by the radar and sonar systems.

BACKGROUND OF THE INVENTION

A Digital Airport Surveillance System (DASR) system consists of two electronic subsystems; namely a Primary Surveillance Radar (PSR) and a Secondary Surveillance Radar (SSR). The PSR typically includes a continually rotating antenna mounted on a tower to transmit electromagnetic waves that reflect or backscatter from the surface of a target typically up to a radial distance of 60 nmi. The PSR also provides data on six levels of rainfall intensity. The SSR typically includes a second radar antenna attached to the top of the PSR to transmit and receive area aircraft data for barometric altitude, identification code, and emergency conditions. The air traffic control uses this system to verify the location of an aircraft within a typical radial distance of 120-nmi from the radar site.

In the tracking stage, data received from the PSR and SSR are combined based on the proximity of range and azimuth values of targets detected by the PSR and SSR. To meet the combination criteria which determines whether or not targets are combined, the range and azimuth differences of corresponding targets detected by the two sensors are calculated. If each parameter difference is within certain predefined limits, the targets are combined.

Additional tests on speed and heading are performed to resolve ambiguity in potential PSR/SSR target pairs. This is accomplished by examining speed and heading differences for the ambiguous targets to determine if the ambiguous targets should be combined. SSR data typically takes precedence over PSR data. The SSR range and azimuth values are used in a combined report unless the preferred radar is set to the PSR.

There are several issues with the DASR system. These issues include a requirement to remove erroneous tracks related to weather-related, anomalous propagation (AP) and ground clutters plots. Another requirement is to increase the air traffic security and safety level by identifying small or non-cooperative aircrafts without SSR data either due to the lack of a transponder, or by the accidental or deliberate disablement of the transponder. Another requirement is to identify bird, insects, and other biological tracks to avoid biological hazards to commercial and military aircrafts. Another requirement to increase air traffic safety by identifying tracks from helicopters, Unmanned Aerial Vehicles (UAV), etc.

Identifying biological and weather tracks and detecting aircrafts without SSR data are the most important and demanding challenges in the above items. Relying on the presence of SSR data for aircraft detection can impose serious risks to air traffic security and safety since the SSR system relies solely on transmission from onboard transponders to identify aircraft. Accordingly, only by correctly classifying non-transponder transmitting targets, can the presence of unknown aircraft be reported.

The increase in erroneous tracks due to weather clutter can also severely affect the radar performance in aircraft detection in adverse weather conditions. Tracks and echoes from objects such as buildings and hills may also appear on the radar display. Other examples of ground clutter include vehicles and windmills. This ground clutter generally appears within a radius of 20 nautical miles (nmi) of the radar as a roughly circular region with a random pattern. The AP phenomenon is another source of false tracks. These tracks occur under highly stable atmospheric conditions (typically on calm, clear nights), where the radar beam is refracted almost directly into the ground at some distance from the radar, resulting in an area of intense-looking echoes. Examples include certain sites situated at low elevations on coastlines that regularly detect sea return, a phenomenon similar to ground clutter except that the echoes come from ocean waves.

For biological targets such as birds, the impact is more serious. Echoes from migrating birds regularly appear during night-time hours between late February and late May, and again from August through early November. Return from insects is sometimes apparent during July and August. The apparent intensity and aerial coverage of these features is partly dependent on radio propagation conditions, but they usually appear within 30 nmi of the radar and for weather radar produce reflectivities of less than 30 dBZ.

The existence of birds in the vicinity of airport runways and flight paths present serious hazards to air traffic, particularly during the take-off, climb and landing approach when the loss of one or more engines can jeopardize flight safety. Birds are a worldwide problem in aviation. The danger and costs involved in biological strikes to aircrafts are enormous. Approximately 3000 wildlife strike incidents occur yearly to military aircraft and over 2200 wildlife strikes on civilian aircrafts in the US alone. Notably, the bird problem received greater emphasis in the US following the crash of an Airborne Warning and Control System (AWACS) aircraft in November 1995.

The images of bird echoes can completely fill all radar bins. Bird tracks, especially in coastal environments, can form a substantial proportion of the track population of a radar picture. The number of birds close to coastal roost sites can range from 10,000 to 1,000,000 birds, with similar densities possible within well-vegetated non-coastal areas. At peak migration periods, the number of airborne birds can reach 1,000,000 within a 50 km radius with many of these birds travelling in flocks.

Current airport surveillance radars, such as the ASR-9, intentionally reject bird tracks as unwanted clutter. Having known that birds typically fly much slower than aircrafts, changing the "velocity editor" is one method of eliminating bird tracks. However, it has been shown that this technique also removes primary targets with airspeeds below the set threshold, including helicopters and small non-transponder aircrafts. For this reason, a robust classifier with the ability to correctly identify different classes of targets is needed.

SUMMARY OF THE INVENTION

The system and method described herein is directed toward a classifier for classifying targets detected by radar and sonar systems. An exemplary embodiment of a classification system is given for Digital Airport Surveillance Radar for discriminating between aircrafts and non-aircrafts targets. This classification may be generalized to an m-class classification system in which sub-classes may be defined for each of the main aircraft and non-aircraft classes.

In one aspect, at least one embodiment of the invention provides a classifier for classifying a given radar track segment obtained from a radar system. The radar system has a primary surveillance radar for providing primary radar data and a secondary surveillance radar for providing secondary radar data. The classifier comprises a pre-processing stage, the preprocessing stage forms the given radar track segment and generates principal data based on the primary radar data or a combination of secondary and primary radar data, and extension data based on the primary radar data; a feature extraction stage connected to the pre-processing stage, the feature extraction stage processes at least one of the primary and secondary radar data associated with the given radar track segment to provide a plurality of feature values; a classification stage connected to the feature extraction stage, the classification stage generates a principal classification result and an extension classification result for the given radar track segment based on at least a portion of the feature values; or the classification stage generates a combined classification result for combined principal and extension feature values; and, a combiner stage connected to the classification stage, the combiner stage combines the extension and principal classification results to provide a classification result for the given radar track segment when the classification stage provides the principal and extension classification results.

In another aspect, at least one embodiment of the invention provides a method for classifying a given radar track segment obtained from a radar system. The radar system has a primary surveillance radar for providing primary radar data and a secondary surveillance radar for providing secondary radar data. The method comprises:

a) forming the given radar track segment and generating principal data based on the primary and secondary radar data, and extension data based on the primary radar data;

b) processing at least one of the primary and secondary radar data associated with the given radar track segment and a portion of a previous associated radar track segment to provide a plurality of feature values;

c) generating either a principal classification result and an extension classification result or a combined classification result for combined principal and extension feature values for the given radar track segment based on at least a portion of the feature values; and, d) combining the extension and principal classification results to provide a classification result for the given radar track segment when the principal and extension classification results are generated.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee. For a better understanding of the invention and to show more clearly how it may be carried into effect, reference will now be made, by way of example only, to the accompanying drawings which show at least one exemplary embodiment of the invention and in which:

FIG. 1 is a block diagram of an exemplary embodiment of a radar system;

FIGS. 3a and 3b show two examples of different types of track segmentation that may be preformed by a pre-processing stage of the track classifier of FIG. 2;

FIGS. 4a and 4b show two examples of different types of feature value segmentation that may be preformed by a feature processing stages of the track classifier of FIG. 2;

FIGS. 5a and 5b show several CPI plots based on exponential and linear models respectively;

FIG. 6 shows a maximal separating hyperplane (solid line) used in a Support Vector Machine showing a distance (d) to each class and margin with the support vectors shaded for linearly separable data;

FIG. 44 shows PSR-solo tracks for dataset four;

FIGS. 45a, 45b, and 45c show normalized histograms of correct recognition rates for data configuration 1, data configuration 2, data configuration 3, and data configuration 4 respectively;

DETAILED DESCRIPTION OF THE INVENTION

Figure 7:
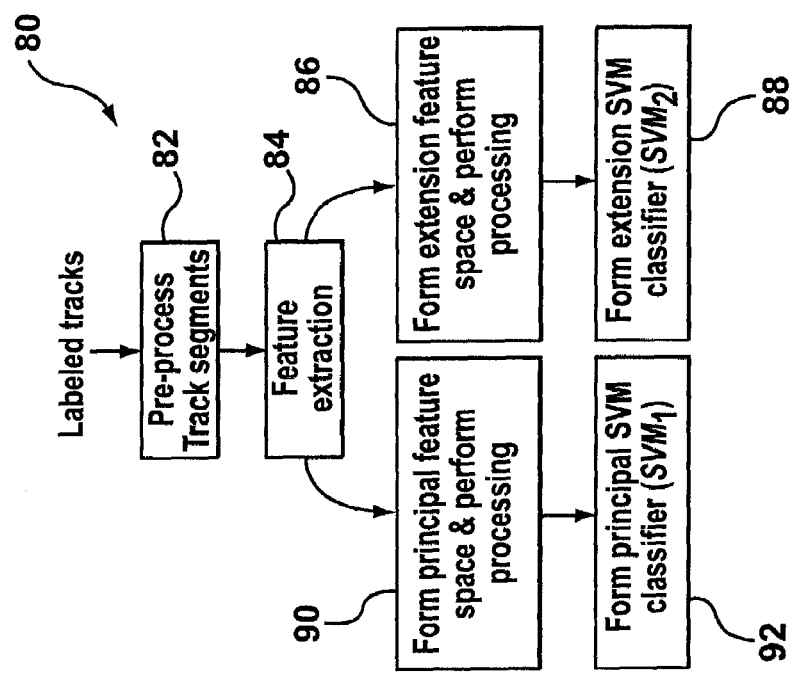
FIG. 7 shows a flow diagram of a training process that may be used for training the classifier of FIG. 2.

It will be appreciated that numerous specific details are set forth in order to provide a thorough understanding of the invention. However, it will be understood by those of ordinary skill in the art that the invention may be practiced without these specific details. In other instances, well-known methods, procedures and components have not been described in detail so as not to obscure the invention.

One aspect of the invention provides for a real time automatic system for target classification using Support Vector Machines (SVM). Support Vector Machines find decision planes that define decision boundaries. A decision boundary is between a set of objects having different class memberships. Support Vector Machines are one example of learning techniques that can be used in the invention to perform classification of tasks by non-linearly mapping the n-dimensional input space into a high dimensional feature space. In this high dimensional feature space a linear classifier may be used. The feature set that is used affects the success of the classifier. The invention provides different feature sets that can be used for target classification in a DASR and a method to combine the features to generate a clustering performance index (CPI) that is used to evaluate feature combinations. In general, the classifier can work with trajectory and speed related features, i.e. the classifier can be applied to any track data that includes the position and speed of targets. The proposed classification technique of the invention has been implemented on a typical desktop PC and has the ability of doing real time classification of unlabeled input data.

Referring now to FIG. 1, shown therein is a block diagram of an exemplary embodiment of a radar system 10. The radar system 10 includes hardware associated with a PSR 12, and hardware that is associated with an SSR 14 which are both connected to a radar data processor 16. A detector 18, a plot extractor 20, a track generator 22, a classifier 24 and an output device 26 are connected downstream of the radar data processor 16 as shown. There may be some variations in this configuration. For instance, the classifier 24 may be additionally, or optionally, connected to at least one of the detector 18 and the plot extractor 20 to classify detected targets. This allows target classification to be done at various stages of target tracking; including during or after detection, plot extraction or track formation. It should be understood that transmission components (not shown) are also part of the radar system 10 as is commonly known to those skilled in the art.

The radar data processor 16 performs data processing on the data provided by the PSR 12 and the SSR 14 to provide radar data which typically is some combination of range, azimuth and Doppler data. The data processing includes conventional signal processing operations such as filtering to filter extraneous unwanted signals in the radar data and heterodyning to demodulate the filtered data from the RF band to an IF band where analog to digital conversion occurs. The radar data is then demodulated to the baseband where lowpass filtering and downsampling occurs. The pre-processed radar is complex (i.e. has real and imaginary components) and each of the signal processing components required to perform the above-mentioned operations are implemented to handle complex data. The pre-processed data may also be subjected to matched filtering. Alternatively, some spectral estimation may be employed by the radar data processor 16 so that radar signatures from clutter, or other interference, will not obscure radar signatures from targets. All of these techniques are known to those skilled in the art.

The detector 18 then locates candidate targets from noise and clutter from the range, doppler and beam information that is generated from the pre-processed radar data. The range information is used to provide an estimate of the target's distance from the receiving radar antenna. The beam information is used to provide an estimate of the angle of the target's location, and the doppler information is used to provide an estimate of the target's radial instantaneous velocity by measuring the target's doppler shift. The target's doppler shift is related to the change in frequency content of the EM pulse that is reflected by the target with respect to the original frequency content of that EM pulse.

The plot extractor 20 receives and combines the candidate targets to form plots through a process known as plot extraction. The plot extractor 20 filters the candidate targets to reject all of those candidate targets that do not conform to the range, doppler and beam properties that are expected for a true target. Detection and plot extraction rely on information from a single scan of the radar.

The track generator 22 receives the plots and generates tracks by accounting for the temporal information of a sequence of radar scans. More specifically, the track generator analyzes a sequence of radar scans and associates successive detections of a candidate target to form a track for the candidate target. Accordingly, the track generator 22 determines the movement of the candidate targets through a given surveillance area.

The classifier 24 receives the tracks generated by the track generator 22 and analyzes the tracks by measuring values for certain features of the tracks in order to classify the tracks as belonging to an aircraft, a school of birds, ground and weather clutter or other environmental interference. Another classifier may be trained to particular aircraft or non-aircraft targets and applied to the output of the classifier 24 to extract particular targets from aircraft or non-aircraft outputs. For instance, the non-aircraft class can be expanded to include birds, windmills, AP, etc. The aircraft class can be expanded to include helicopters, UAV, light aircrafts, etc. Alternatively, the classifier 24 may be trained to identify each of these sub-classes of the aircraft and non-aircraft classes. Target classification can be performed at a single stage, or alternatively data from multiple stages can be combined to produce a multi-source classifier. For instance, the classifier 24 may be used to simplify the output of the track generator 22 by examining plot data and candidate track data to perform pruning to remove datasets that are not of interest. An exemplary implementation of single-source target classification is described in more detail below.

One aspect of the invention is the provision of different types of feature extraction in order to obtain a diverse set of features that emphasize distinctiveness of the tracks. This is accomplished by extracting a set of features from the reported radar tracks taking advantage of the available temporal information inherit in tracks, and performing classification on extracted features using a supervised learning technique, for example. One example of such a supervised learning technique is a Support Vector Machine (SVM) which is described in further detail below. However, other types of supervised learning techniques can be used as well as other types of classifiers such as nearest neighbor, kernel-based discriminant analysis (LDA), kernel-based principal component analysis (PCA), etc.

The output device 26 receives the classified tracks from the classifier 24 and uses the information provided by the classifier 24 to discriminate aircraft tracks from initiated non-aircraft tracks to avoid displaying unwanted tracks, and/or to detect probable aircraft not transmitting SSR data. The output device 26 may be a computer monitor, a printer or some other suitable device as is well known to those skilled in the art.

Figure 2:
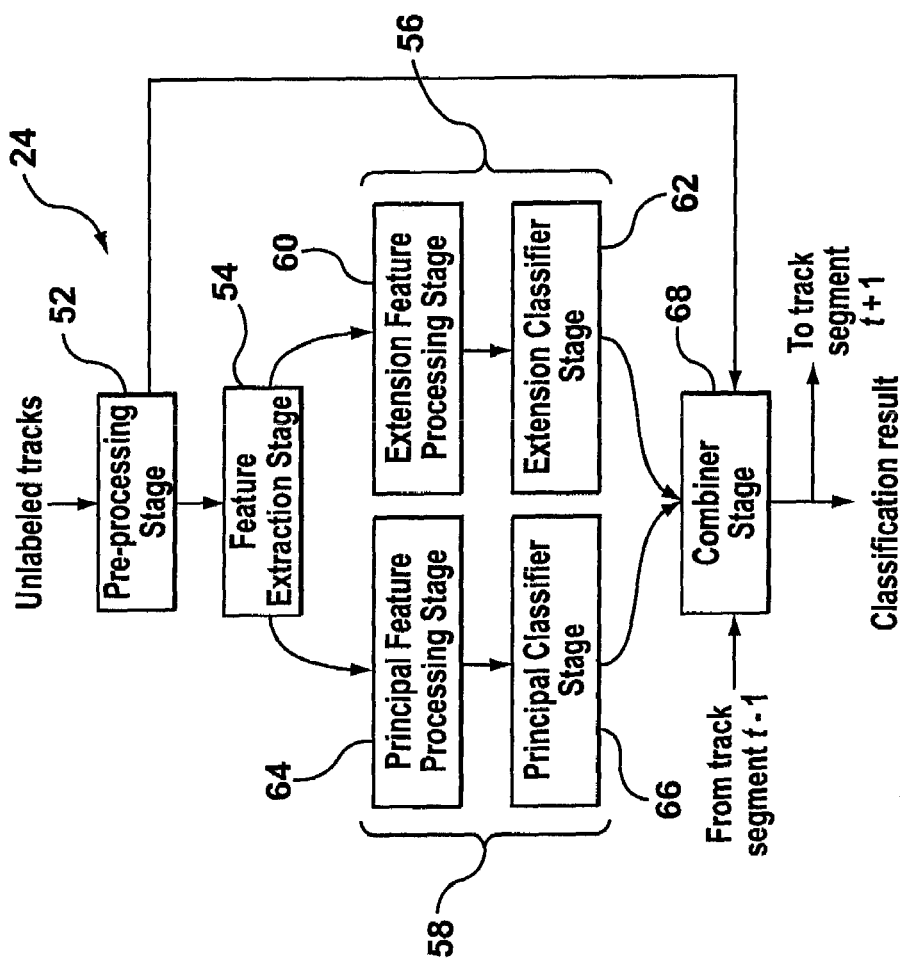
FIG. 2 is a block diagram of an exemplary embodiment of a trained track classifier, in accordance with the invention, that is used in the radar system of FIG. 1.

Referring now to FIG. 2, shown therein is a block diagram of an exemplary embodiment of the classifier 24 in accordance with the invention. The classifier 24 includes a pre-processing stage 52, a feature extraction stage 54, an extension feature classifier path 56 and a principal feature extension path 58. The extension feature classifier path 56 includes an extension feature processing stage 60, and an extension classifier stage 62. The principal feature classifier path 58 includes a principal feature processing stage 64 and a principal classifier stage 66. The classifier 24 also includes a combiner stage 68 that combines the results of the extension feature classifier path 56 and the principal feature extension path 58.

In practice, tracks that contain data only from the PSR 12 are classified since the presence of SSR data indicates that the track belongs to an aircraft. Thus, all tracks that need to be classified have corresponding principal and extension data. As such, in one implementation, the two paths 56 and 58 may be combined into a single classification stage that operates on the output of the feature extraction stage 54 which is higher dimensional input data (i.e. the sum of the dimensions of the principal and extension input features). However, if a more detailed classification of an aircraft track is required, because one desires to know the type of aircraft that is associated with a given track, then the SSR data can be further classified and processed.

The pre-processing stage 52 receives raw radar track data generated by the track generator 22 and separates the raw radar track data into two types of data for an ASR; namely principal track data, and extension track data. Principal track data contains data obtained from at least one of the PSR 12 and the SSR 14, whereas extension track data contains data only from the PSR 12. Thus, only targets (aircraft and non-aircraft) detected by the PSR 12 can possess extension data. These targets will also have principal data components along with those aircrafts with track data obtained from the SSR 14 (i.e. not detected by the PSR 12). In other words, raw track data obtained from data provided by the PSR 12 can be used to provide principal track data and extension track data and may be an aircraft or non-aircraft target. Raw track data obtained from the SSR 14 may be used to provide principal track data only and may be an aircraft only. Accordingly, two separate classification stages or pathways 56 and 58 and the combiner stage 68 are preferably used in one implementation of the invention in order to utilize the breadth of data that is available especially when one desires to know the type of aircraft associated with a track that has been classified as being an aircraft.

The radar data processor 16 combines the SSR and PSR data to provide better accuracy for the principal data if both are available for a given track. However, this may not be guaranteed for the entire radar track since for some parts of the radar track there may not be any SSR data or even PSR data in some cases. However, many missed sequential detections will result in the radar track being split into two. In any event, the classifier 24 accepts the principal data without considering whether the data is PSR, SSR or combined PSR-SSR data.

The classification of unlabelled tracks is achieved segment-wise and in chronological order for a given track. Further classification results for a previous segment of a given track are used in the classification of the current segment of the given track. Accordingly, for a given track segment t, features are extracted and the principal and extension classifier stages 66 and 62 provide data that can be combined together with the classification result from the previous track segment t−1 at the combiner stage 68 to provide a classification result. The classification result for the current track segment t is then used in the classification of the next track segment t+1. Accordingly, the pre-processing stage 52 segments the raw track data for principal and extension radar data to provide a plurality of track segments for a given radar track.

The presence of SSR data for a given track segment t categorizes the target that is associated with this track as being an aircraft, thus eliminating the need to perform further classification during operation unless one wishes to know the type of aircraft associated with the track. However, in general, the SSR data is used to train the classifier 24 for aircraft targets. Accordingly, the pre-processing stage 52 may be connected directly to the combiner stage 68 as shown in the exemplary embodiment of FIG. 2.

In operation, feature extraction is preformed on the current track segment t by the feature extraction stage 54. Feature extraction includes calculating values for features as described in more detail below. The feature processing stages 60 and 64 then create extension and principal feature vectors based on the feature extraction values and process the extension and principal feature vectors. In one implementation, a whitening transformation may be applied to the principal and extension feature vectors based on predetermined parameters. Classification is then performed by the extension and principal classifier stages 62 and 66 respectively. In one implementation, classification is preferably performed by trained SVMs. The classification results for the current track segment t can be then aggregated and combined with the classification results from the previous track segment t−1, if it exists, in the combiner stage 68.

The pre-processor stage 52 segments the raw track data for further processing by the downstream stages of the classifier 24. Since, in this exemplary implementation, the classifier 24 processes tracks chronologically, the radar scan count may be used to chronologically order and timestamp plots. This later allows for variations in plot data to be calculated and used as features for classification. This introduces an issue not previously encountered in plot classification which is variable length data. To address the issue with variable length data, statistical means and variances may be used in various stages of the classifier 24 to capture information pertaining to fixed-length, possibly overlapping segments of a track, with classification being performed segment-wise and combined. In one implementation, combination may be based on a weighted majority-voting scheme.

Referring now to FIGS. 3a and 3b, shown therein are two examples of different types of track segmentation that may be preformed by the pre-processing stage 52. Each segment has been derived from n plots or radar scans with each subsequent segment overlapping the previous segment by $k_{ov}$ plots. FIG. 3a shows a sample segment configuration with n=7 and $k_{ov}$=2. When $k_{ov}$=1, each segment begins with the last plot of the previous segment as illustrated in FIG. 3b with n=5.

To determine the characteristics of the features that should be used in the classifier to improve performance, the characteristics of elements that should be tracked as well as those that should not be tracked can be considered. Biological strikes are responsible for a number of air disasters and account for between 100-500 million dollars of annual damage in the US alone. Among biological strikes, 97% of strikes are due to birds and less than 3% are attributed to sources such as insects. The vast majority of birds fly below 6500 feet in altitude, however there are many examples of flocks of swan and geese that have been observed at altitudes of up to 30,000 feet, with the highest recorded bird altitude at 37,000 feet. These facts would support the occurrence of 96% of biological strikes at altitudes below 5000 ft. The major areas for bird strikes to civilian aircraft are in the vicinity of airport takeoff, climb, landing approach, and landing roll zones.

The kinematics characteristics of birds are often similar to those of some aircrafts. However, there are some distinctive features, such as greater variation in bird track directions with wind, suggesting partial drift or pseudo-drift of bird tracks in comparison to aircraft tracks. This is more evident for migrant birds as they follow a zigzag course of thermal drift in response to atmospheric conditions and subsequently glide to compensate for drift and to conserve energy. Another distinctive feature is related to bird flight speed that varies to a maximum of 43 m/s depending upon the size and shape of the bird, its activity such as migration, and the effects of wind. This maximum speed is less than the airspeed of a typical aircraft.

The aircraft beacon in ASR may be used along with radar data to discriminate between birds and aircraft targets. However, this is inapplicable when the aircraft lacks a transponder or it has accidentally or intentionally been turned off.

Researchers working on the Next Generation Weather Radar (NEXRAD) have identified features specific to bird data and other features specific to weather data. These features may be used to correctly identify and eliminate false tracks originating from severe weather conditions as well as bird tracks, while maintaining aircraft tracks.

For weather data, NEXRAD reports the presence of weather, only when there exists echoes aloft as well as in scans at the lowest elevation. For bird data, many features have been explored and it has been shown that biological targets do not conform to the model of water droplets. The returned power reduction for water droplets is approximately $r^{-2}$ with range, whereas birds conform to individual point targets with a power loss factor of $r^{-4}$. However, this does not extend well for flocks of birds which can mimic a volume scatter when they are clustered in large concentration near a roosting site. In addition, it is observed that the size of bird tracks may increase significantly by time, but the center of divergence remains the same. Bird echoes often exhibit an asymmetric reflectivity distribution, however strong environmental winds or strong updrafts or downdrafts would tend to skew the reflectivity distribution. The co-location of the maximum reflectivity and velocity is indicative of bird tracks. Another feature that may be used to distinguish birds from weather is the existence of maximum reflectivity within the first few range gates of the signature. Generally speaking, the reflectivity and velocity images of bird echoes do not completely fill all of the radar bins (they exhibits a graininess) while weather generates an echo region which is more widespread than birds.

Other features that may be useful include the degree of stipple in reflectivity, velocity, and spectral width of bird and weather data. The stipple is a measure of variability based on differentiating the expected slope from the actual slope between minimum and maximum values along a patch of an echo. It has been observed that the stipple degree is generally greater in biological targets than in weather for non-migrating birds. This is due to the fact that the velocity returns from weather typically exhibit more variability, while the velocity distribution from a bird echo is composed of similar values based on the flight speed for migratory birds.

The weather data recorded by a DASR may also be discriminated from aircraft and bird data based on differences in signal amplitude between the high and low elevation beams. The typical DASR's 3.5 degree offset between broad-elevation fan beams can provide a sufficient degree of altitude resolution to allow discrimination of aircraft and low-altitude biological targets from more vertically distributed targets such as weather. This fact has not been experimentally explored since simultaneous parallel access to both beams has not yet become operational. It is also possible to identify airplane and bird targets obscured by weather returns by switching from linear to circular polarization The PSR 12 has two beams: a high beam and a low beam. Relative amplitude information from the two beams may be used as a good feature to discriminate between targets of interest. For example, ground clutter typically appears on the low beam and aircrafts typically appear in the high beam. However, birds also appear in the high beam and weather-based clutter appears in both the high and low beams. Accordingly, the existence of targets in either the high or low beam or both and their relative amplitudes can be used as good features for classification.

In one implementation, the feature extraction stage 54 processes each track segment to extract values for features based on statistical moments of the first and second order. The sample mean calculation is used to obtain an estimate of the first order moment of a data series x as shown in equation 1.

$$\bar{x} = \frac{1}{n}\sum_{i=1}^{n} x_i \qquad (1)$$

The unbiased variance estimate may be used to obtain the second order moment of the data series x as shown in equation 2.

$$\sigma^2 = \frac{1}{n-1}\sum_{i=1}^{n}(x_i - \bar{x})^2 \qquad (2)$$

Table 1 provides an exemplary listing of a set of features that may be used by the classifier 24 for a given track segment t. There are three types of features represented in Table 1. Features $f_1$ to $f_{11}$ represent first and second order statistics of processed principal data, features $f_{12}$ to $f_{14}$ represent statistics of raw principal data and features $f_{15}$ to $f_{18}$ represent statistics from raw extension data. It should be noted that extension data must be available for all plots within a track segment in order to calculate features $f_{15}$ to $f_{18}$. Thus, segments that contain plots only detected by the SSR will not have associated extension features. In each of the equations that are used to determine values for features $f_1$ to $f_{18}$, n is the length of the current track segment t, where data is obtained from n plots, and the indices i, j and k are used to step through the data obtained from the n plots.

TABLE 1

Exemplary Features Used In the Feature Extraction Stage

| Feature | Name | Description |
|---|---|---|
| $f_1$ | var_path | Variance in the displacement of path from a polynomial least-squares best-fit line |
| $f_2$ | var_delpth | Variance in the first difference of the displacement of path from a polynomial least-squares best-fit line |
| $f_3$ | var_delsl | Variance in the first difference of slope |
| $f_4$ | avg_path | Mean of the displacement of path from a polynomial least-squares best-fit line |
| $f_5$ | avg_delpth | Mean of the first difference of the displacement of path from a polynomial least-squares best-fit line |
| $f_6$ | avg_delsl | Mean of the first difference of slope |
| $f_7$ | var_del2spd | Variance in the second difference of speed (jerk) |
| $f_8$ | var_delspd | Variance in the first difference of speed (acceleration) |
| $f_9$ | sum_dist | Total of the distance covered by segment |
| $f_{10}$ | avg_del2spd | Mean of the second difference of speed (jerk) |
| $f_{11}$ | avg_delspd | Mean of the first difference of speed (acceleration) |
| $f_{12}$ | avg_spd | Mean of speed |
| $f_{13}$ | avg_scan | Average number of scans between successive plots |
| $f_{14}$ | avg_rng | Mean of range |
| $f_{15}$ | avg_ma | Mean of the mean amplitude of the plot |
| $f_{16}$ | avg_pa | Mean of the peak amplitude of the plot |
| $f_{17}$ | avg_pa-ma | Mean of the difference in peak and mean amplitudes of the plot |
| $f_{18}$ | avg_dts | Mean of the total number of detection in the plot |

The exemplary features obtained from the raw radar track segments can be categorized into one of the following three types: 1) Flight path trajectory related features, 2) Radar cross section related features and 3) Velocity related features.

Flight path trajectory related features are derived from the principal data consisting of the reported range, azimuth and heading for each plot of a track segment. A number of these features rely on a transformation to translate and reorient each segment to a common reference frame such that a comparison of the trajectory related features can be made. Such features are formulated to account for the jitter in flight pattern, the variation from a least-squares fitting polynomial, the axial movement of the target about its path of trajectory, and the point-wise distance traversed by the target. Specifically, these features are captured in the following set of exemplary features $\{f_1, f_2, f_3, f_4, f_5, f_6, f_9, f_{13}, f_{14}\}$ from Table 1.

The path related features, var_path ($f_1$), var_delpth ($f_2$), avg_path ($f_4$), and avg_delpth ($f_5$), are calculated after performing a transformation to eliminate the orientation of the current track segment t. This is accomplished by fitting a first order polynomial to the current track segment t under consideration, and performing a translation and rotation on the current track segment t such that the linear fit is horizontal and commences at the origin. Next, a $p^{th}$ order polynomial (g) is fitted to the transformed data points ($x_i$, $y_i$), to minimize the least-square error. The vertical displacement of each point from this best-fit curve is determined as follows:

$$\Delta y_i = \left[\frac{s_n - s_1 + 1}{\sum_{j=1}^{n-1}\sqrt{(x_{j+1} - x_j)^2 + (y_{j+1} - y_j)^2}}\right](y_i - g(y_i)) \qquad (3)$$

where $s_i$ represents the scan number for the $i^{th}$ detection or $i^{th}$ plot. The term in the square brackets represents a normalization factor to take into account the scale of the detections. The variance of this displacement is used as the var_path feature as shown in equation 4

$$f_1 = \frac{1}{n-1} \sum_{i=1}^{n} \left[ \Delta y_i - \frac{1}{n} \sum_{j=1}^{n} \Delta y_j \right]^2 \qquad (4)$$

whereas the mean of this displacement is used as the avg_path feature as shown in equation 5.

$$f_4 = \frac{1}{n} \sum_{i=1}^{n} \Delta y_i \qquad (5)$$

With regards to features $f_2$ and $f_5$, the variance of the first difference:

$$\Delta Y_i = \Delta y_{i+1} - \Delta y_i \qquad (6)$$

is used as the var_delpth feature as shown in equation 7, $$f_2 = \frac{1}{n-2} \sum_{i=1}^{n-1} \left[ \Delta Y_i - \frac{1}{n-1} \sum_{j=1}^{n-1} \Delta Y_j \right]^2 \qquad (7)$$

and the mean used as the avg_delpth feature as shown in equation 8.

$$f_5 = \frac{1}{n-1} \sum_{i=1}^{n-1} \Delta Y_i \qquad (8)$$

The var_delsl feature $f_3$ is obtained according to equation 9:

$$f_3 = \frac{1}{n-2} \sum_{i=1}^{n-1} \left[ \Delta sl_i - \frac{1}{n-1} \sum_{j=1}^{n-1} \Delta sl_j \right]^2 \qquad (9)$$

where $$\Delta sl_i = sl_{i+1} - sl_i \qquad (10)$$

Specifically, $sl_i$ is obtained from the transformed data using the average slope, which is calculated as shown in equation 11.

$$sl_i = \tan^{-1}\left(\frac{y_{i+1} - y_i}{x_{i+1} - x_i}\right) \qquad (11)$$

Similarly, the avg_delsl feature $f_6$ is obtained as shown in equation 12.

$$f_6 = \frac{1}{n-1} \sum_{j=1}^{n-1} \Delta sl_j \qquad (12)$$

The average range (avg_mg), feature is derived from the range, r, reported by the radar as shown in equation 13:

$$f_{14} = \frac{1}{n} \sum_{i=1}^{n} r_i \qquad (13)$$

The sum_dist feature represents the total distance covered by the target as determined by the location of the points in the track segment as shown in equation 14.

$$f_9 = \sum_{i=1}^{n-1} \sqrt{(x_{i+1} - x_i)^2 + (y_{i+k} - y_i)^2} \qquad (14)$$

The avg_scan feature represents the average number of radar scans required to record a single plot for the track segment in question. The number of radar scans ($\Delta s_i$) is determined as the number of scans elapsed since the previous detection was recorded as shown in equation 15:

$$\Delta s_i = s_{i+1} - s_i \qquad (15)$$

where $s_i$ represents the scan number for the current detection and the index i is used to step through the number of detections. The average simplifies as shown in equation 16.

$$\begin{aligned} f_{13} &= \frac{1}{n-1} \sum_{i=1}^{n-1} (\Delta s_i) \\ &= \frac{1}{n-1} \sum_{i=1}^{n-1} (s_{i+1} - s_i) \\ &= \frac{1}{n-1} \left[ \sum_{i=2}^{n} s_i - \sum_{i=1}^{n-1} s_i \right] \\ &= \frac{s_n - s_1}{n-1} \end{aligned} \qquad (16)$$

The radar cross-section related features are derived from the first and second order statistical moments of the extension data and may include normalization factors. These features are obtained from the mean (ma) and peak (pa) radar returns, each normalized with the squared range of the target, and the number of detection points (dts) which can be related to the size of target but more generally to the number of detections passing a predefined threshold, such as a CFAR threshold for example, that are combined to form each resultant plot. Specifically, these features include $\{f_{15}, f_{16}, f_{17}, f_{18}\}$ as detailed below.

The mean of the mean amplitude (avg_ma) may be defined according to equation 17.

$$f_{15} = \frac{1}{n}\sum_{i=1}^{n} ma_i r_i^2 \quad (17)$$

The mean of the peak amplitude (avg_pa) may be defined according to equation 18.

$$f_{16} = \frac{1}{n}\sum_{i=1}^{n} pa_i r_i^2 \quad (18)$$

The mean difference of peak and mean amplitudes (avg_pa-ma) may be defined according to equation 19.

$$f_{17} = \frac{1}{n}\sum_{i=1}^{n} (pa_i - ma_i) r_i^2 \quad (19)$$

The average number of detection points (avg_dts) may be defined according to equation 20.

$$f_{18} = \frac{1}{n}\sum_{i=1}^{n} dts_i \quad (20)$$

As shown, the avg_ma, avg_pa and avg_pa-ma terms include range-based normalization factors to take into account the power loss that occurs with range as was previously described.

In this exemplary implementation of the classifier 24, some of the features are velocity related, and are derived from the first and second order statistical moments of principal data related to the speed, acceleration and jerk of the target. More specifically, average acceleration and jerk values are derived from the temporal differences in the velocity returns of the target. The var_delspd ($f_3$) feature represents the variance in the second difference in speed which is equivalent to the non-normalized average jerk ($j_i$) among data points of a track segment. The radar reports the speed ($v_i$) at each point along the track segment, from which the non-normalized average acceleration can be determined according to equation 21.

$$a_i = v_{i+1} - v_i \quad (21)$$

The non-normalized average jerk is the change in acceleration and is calculated as follows $$\begin{aligned} j_i &= a_{i+1} - a_i \\ &= (v_{i+2} - v_{i+1}) - (v_{i+1} - v_i) \\ &= v_{i+2} - 2v_{i+1} + v_i \end{aligned} \quad (22)$$

resulting in the var_del2spd feature as shown in equation 23

$$f_7 = \frac{1}{n-3}\sum_{i=1}^{n-2}\left[ j_i - \frac{1}{n-2}\sum_{k=1}^{n-2} j_k \right]^2 \quad (23)$$

and the var_delspd feature as shown in equation 24

$$f_8 = \frac{1}{n-2}\sum_{i=1}^{n-1}\left[ a_i - \frac{1}{n-1}\sum_{k=1}^{n-1} a_k \right]^2 \quad (24)$$

Similar to the variance features, the avg_del2spd feature is calculated as shown in equation 25

$$f_{10} = \frac{1}{n-2}\sum_{i=1}^{n-2} j_i \quad (25)$$

and the avg_delspd feature as shown in equation 26.

$$f_{11} = \frac{1}{n-1}\sum_{i=1}^{n-1} a_i \quad (26)$$

The avg_spd is calculated as shown in equation 27.

$$f_{12} = \frac{1}{n}\sum_{i=1}^{n} v_i \quad (27)$$

Features $f_1$ to $f_{18}$ are provided as examples of features that may be used by the classifier 24. In addition to the formulations presented, variants of each feature may also be used. For example non-linear functions, such as the logarithm or exponential functions, can be applied to increase class separability. Furthermore, various combinations of these features may provide better classification performance as described in more detail below. During the design of the classifier 24, a subset of the features $f_1$ to $f_{18}$ may be selected and during operation, the feature extraction stage 54 calculates values for the selected features.

Both of the extension and principal feature processing stages 60 and 64 generate a feature vector. For a given feature, indexed by i, a multidimensional feature vector, $F_i$, can be constructed from the feature values, $f_i$, of related track segments, indexed by j, extracted from a single track. As such, each feature vector consists of m elements of the same feature taken from j consecutive segments of a track, i.e.

$$F_i^{(k)} = \{f_i^{(j)}, f_i^{(j+1)}, \ldots, f_i^{(j+m-1)}\}^T \quad (28)$$

with the subsequent feature vector overlapping the previous one by $l_{ov}$ feature values, resulting in $$F_i^{(k+1)} = \{f_i^{(j+m-l)}, f_i^{(j+m+1-l)}, \ldots, f_i^{(j+2m-1-l)}\}^T \quad (29)$$

FIG. 4A illustrates a feature vector configuration consisting of m=4 elements, and $l_{ov}$=2 overlapping features. When $l_{ov}$=0, each feature vector begins with the feature value of the next segment following the last feature value of the previous feature vector. This exemplary non-overlapping configuration is shown in FIG. 4B with an m=3 element feature vector.

Multidimensional feature vectors encompass more information with increased dimensionality for the same track segmentation parameters. Although this results in multiple feature values for the same feature, it comes at the cost of increased segment length required to form a feature vector. The number of plots, $t_p$, required to construct a feature vector can be determined by the segmentation parameters, namely the segment size n and the segment overlap $k_{ov}$, and feature vector parameters, being the number of elements m and feature vector overlap $l_{ov}$, as shown in equation 30.

$$t_p = nm - k_{ov}(m-1) = m(n - k_{ov}) + k_{ov} \quad (30)$$

As such, the classifier uses the first $t_p$ plots before an initial decision on the classification of a portion of a given track segment can be made. By setting m=1, this decision can be obtained after the first n plots, and updated with the next n−$k_{ov}$ plots.

It has been observed that classification performance can be improved by increasing $t_p$, the number of plots that are used to form a feature vector. This increase can be achieved by various means including increasing n, the number of plots used per track segment, or m, the number of track segments used per feature vector. The improved classification performance can be attributed to more data being available to form better feature estimates, thus helping to discriminate among classes of interest. However, with increased number of plots $t_p$, the initial decision is delayed as well, thus resulting in a trade off between incremental classification performance and update rate of target classification. It should be noted that an increase in n is only effective while the changes in target behaviour are minimal with the increased track segment length. For instance, an increase in track segment length for a maneuvering aircraft may result in a variance of the path feature that is more in line with the non-aircraft class. The amount of data that is required for optimal classification performance can be determined through experimentation on recorded radar data.

To determine which feature vectors result in better classification performance for the classifier 24, the inventors propose a Cluster Performance Index (CPI), defined according to equation 31:

$$CPI_\beta = \sum_{c=1}^{Cl} \frac{P_c}{l_c} \sum_{i=1}^{l_c} \left[ (\beta+1) p_{ic}^{\frac{\log\left(\frac{\beta}{\beta+1}\right)}{\log P_c}} - \beta \right] \quad (31)$$

$$= \frac{\beta+1}{\left(\sum_{d=1}^{Cl} l_d\right)} \left[ \sum_{c=1}^{Cl} \sum_{i=1}^{l_c} p_{ic}^{\frac{\log\left(\frac{\beta}{\beta+1}\right)}{\log P_c}} \right] - \beta$$

where Cl is the number of classes c, $l_c$ is the number of track segments in class c, $P_c$ is the probability of a track segment belonging to class c as defined by equation 32:

$$P_c = \frac{l_c}{\left(\sum_{d=1}^{Cl} l_d\right)} \quad (32)$$

and $p_{ic}$ is the empirical likelihood of track segment i belonging to a class c, as defined by equation 33:

$$p_{ic} = \frac{N_{ic}}{M} \quad (33)$$

in which M is the number of nearest neighbours used in the CPI calculation; and $N_{ic}$ is the number of nearest neighbours (to track segment i) within M belonging to class c. In the feature space under consideration (i.e. individual/combination of features), for each data point, the M nearest neighbours are the closest M data points as determined by some measure of distance (e.g. Euclidean distance). This may include normalization of individual dimensions prior to performing distance measures to equate the relative influence of each dimension (i.e. each calculated feature). The parameter β controls the degree to which the CPI penalizes for poor performance as determined by an empirical likelihood less than $P_c$. This may be achieved through a non-linear mapping of the empirical likelihood $p_{ic}$, using an exponential function of the form H:[0,1]→[−β,1], constrained such that:

$$H(0) = -\beta$$

$$H(P_c) = 0$$

$$H(1) = 1 \quad (34)$$

which permits evaluation of features relative to the distribution of classes in the dataset. In addition, by selecting an exponential function as the basis for the CPI, the model becomes more sensitive to variations in the $p_{ic}$ near $p_c$ for small values of $P_c$. This is illustrated in FIG. 5a for the exponential case parameterized by β=2 in comparison to the linear model constrained by H($P_c$)=0 and H(1)=1 as shown in FIG. 5b. As observed, this form of feature evaluation better accounts for poor performance in relatively less probable classes than a linear model.

A number of classes of targets can be distinguished given a suitable set of features by training the classifier 24 with such features. In this description, experimental results are shown for two classes: aircraft and non-aircraft. However, as mentioned previously these classes can be expanded to include several sub-classes such as birds, windmills, AP, etc. in the non-aircraft class, and helicopters, small planes, etc. in the aircraft class.

The CPI calculation relies on a distance measure to determine the set of M nearest neighbours. Each dimension within the input space includes normalized features to avoid undue bias introduced by a magnitude difference in features. In one implementation, the median value of each feature may be used as the normalization constant in the CPI calculation. The median, i.e. the value that minimizes the sum of absolute deviations for a given distribution, is preferably used since it is less susceptible to influence by noisy outliers in comparison to the mean.

In one exemplary embodiment, the classifier stages 62 and 66 use a support vector machine (SVM) to perform classification. The SVM was introduced by Vapnik and is based on the principle of Structural Risk Minimization (SRM). In contrast to Empirical Risk Minimization techniques where the aim is the minimization of the error in the training dataset, the objective in SRM is to minimize the upper bound on the generalization error. An SVM can be formulated to handle linearly separable and non-separable data, and has a structure that allows for non-linear classification with minor modifications. In addition, since SVMs are known to generalize well and have been applied to a wide range of applications, they serve as a good candidate for target track classification in advanced ASR systems.

Linear SVM Classification

Given a dataset $x_i \in R^n$ with corresponding labels $y_i \in \{-1, +1\}$ for i=1 . . . l, the objective of an SVM is to find the maximal separating hyperplane. The variable l is the number of data points (i.e. track segments). The −1 and +1 are data labels used to refer to non-aircraft and aircraft classes. This set of data labels may be expanded to include more classes. For the linearly separable case, this optimal hyperplane maximizes the margin, being the sum of the distance to the closest data point(s), also known as support vectors, of each class. The distance (d) to each class, along with the total margin is shown in FIG. 6 for an exemplary case with the support vectors shaded.

The equation of the maximal separating hyperplane $w \cdot x_i + b = 0$ is used to ensure that elements from each class lie on the correct side of the hyperplane as follows:

$$w \cdot x_i + b \geq 1 \text{ for } y_i = +1$$

$$w \cdot x_i + b \leq 1 \text{ for } y_i = -1 \quad (35)$$

or equivalently, $$y_i(w \cdot x_i + b) \geq 1 \text{ for } i=1 \ldots l \quad (36)$$

The value of 1 on the right hand side of equations 35 and 36 maintains non-zero distances to each class. The optimal separating hyperplane can be determined by maximizing the distance d to each class:

$$d = \frac{1}{w \cdot w} \quad (37)$$

or equivalently minimizing the inverse of the margin, $$\frac{w \cdot w}{2} \quad (38)$$

Thus, the constrained minimization of equation 38 subject to equation 36 yields the optimal separating hyperplane for linearly separable data.

SVM is a binary classifier. Accordingly, to use a binary classifier for multiple classes, a combination of several classifiers may be used in a suitable configuration (e.g. binary tree format, one-against-others). For instance, the first classifier can distinguish aircraft targets from non-aircraft targets, with the next classifier identifying birds in what has already been classified as non-aircraft by the first classifier, and so on and so forth.

In the case of linearly non-separable data, slack variables, $\xi_i$, are introduced to penalize for misclassified data points resulting in the following (primal) optimization problem:

$$\text{minimize} \quad (39)$$

$$F(w, b, \xi) = \frac{w \cdot w}{2} + C \sum_{i=1}^{l} \xi_i$$

subject to:

$$y_i(w \cdot x_i + b) \geq 1 - \xi_i \quad \text{for } i=1 \ldots l$$

$$\xi_i > 0 \quad \text{for } i=1 \ldots l$$

where C, represents a control parameter to allow for a trade off between increased training error with smaller C, and higher margin with larger C. The quadratic problem presented in equation 39 can be expressed in its dual form by introducing Lagrange multipliers $a_i$, for i=1 . . . l, to account for the constraints in the primal formulation as follows:

$$\text{maximize} \quad (40)$$

$$G(a) = \sum_{i=1}^{l} a_i - \frac{1}{2} \sum_{i=1}^{l} \sum_{j=1}^{l} a_i a_j y_i y_j x_i \cdot x_j$$

subject to:

$$\sum_{i=1}^{l} a_i y_i = 0 \quad \text{for } i=1 \ldots l$$

$$0 < a_i \leq C \quad \text{for } i=1 \ldots l$$

Non-Linear SVM Classification

The extension of the linear SVM classification into non-linear classification is achieved by non-linearly mapping the input data into a high dimensional space and performing linear classification in this new space. The linear SVM in the new feature space corresponds to a non-linear SVM in the original input space. Formally, the non-linear mapping $\Phi: R^n \rightarrow X$, may be implicitly incorporated into the objective function through a positive definite symmetric kernel function $K(x_i, x_j) = \Phi(x_i) \cdot \Phi(x_j)$. Using a kernel function alleviates the need to explicitly evaluate the $\Phi$ mapping which can be computationally inefficient. Common kernel functions that may be used include the polynomial, radial basis function, and sigmoid kernels which are summarized in equation set 41.

$$K_{poly}(x_i, x_j) = (s x_i \cdot x_j + c)^d \quad (41)$$

$$K_{rbf}(x_i, x_j) = \exp\left\{-\frac{(x_i - x_j) \cdot (x_i - x_j)}{2\sigma^2}\right\}$$

$$K_{sigmoid}(x_i, x_j) = \tanh(s x_i \cdot x_j + c)$$

As such, the modified optimization problem for the non-linear SVM is shown in equation 42.

$$\text{maximize} \quad (42)$$

$$G(a) = \sum_{i=1}^{l} a_i - \frac{1}{2} \sum_{i=1}^{l} \sum_{j=1}^{l} a_i a_j y_i y_j K(x_i \cdot x_j)$$

subject to:

$$\sum_{i=1}^{l} a_i y_i = 0 \quad \text{for } i=1 \ldots l$$

$$0 < a_i \leq C \quad \text{for } i=1 \ldots l$$

The feature extraction stage 54 and the feature processing stages 60 and 64 convert each radar track into a number of feature vectors through segmentation and feature vector formulation. The classifier stages 62 and 66 then classify each feature vector independently of the source tracks, with feature vector classification results of the same track segment t being combined in the combiner stage 68. In one instance, the combination may be done using a linear weighted function.

The feature processing stages 60 and 64 generate data vectors, $x_j$, for the $j^{th}$ track, from the feature vectors $F_i^{(j)}$, where the index i typically ranges along all principal and extension features, $f_1$ to $f_{14}$ and $f_{15}$ to $f_{18}$ respectively, as shown in equation 43 for principle data $$x_j = \{F_1^{(j)}, F_2^{(j)}, \ldots, F_{14}^{(j)}\}^T \quad (43)$$

and equation 44 for extension data.

$$x_j = \{F_{15}^{(j)}, F_{16}^{(j)}, \ldots, F_{18}^{(j)}\}^T \quad (44)$$

As is the case for the CPI calculation, normalization of data vectors may be performed to avoid undue bias in the SVM calculations. In this case, the inventors have found that it is preferable to apply a whitening transform to the feature data by forming the unbiased sample covariance matrix ($\Sigma$) of the data as follows:

$$\sum = \frac{1}{N}(X - \overline{X})(X - \overline{X})^T = V\Lambda V^T \quad (45)$$

where $$X = \{x_1, x_2, \ldots, x_n\} \quad (46)$$

represents the 14×N or 4×N dimensional data matrix for principle and extension data respectively, and, $$\overline{X} = \frac{1}{N}\sum_{i=1}^{N} x_i \quad (47)$$

N represents the total number of feature vectors extracted from all tracks within the training set that is used to train the classifier 24 where $\overline{X}$ is the mean vector of the data values. The resulting whitening transform may then be calculated as follows:

$$W = \Lambda^{-1/2} V^T \quad (48)$$

where $\Lambda$ is the 14×14 or 4×4 diagonal matrix of the eigenvalues of $\Sigma$, and V is the 14×14 or 4×4 matrix composed of the eigenvectors $v_i$ of $\Sigma$ defined by equation 49, for principle and extension data respectively.

$$V = \begin{cases} [v_1 \; v_2 \; \cdots \; v_{14}] & \text{For principal data} \\ [v_{15} \; v_{16} \; \cdots \; v_{18}] & \text{For extension data} \end{cases} \quad (49)$$

In one implementation of the invention, the whitened training data matrix may be obtained according to equation 50, $$X' = WX \quad (50)$$

and for any test data, $X_{test}$, the same whitening transformation matrix (obtained from the training data), W, is preferably used to pre-process the test data according to equation 51.

$$X'_{test} = WX_{test} \quad (51)$$

The combiner stage 68 not only combines the results of each classifier stage 62 and 66 but also the results from the previous track segment t−1. Accordingly, the combiner stage 68 provides an aggregate classification result over time. Each classification stage 62 and 66 produces a resulting data label, $y_{ijt} \in \{-1, +1\}$, (for two exemplary classes) for the $i^{th}$ track and the track segment t associated with the feature vector j used with the classifier 24. Further, the presence of SSR data for a track segment t is denoted as follows.

$$\lambda_{it} = \begin{cases} +1 & \text{if SSR-sourced data exist in} \\ & \text{the } t^{th} \text{ segment of the } i^{th} \text{ track} \\ -1 & \text{otherwise} \end{cases} \quad (52)$$

These labels are aggregated to produce track label $Y_{iT}$ for the current time instant T as follows:

$$Y_{iT} = \text{sign}\left(\sum_{t=1}^{T} \max(\rho_{it}, \lambda_{it})\right) \quad (53)$$

where, $$\text{sign}(x) = \begin{cases} +1 & \text{for } x \geq 0 \\ 0 & \text{otherwise} \end{cases} \quad (54)$$

and, $$\rho_{it} = \sum_{j=1}^{2} [\theta_{it} k_j + (1 - \theta_{it})(2 - j)] y_{ijt} \quad (55)$$

where, is the classification result for track i and segment t. The variable $\theta_{it}$ is an indicator variable for the presence of extension data formally defined as, $$\theta_{it} = \begin{cases} 1 & \text{if extension data exist for the} \\ & t^{th} \text{ segment of the } i^{th} \text{ track} \\ 0 & \text{otherwise} \end{cases} \quad (56)$$

Moreover, $k_j$, j=1, 2 is the relative proportion of principal and extension features with respect to all features, used in the classification stages 62 and 66. Given P principal features and E extension features, $k_j$, j=1, 2 is defined according to equations 57 and 58.

$$k_1 = \frac{P}{P + E} \quad (57)$$

$$k_2 = 1 - k_1 = \frac{E}{P + E} \quad (58)$$

The variable $\theta_{it}$ is a switching variable to select the multiplier for $y_{ijt}$; namely, $k_j$, when extension features are available for the current feature vector, and $\{1,0\}$ for j=1, 2 respectively, when extension features are not available for the current feature vector. In an alternative implementation, the sign(x) operation in equation 53 may be replaced with a time-dependent normalization constant and a bias, as follows:

$$Y_{iT} = \frac{1}{2}\left[\frac{1}{T}\sum_{t=1}^{T}\max(\rho_{it}, \lambda_{it}) + 1\right] \quad (59)$$

to obtain an updated probability value based on the likelihood of the target's behaviour to conform to aircraft and non-aircraft classes.

In another alternative implementation, independence among the segment ranges can be further instilled in addition to the overlapping feature and segment regions. This is achieved by moving away from the uniform distribution assumed in equations 53 and 59, and introducing a statistical distribution factor, $\Psi_{it}$, as shown in equations 60 and 61.

$$Y_{iT} = \text{sign}\left(\sum_{t=1}^{T} \psi_{it}\max(\rho_{it}, \lambda_{it})\right) \quad (60)$$

$$\psi_{it} = H_{iT}(\rho_{it}) \quad (61)$$

$H_{iT}(\rho_{it})$, is a weight for $\rho_{it}$ based on some weighting function $H_{iT}$ defined for the $i^{th}$ track segment by the all $\rho_{it}$, t=1 ... T. The weighting function $H_{iT}$ is used to decrease the contribution of noisy outliers based on all available observations for the given track segment t. This may also be extended to obtain an updated probability value based on likelihood target behaviour to conform to aircraft and non-aircraft classes as shown in equation 62.

$$Y_{iT} = \frac{1}{2}\left[\frac{1}{\left(\sum_{t=1}^{T}\psi_{iT}\right)}\sum_{t=1}^{T}\psi_{it}\max(\rho_{it}, \lambda_{it}) + 1\right] \quad (62)$$

The combiner stage 68 may provide the final classification result as defined by equation 53. In an alternative embodiment, the combiner stage 68 may provide the final classification result as defined by equation 60.

Referring now to FIG. 7, shown therein a flow diagram of a training process 80 that may be used to establish the classification that occurs in the extension classifier stage 62 and the principal classifier stage 66. As shown, the training process 80 uses labeled tracks. Data pre-processing is performed on the labeled tracks in step 82 which includes segmenting the labeled track segments. The pre-processed labeled track segments are then processed to obtain values for the features in step 84. The formation of principal and extension feature spaces, as well as processing on these spaces such as performing whitening transformations, as previously described, occurs in steps 86 and 90. After processing the principal and extension feature spaces, the classifiers are trained in steps 88 and 92 and the system parameters for the principal and extension data are stored. Training may be performed by solving the optimization problem outlined in equation 40 for the linear SVM, or equation 42 for the non-linear SVM respectively. For training, SSR data may be used to confirm aircraft ground truth and data with no probable aircraft may be used to train the classifier 24 for non-aircraft targets Real data from two different DASR sites were processed to evaluate the classifier 24. Dataset one includes 237 aircraft and 529 non-aircraft tracks recorded over 364 real radar scans and includes an abundant number of bird tracks. Dataset two includes data collected over three days with the characteristics of the data as summarized in Table 2.

TABLE 2

Characteristics of datasets

| Site | Name | Aircraft tracks | Non-aircraft tracks | Scans |
|---|---|---|---|---|
| 1 | Dataset one | 244 | 592 | 364 |
| 2 | Dataset two | 155 | 4905 | 7000 |
| 2 | Dataset three | 236 | 2686 | 5000 |
| 2 | Dataset four | 117 | 52 | 500 |

These datasets are good candidates for pattern analysis due to the nature of the data captured. Specifically, nearly all aircraft tracks within the datasets can be identified through the presence of SSR information. The SSR information is used, in part, for training purposes and also to calculate the performance of the classifier 24 in test mode, once it has been trained, before being used in general operation. There are also a small number of tracks that adhere to the behaviour of an aircraft, but lack associated SSR information. In the results presented, ground truth has been inferred with the presence of SSR data within a given track.

Several different test configurations may be used for the datasets to evaluate the performance of the classifier 24. In a first configuration, a portion of the dataset is selected randomly for training with the remaining left for testing the classifier 24. In second and third configurations, the classifier 24 is trained from a portion of a dataset taken from a site, and tested on datasets taken from different days from the same location. In a fourth configuration, the same trained classifier 24 from configurations two and three is tested on data from a different site. The training and testing procedures are repeated for a number of iterations based on random selection of the training data to obtain statistically reliable results and to avoid biasing the classifier 24 on a chosen data sequence. Successful classification results have been obtained by giving each track an updated probability value based on its likelihood of behaving like an aircraft or non-aircraft target.

In order to perform track segmentation and feature vector parameter selection, a set of candidate values were selected and used in training and testing of the classifier 24 using dataset one. In an effort to minimize the delay for the initial classification decision, the maximum number of plots forming a feature vector were limited to 8, which also represents the minimum track length encountered in the dataset as shown in the distribution plots of track length in FIGS. 8a and 8b for the aircraft and non-aircraft classes respectively.

In order to find the optimum classification parameter set, four different candidate configuration sets of parameters were considered, each with its constituents, limited to a maximum of 8 plots when forming a feature vector. These candidate sets are shown in Tables 3 to 6. These configuration parameter sets were selected to achieve the maximum segment and feature vector overlap for all valid segment and feature vector size pairs. This constraint translates to fixed values for $k_{ov}$ and $l_{ov}$ when n and m are set, as shown in equation 63.

$$k_{ov} = n-1$$

$$l_{ov} = m-1 \quad (63)$$

Thus, the only free parameters become the track segment size, n, and the feature vector size, m, values of which are shown in Tables 3 through 6. Each parameter set is characterized uniquely by a quadruplet [n, m, $k_{ov}-1$, $l_{ov}$], where $k_{ov}-1$ has been used for notational purposes only. Also included in Tables 3 through 6 is the value of $t_p$, the number of plots forming the feature vector, as determined by equation 30.

TABLE 3

Segmentation and feature vector parameters for group 1

| Parameter | [3-1-1-0] | [4-1-2-0] | [5-1-3-0] | [6-1-4-0] | [7-1-5-0] | [8-1-6-0] | Description |
|---|---|---|---|---|---|---|---|
| n | 3 | 4 | 5 | 6 | 7 | 8 | Segment size |
| $k_{ov}$ | 2 | 3 | 4 | 5 | 6 | 7 | Segment overlap |
| m | 1 | 1 | 1 | 1 | 1 | 1 | Feature vector size |
| $l_{ov}$ | 0 | 0 | 0 | 0 | 0 | 0 | Feature vector overlap |
| $t_p$ | 3 | 4 | 5 | 6 | 7 | 8 | Plots forming feature vector |

TABLE 4

Segmentation and feature vector parameters for group 2

| Parameter | [3-2-1-1] | [3-3-1-2] | [3-4-1-3] | [4-2-2-1] | [4-3-2-2] | [5-2-3-1] | Description |
|---|---|---|---|---|---|---|---|
| n | 3 | 3 | 3 | 4 | 4 | 5 | Segment size |
| $k_{ov}$ | 2 | 2 | 2 | 3 | 3 | 4 | Segment overlap |
| m | 2 | 3 | 4 | 2 | 3 | 2 | Feature vector size |
| $l_{ov}$ | 1 | 2 | 3 | 1 | 2 | 1 | Feature vector overlap |
| $t_p$ | 4 | 5 | 6 | 5 | 6 | 6 | Plots forming feature vector |

TABLE 5

Segmentation and feature vector parameters for group 3

| Parameter | [3-5-1-4] | [3-6-1-5] | [4-4-2-3] | [4-5-2-4] | [5-3-3-2] | [5-4-3-3] | Description |
|---|---|---|---|---|---|---|---|
| n | 3 | 3 | 4 | 4 | 5 | 5 | Segment size |
| $k_{ov}$ | 2 | 2 | 3 | 3 | 4 | 4 | Segment overlap |
| m | 5 | 6 | 4 | 5 | 3 | 4 | Feature vector size |
| $l_{ov}$ | 4 | 5 | 3 | 4 | 2 | 3 | Feature vector overlap |
| $t_p$ | 7 | 8 | 7 | 8 | 7 | 8 | Plots forming feature vector |

TABLE 6

Segmentation and feature vector parameters for group 4

| Parameter | [6-2-4-1] | [6-3-4-2] | [7-2-5-1] | Description |
|---|---|---|---|---|
| n | 6 | 6 | 7 | Segment size |
| $k_{ov}$ | 5 | 5 | 6 | Segment overlap |
| m | 2 | 3 | 2 | Feature vector size |
| $l_{ov}$ | 1 | 2 | 1 | Feature vector overlap |
| $t_p$ | 7 | 8 | 8 | Plots forming feature vector |

For each candidate configuration parameter set, the resulting correct recognition rates were collected as a function of track length measured from the first plot of each track (i.e. track initiation). As such, the overall recognition rate as a function of the progression of track length was determined, and used to evaluate each configuration parameter set. For instance, given a track consisting of 30 plots, the classification results for this track will only be accounted for up to the $30^{th}$ detection. For the range of detection values beyond 30, this track becomes inactive and its classification result will no longer be incorporated into the recognition rate calculation. Thus as the number of detections increase, the number of active tracks (with at least the required minimum number of plots) decreases and results in the average recognition rate being based on a smaller number of candidate tracks. As such, to avoid undue influence on the recognition rate due to a small number of active tracks, the maximum number of detections were limited such that at least 5% of all track segments for a given class remain unclassified for the current number of detections. In other words, the number of segments yet unclassified for all active tracks must account for no less than 5% of all segments. This 5% threshold is referred to as the active segment proportion threshold.

Figure 9A:
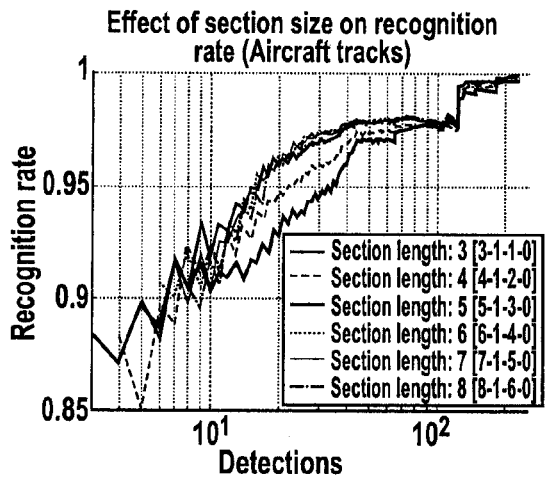
FIGS. 9a, 9b and 9c are graphs of recognition rate as a function of track length for parameter configuration group 1.
Figure 10A:
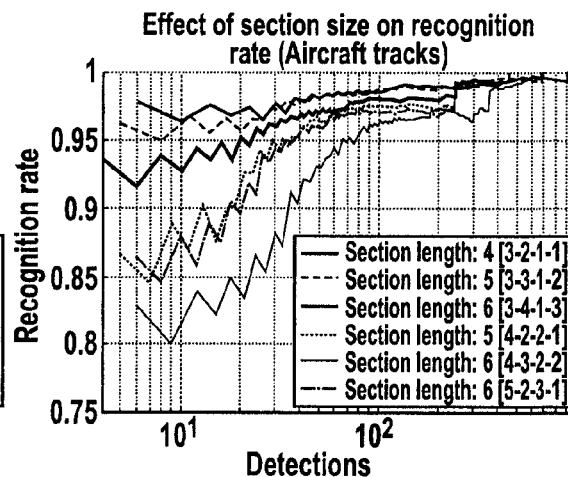
FIGS. 10a, 10b and 10c are graphs of recognition rate as a function of track length for parameter configuration group 2.
Figure 9B:
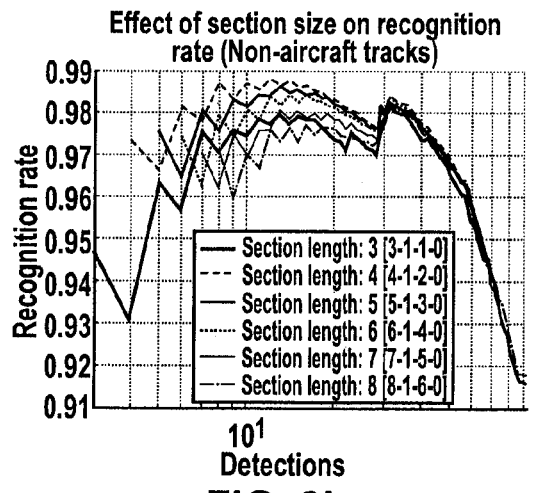
Figure 10B:
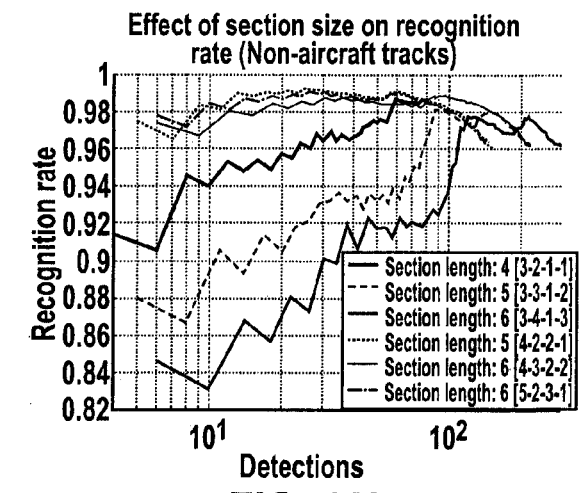
Figure 9C:
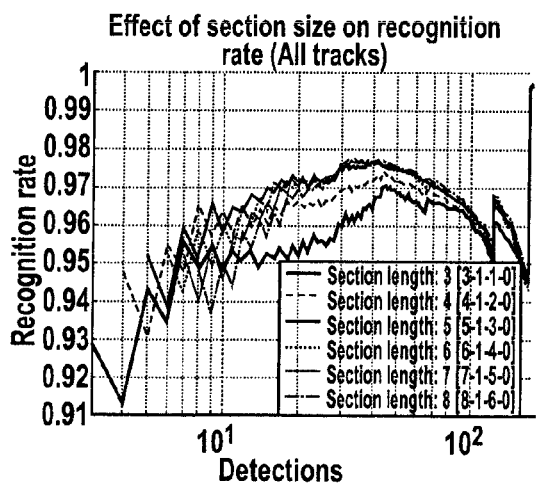
Figure 10C:
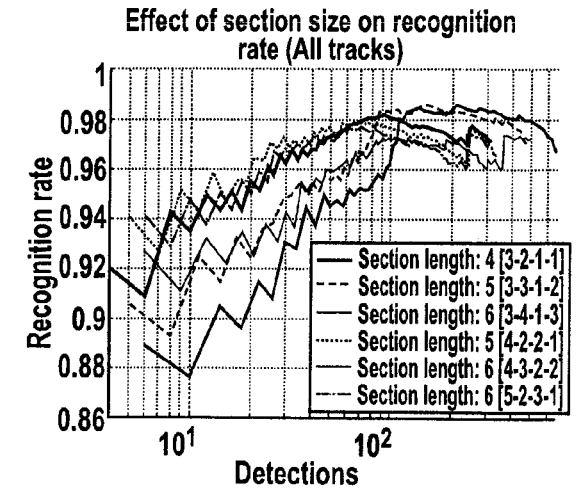
Figure 11A:
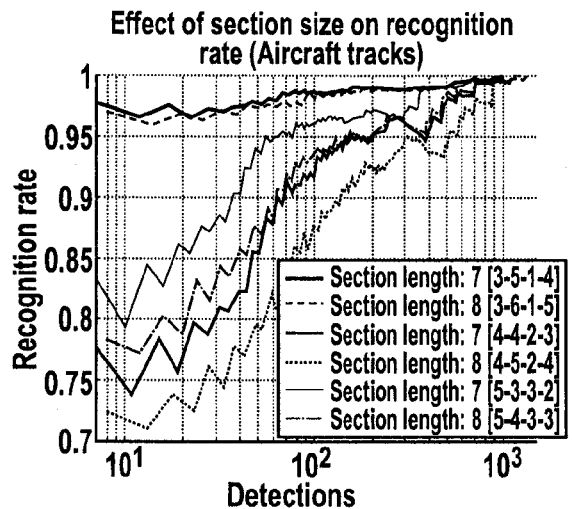
FIGS. 11a, 11b and 11c are graphs of recognition rate as a function of track length for parameter configuration group 3.
Figure 12A:
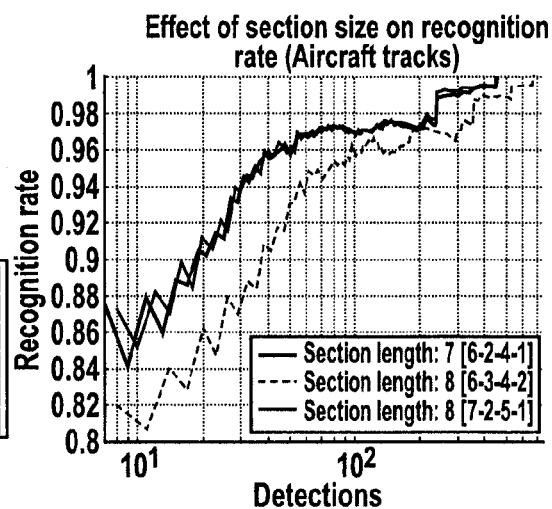
FIGS. 12a, 12b and 12c are graphs of recognition rate as a function of track length for parameter configuration group 4.
Figure 11B:
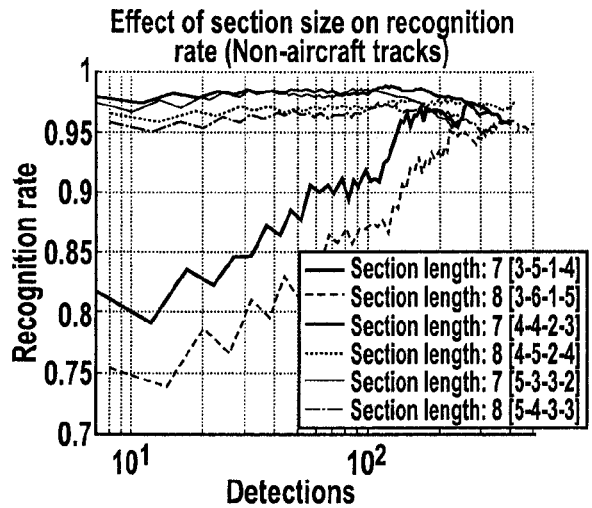
Figure 12B:
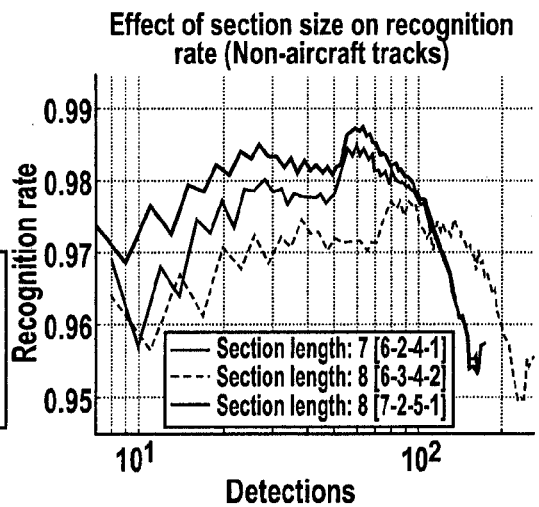
Figure 11C:
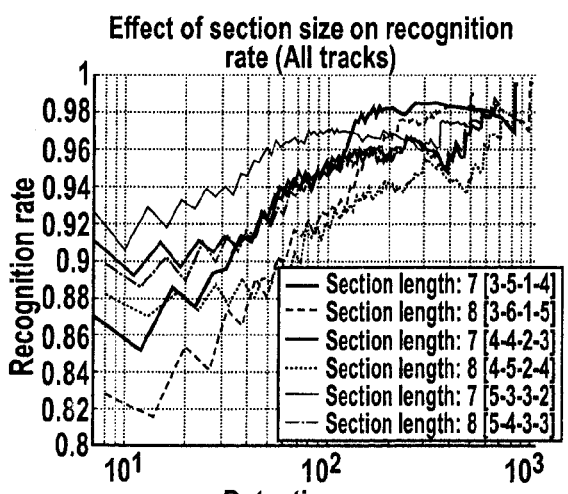
Figure 12C:
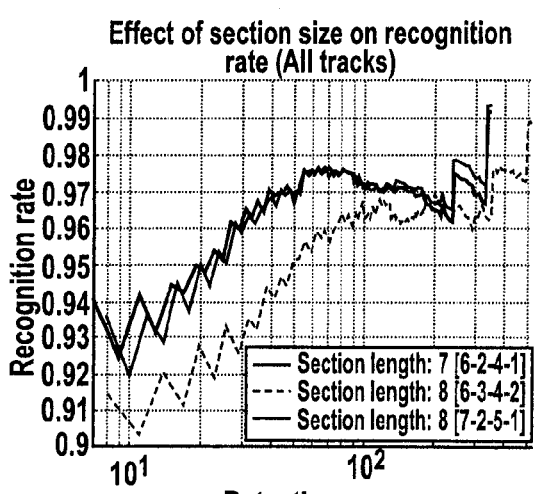

The results for parameter configuration group 1 as set out in Table 3 are shown in FIG. 9a for the aircraft class, FIG. 9b for the non-aircraft class, and for all classes in FIG. 9c. It can be observed that the recognition rate decreases with increased number of detections for the non-aircraft class. This is attributed to a small number of long-lived non-SSR sourced tracks that mimic aircraft behaviour as the number of detections increases. In fact, as will be shown below, these tracks may actually belong to small non-transponder aircraft, and as such are being classified correctly. However, due to the assumption that all aircraft tracks have SSR-sourced data, although the correct classification is made by the classifier 24, the recognition rate as a function of the number of detections is negatively affected. A higher active segment proportion threshold, which is the proportion of track segments that belong to tracks that are at least of a certain length, would alleviate such an anomaly. The results for parameter configuration groups 2, 3 and 4 are shown in FIGS. 10a-10c, 11a-11c and 12a-12c respectively. Similar to configuration group 1, the effects of long-lived non-SSR sourced tracks can be observed for the non-aircraft class.

Figure 8A:
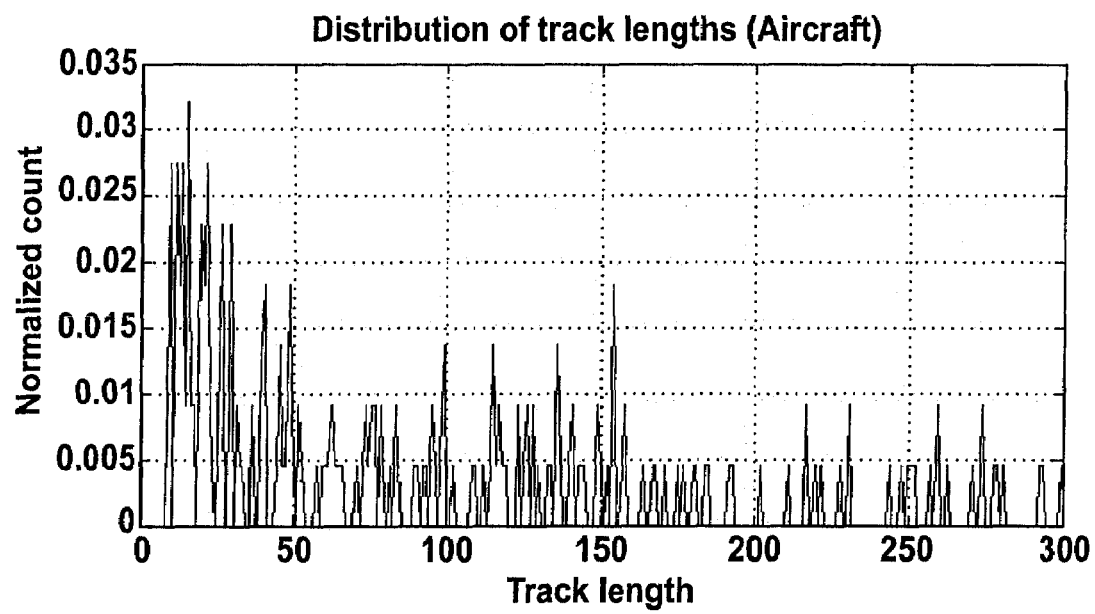
FIGS. 8a and 8b are plots of the distribution of aircraft track lengths and non-aircraft track lengths, respectively, for an exemplary dataset.
Figure 8B:
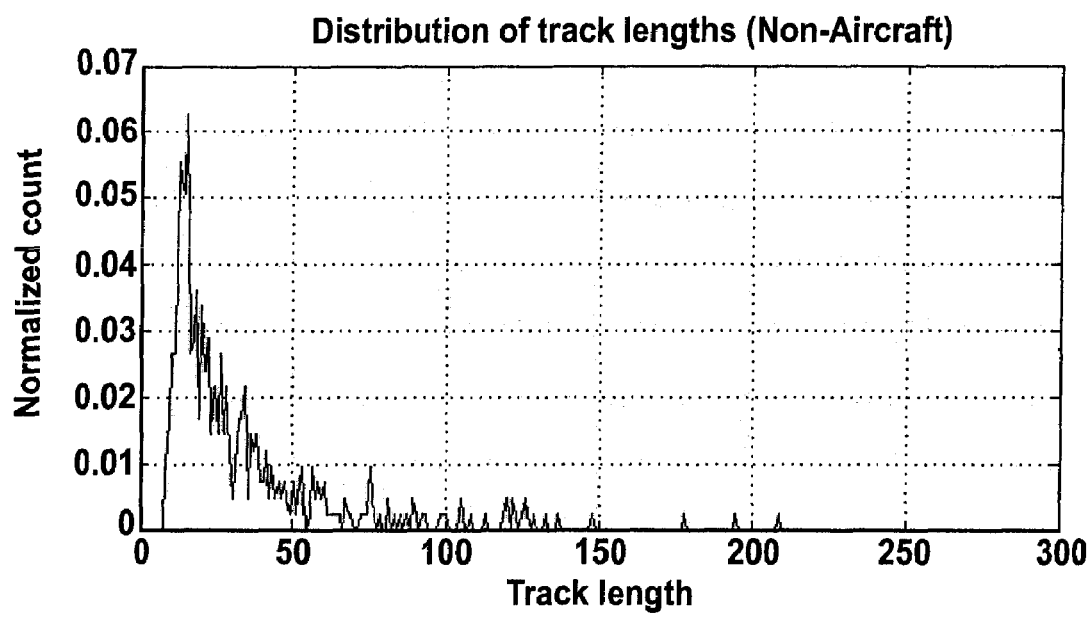

The segmentation and feature vector parameter selection used by the classifier 24 is preferably adapted to obtain low false-rejection of aircraft targets while minimizing the false-acceptance rate of the non-aircraft targets. Moreover, the values of the parameter configuration set are selected to exhibit high recognition rates starting from the first few decisions for a given track, and to minimize the number of detections required for the initial decision. In addition, as shown in FIG. 8a, the proportion of short-lived tracks for the non-aircraft class is relatively high, and as such, the classifier 24 should preferably have good recognition rates within the first 50 detections for this class. With these issues in mind and based on the results of FIGS. 9a to 12c, the track segmentation and feature vector parameters of the classifier 24 may be selected as shown in Table 7.

TABLE 7

Exemplary segmentation and feature vector parameters

| Parameter | Value | Description |
| --- | --- | --- |
| n | 5 | Segment size |
| $k_{ov}$ | 4 | Segment overlap |
| m | 1 | Feature vector size |
| $l_{ov}$ | 0 | Feature vector overlap |
| p | 2 | Degree of fitting polynomial |

For sample datasets one and three from Table 2, the features outlined in Table 1 were extracted, from which histogram plots were generated. The intent is to illustrate the distribution of classes among individual features in order to a select number of feature combinations limited to a maximum of three features per combination, for example, to facilitate illustration. FIGS. 15 through 32 illustrate the distribution of feature values among all feature vectors composed of a single feature for the datasets under consideration. The figures show the normalized histograms of the distributions either on a linear or log scale range. The purpose of the log scaling is to allow the overlap in feature space among the two classes to be observed. In this example, all feature values fed are the original unaltered linear values. In FIGS. 15 to 32, the solid red and outlined blue histograms represent the aircraft and non-aircraft classes respectively. The cluster distributions are evaluated using the proposed CPI.

Figure 13:
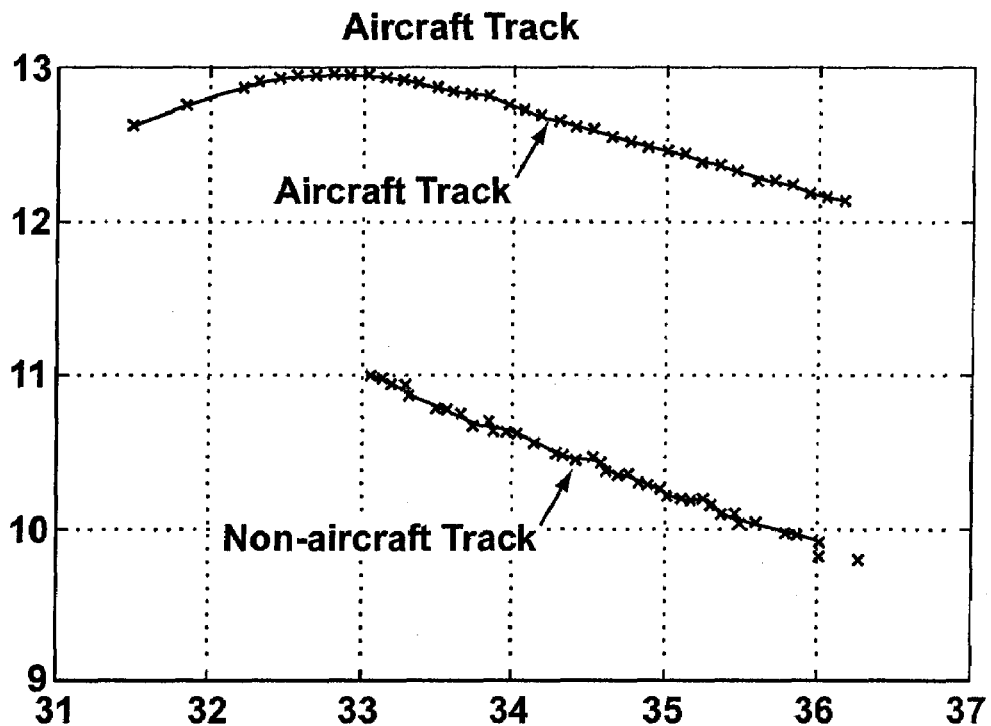
FIG. 13 is a graph showing sample target tracks for aircraft and non-aircraft tracks (x's) along with best-fit polynomial segments (solid lines)
Figure 14A:
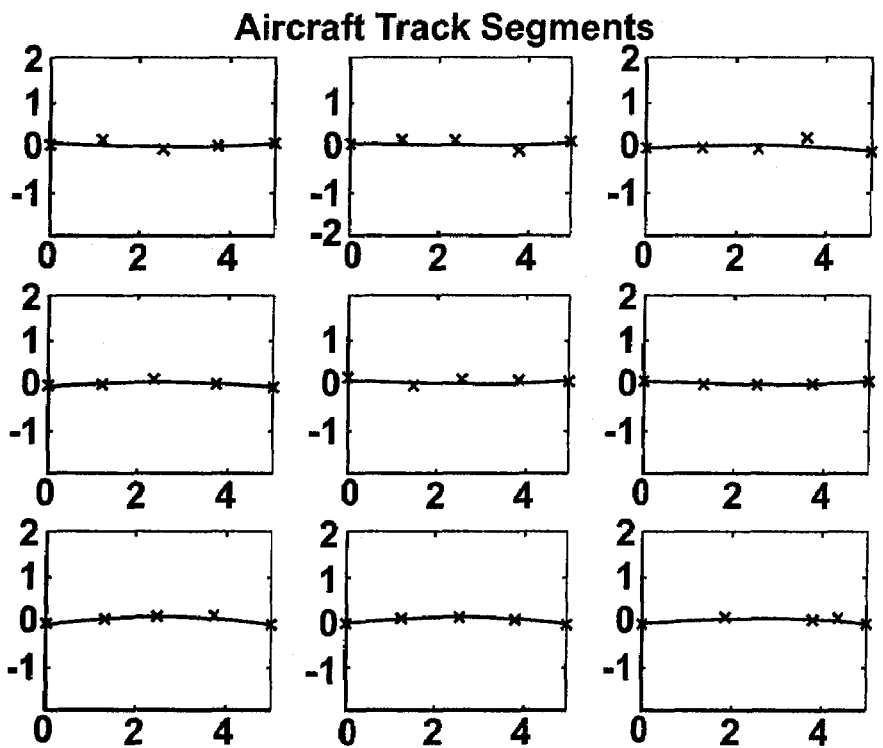
FIGS. 14a and 14b show a series of plots for sample aircraft track segments and sample non-aircraft track segments, respectively, with track plots marked with x's and best-fit polynomial segments shown with solid lines.
Figure 14B:
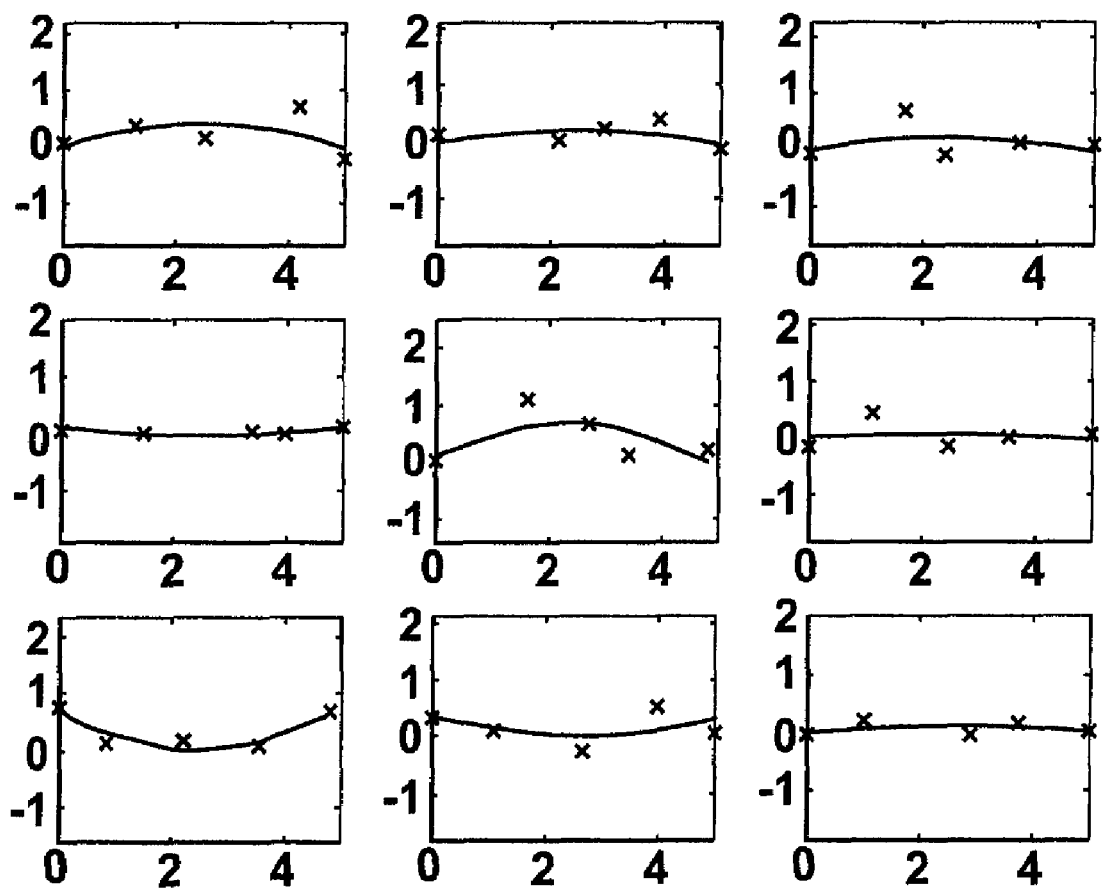
Figure 15A:
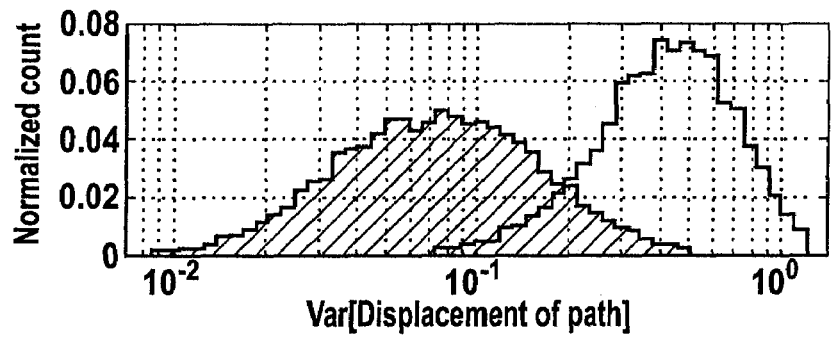
FIGS. 15a and 15b show normalized histograms of the var_path feature ($f_1$) for datasets one and three respectively with the solid red, and outlined blue histograms representing the aircraft and non-aircraft classes respectively.
Figure 15B:
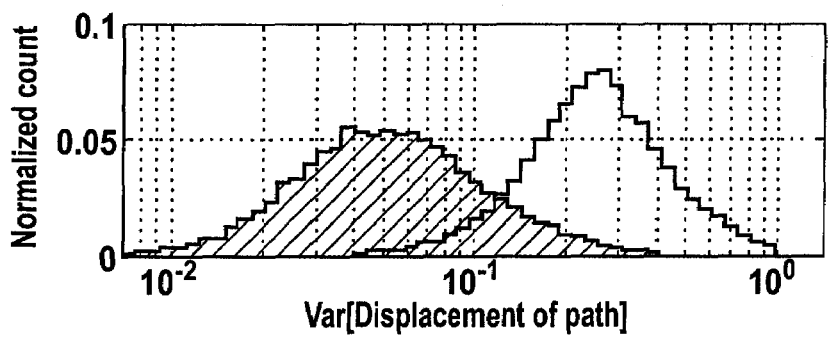
Figure 16A:
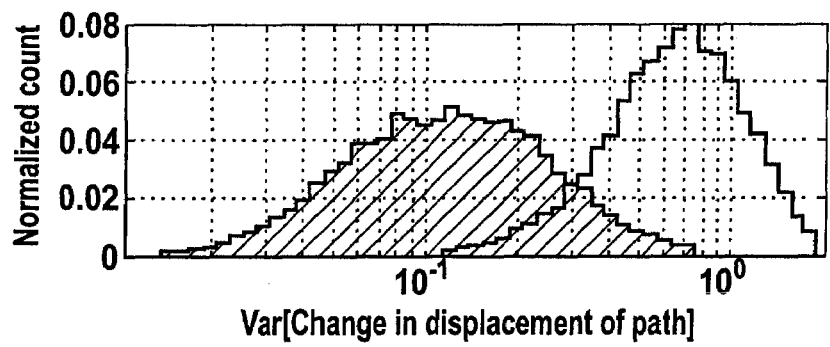
FIGS. 16a and 16b show normalized histograms of the var_delpth feature ($f_2$) for datasets one and three respectively with the solid red, and outlined blue histograms representing the aircraft and non-aircraft classes respectively.
Figure 16B:
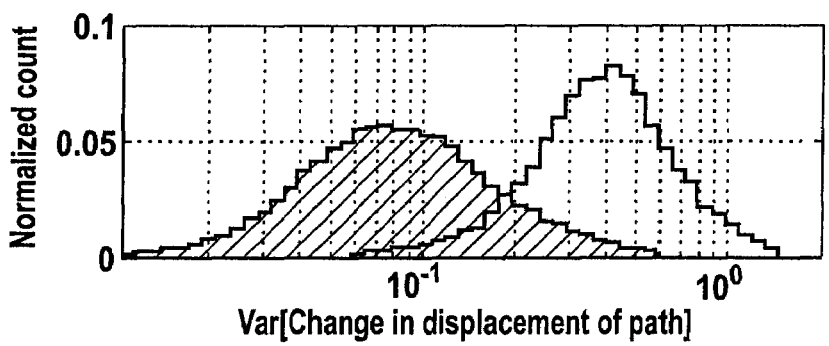
Figure 18A:
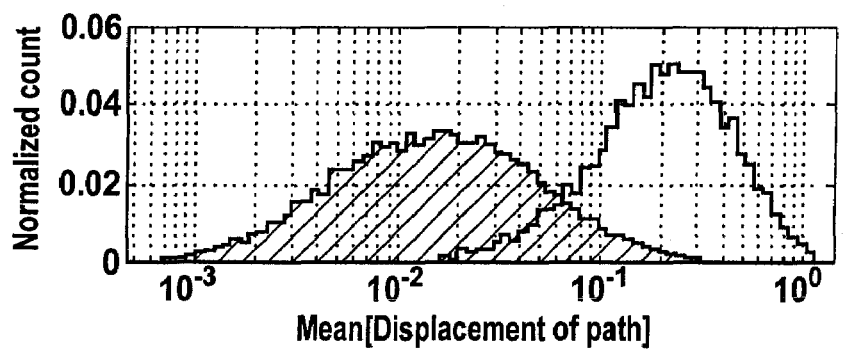
FIGS. 18a and 18b show normalized histograms of the avg_path feature ($f_4$) for datasets one and three respectively with the solid red, and outlined blue histograms representing the aircraft and non-aircraft classes respectively.
Figure 18B:
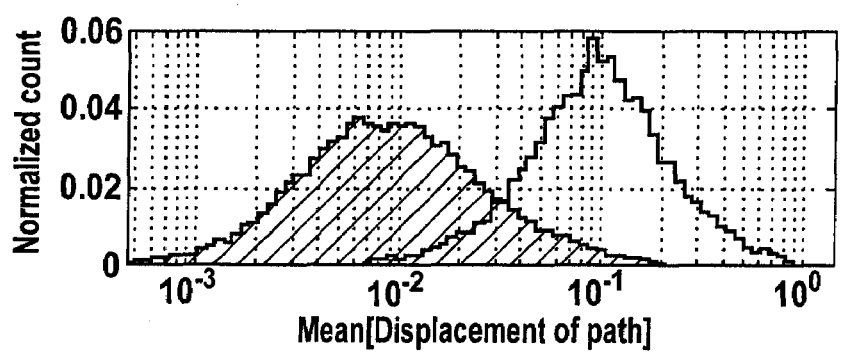
Figure 19A:
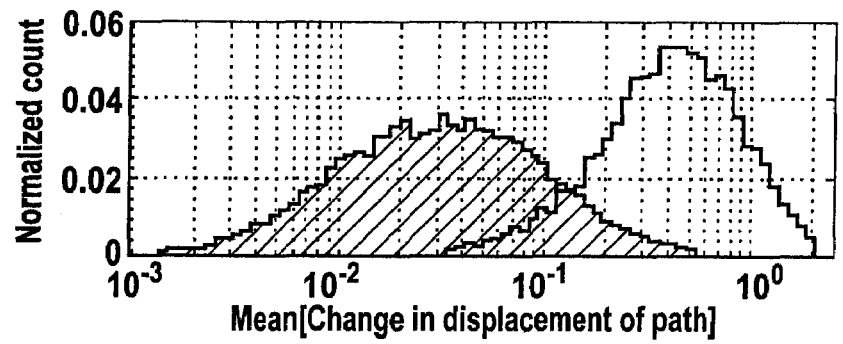
FIGS. 19a and 19b show normalized histograms of the var_delpth feature ($f_5$) for datasets one and three respectively with the solid red, and outlined blue histograms representing the aircraft and non-aircraft classes respectively.
Figure 19B:
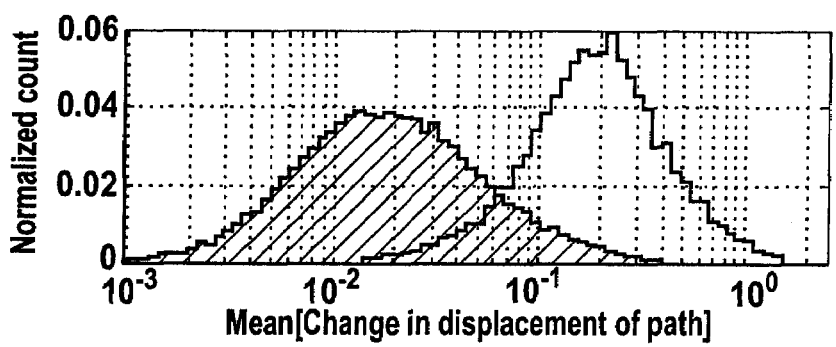

As observed in FIGS. 15a and 15b, the variance in the normalized displacement of path shows that the aircraft class has less variance than the non-aircraft class. This is expected since non-aircraft targets are observed to have greater relative lateral movement in relation to their direction of movement, as can be observed in FIG. 13 from the sample tracks extracted from the dataset. It should be noted that to avoid overlap of track segments for the sample tracks presented, the segment overlap parameters were modified to a value of one. The lateral movement observed is quantified by fitting a second degree polynomial to each track segment, as shown in FIGS. 14a and 14b for the sample tracks shown in FIG. 13, and measuring the distance from the best fit trajectories for each track segment. The higher variance for non-aircraft targets also translates into a higher variance for this class when the sequential change in the displacement of path, var_delpth, from a fitting polynomial is determined. The resulting feature histogram plot is shown in FIG. 16. Similar observations can be made for the mean in the normalized displacement of path, avg_path, as shown in FIGS. 18a and 18b, and the sequential change in the displacement of path feature, avg_delpth, as shown in FIGS. 19a and 19b respectively.

Figure 17A:
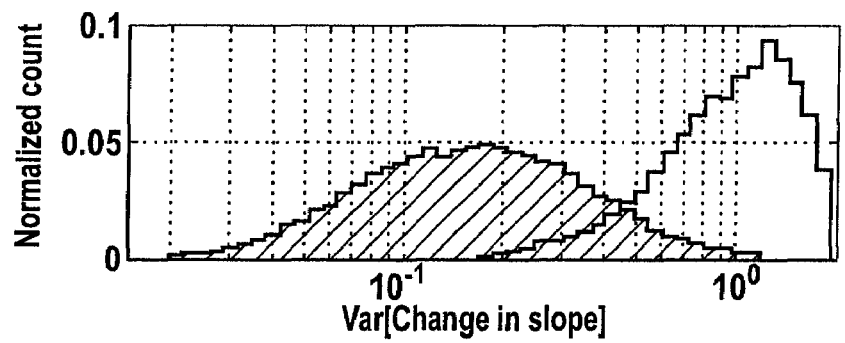
FIGS. 17a and 17b show normalized histograms of the var_delsl feature ($f_3$) for datasets one and three respectively with the solid red, and outlined blue histograms representing the aircraft and non-aircraft classes respectively.
Figure 17B:
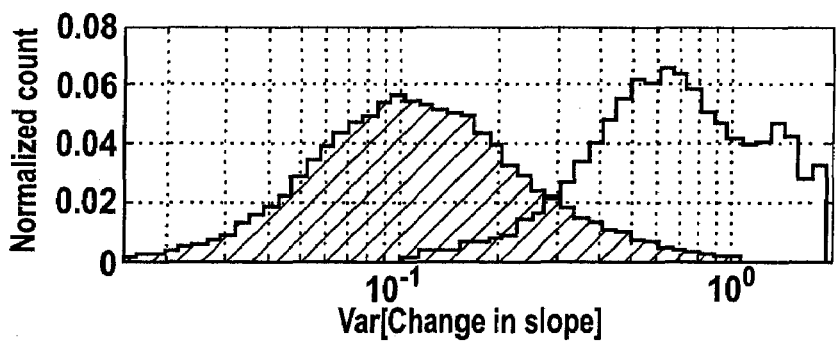
Figure 20A:
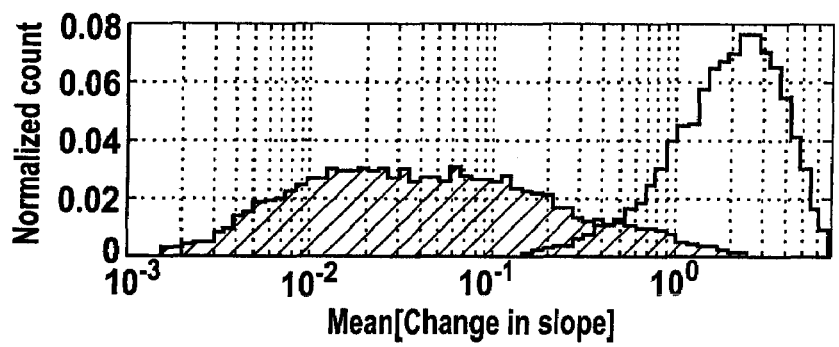
FIGS. 20a and 20b show normalized histograms of the avg_delsl feature ($f_6$) for datasets one and three respectively with the solid red, and outlined blue histograms representing the aircraft and non-aircraft classes respectively.
Figure 20B:
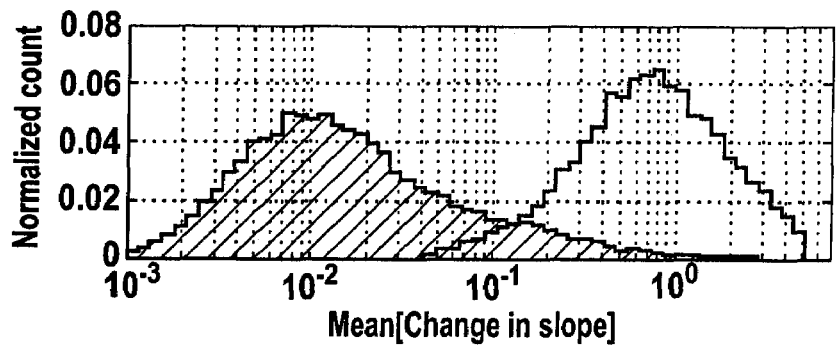

The variance in the change of slope in relation to the direction of movement is lower for the aircraft class as shown in FIGS. 17a and 17b. This can be attributed to higher jitter in flight pattern by non-aircraft targets, which also results in the mean of the change of slope to be higher for the non-aircraft class as shown in FIGS. 20a and 20b.

Figure 21A:
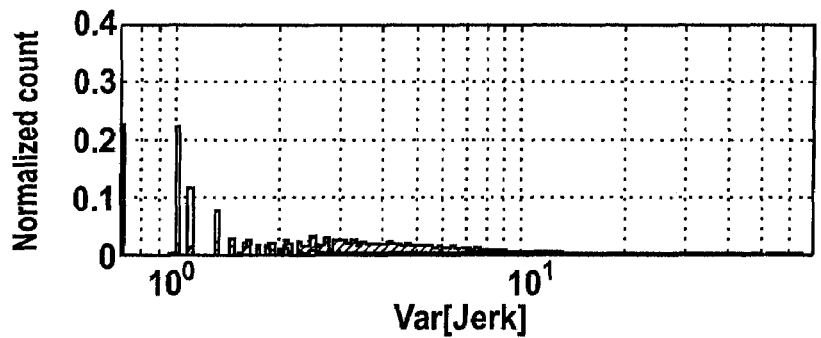
FIGS. 21a and 21b show normalized histograms of the var_del2spd feature ($f_7$) for datasets one and three respectively with the solid red, and outlined blue histograms representing the aircraft and non-aircraft classes respectively.
Figure 21B:
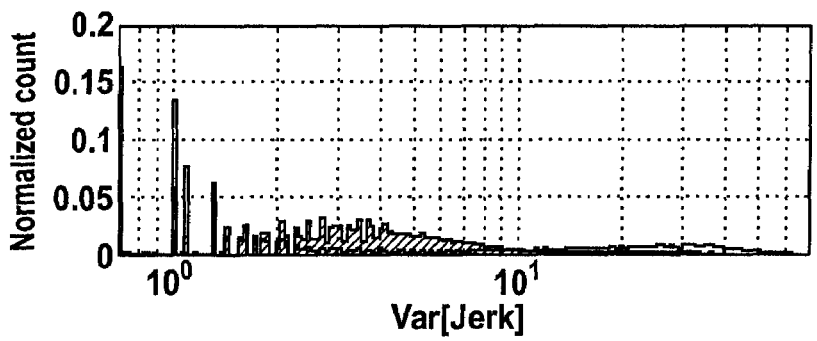
Figure 22A:
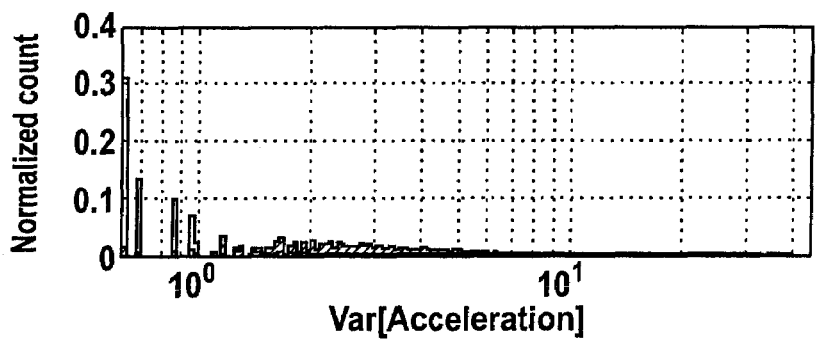
FIGS. 22a and 22b show normalized histograms of the var_delspd feature ($f_8$) for datasets one and three respectively with the solid red, and outlined blue histograms representing the aircraft and non-aircraft classes respectively.
Figure 22B:
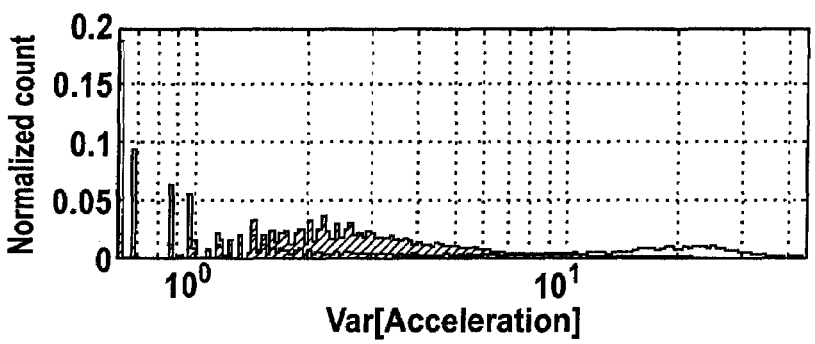

In FIGS. 21a and 21b, the variance in the second change of speed (jerk) is shown for the two classes. The high variance for the aircraft class can be attributed to the relatively higher velocity for this class in comparison to non-aircraft targets. As a result, other speed related features also exhibit higher variance and mean values for the aircraft class. Specifically, this relates to the variance in acceleration, the mean jerk, acceleration and speed features as shown in FIGS. 22a/22b, 24a/24b, 25a/25b and 26a/26b respectively. The mean speed feature histogram plot shown in FIGS. 26a and 26b confirms the notion that aircraft targets travel at higher velocities in comparison to non-aircraft targets, which consists mainly of birds for the dataset one and birds, AP and ground clutter for dataset three. It is observed that for this feature, the distributions across datasets are less consistent than those of other features, however, contradictory regions are not observed and classification is still feasible.

Figure 23A:
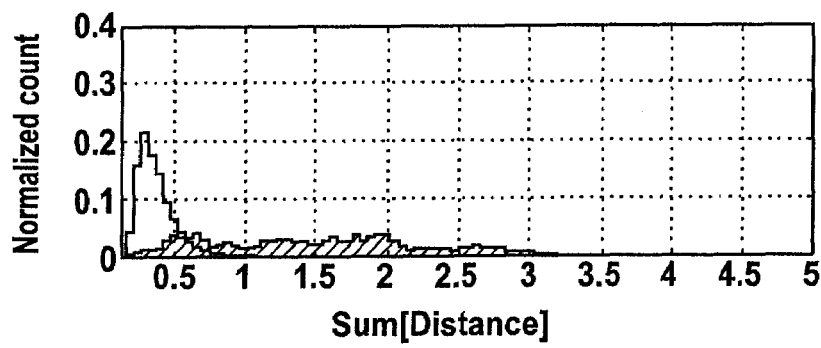
FIGS. 23a and 23b show normalized histograms of the sum_dist feature ($f_9$) for datasets one and three respectively
Figure 23B:
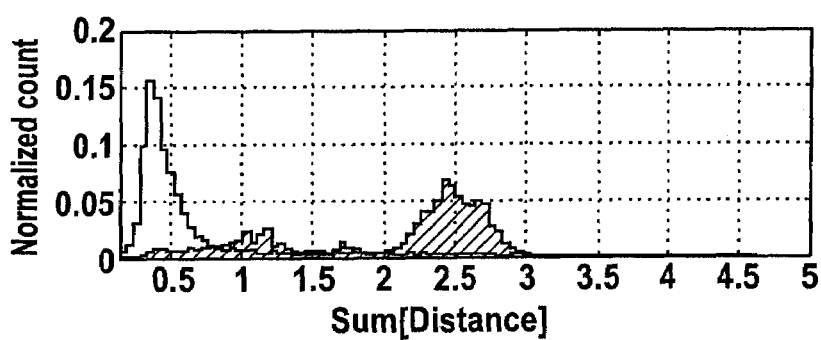
Figure 24A:
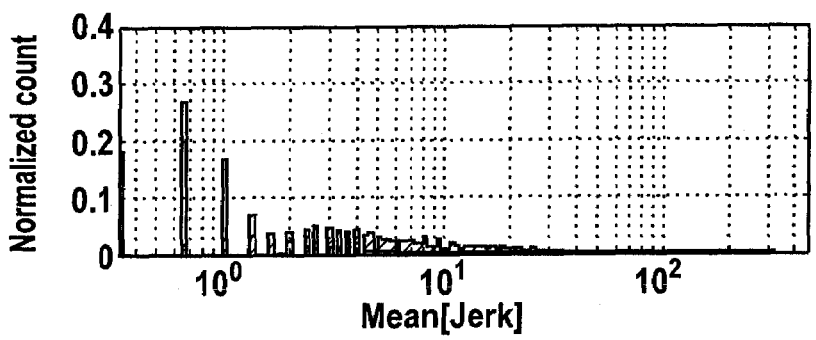
FIGS. 24a and 24b show normalized histograms of the avg_del2spd feature ($f_{10}$) for datasets one and three respectively with the solid red, and outlined blue histograms representing the aircraft and non-aircraft classes respectively.
Figure 24B:
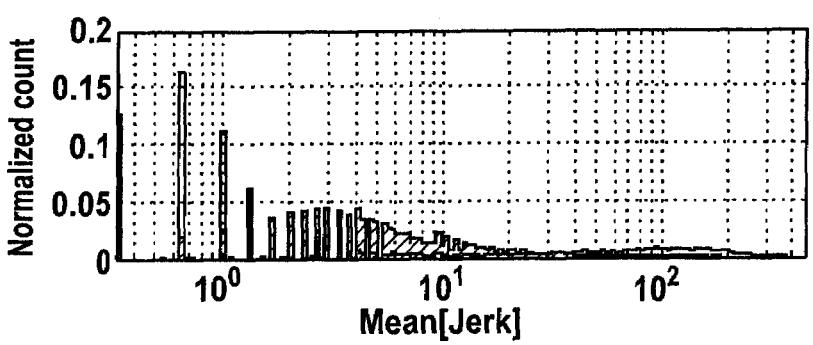
Figure 25A:
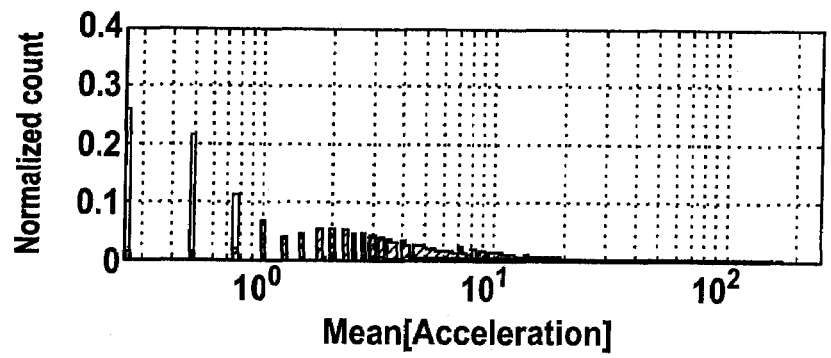
FIGS. 25a and 25b show normalized histograms of the avg_delspd feature ($f_{11}$) for datasets one and three respectively with the solid red, and outlined blue histograms representing the aircraft and non-aircraft classes respectively.
Figure 25B:
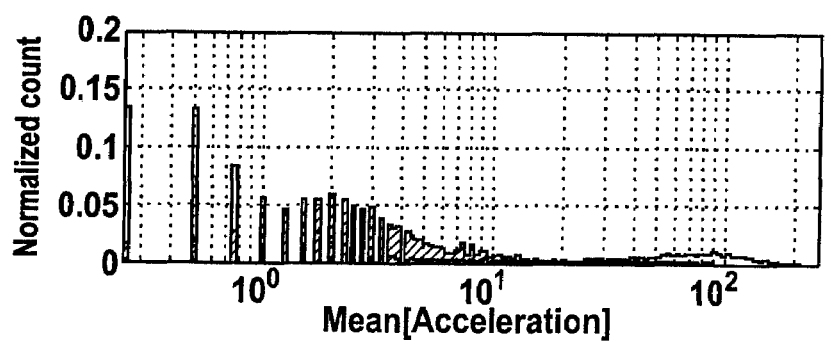
Figure 26A:
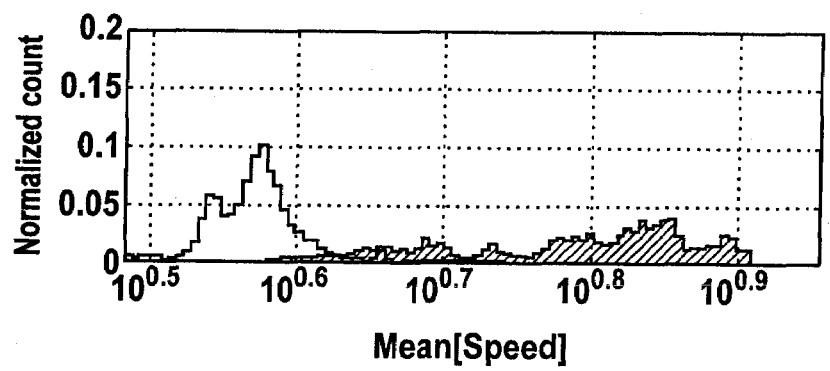
FIGS. 26a and 26b show normalized histograms of the avg_spd feature ($f_{12}$) for datasets one and three respectively with the solid red, and outlined blue histograms representing the aircraft and non-aircraft classes respectively.
Figure 26B:
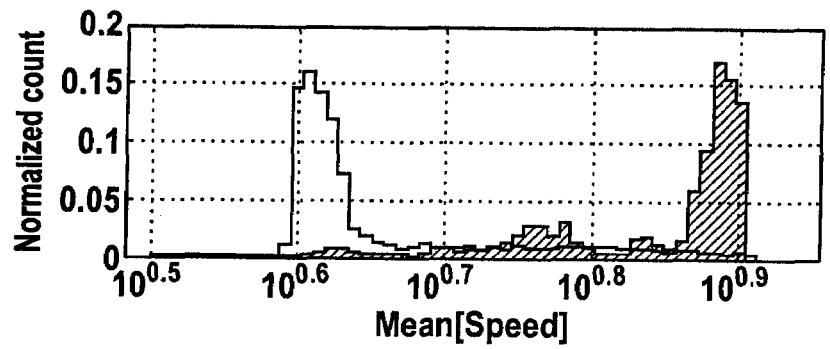
Figure 27A:
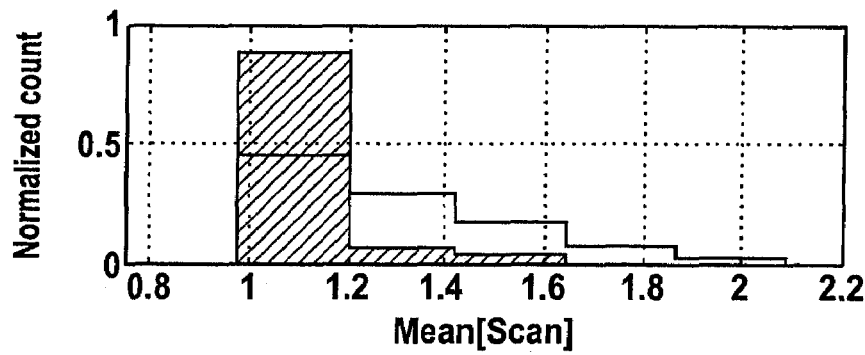
FIGS. 27a and 27b show normalized histograms of the avg_scan feature ($f_{13}$) for datasets one and three respectively with the solid red, and outlined blue histograms representing the aircraft and non-aircraft classes respectively.
Figure 27B:
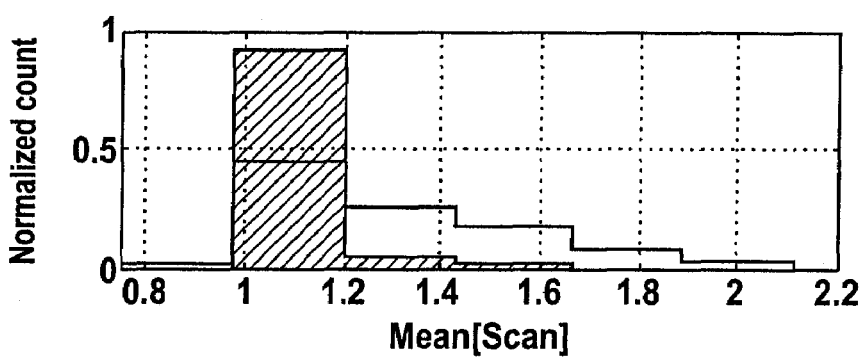

As expected from the higher velocity of aircrafts, the distance traveled by the target within a duration of a segment results in a larger sum for the aircraft class, with some overlap among the classes attributed to slower moving aircrafts. The feature histogram plot for the sum of distance traveled is shown in FIGS. 23a and 23b. It should be noted that for dataset three, although the aircraft targets are concentrated about the 2.5 nmi distance, in comparison to dataset one, the same range in distance is covered by the class. In comparison, the non-aircraft class has a consistent distribution among the two datasets.

The aircraft class consists of larger targets with transponders, which are more easily detected by the radar. As such, missed detections are less frequent for the aircraft class in comparison to the non-aircraft class as observed in FIGS. 27a and 27b.

Figure 28A:
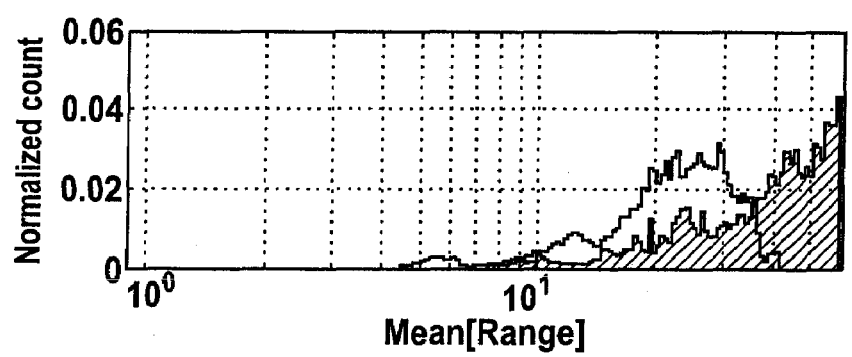
FIGS. 28a and 28b show normalized histograms of the avg_mg feature ($f_{14}$) for datasets one and three respectively with the solid red, and outlined blue histograms representing the aircraft and non-aircraft classes respectively.
Figure 28B:
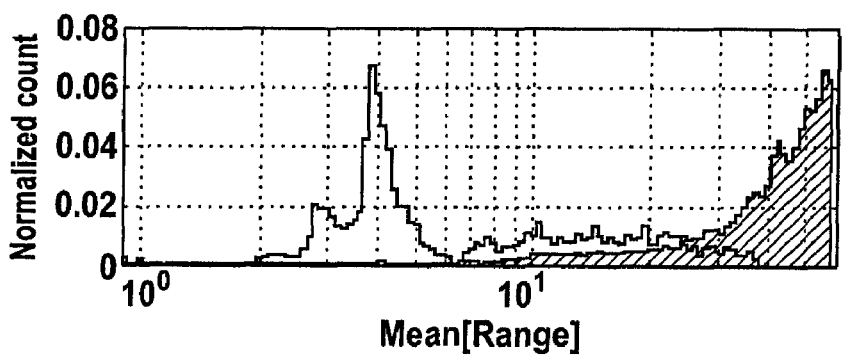
Figure 29A:
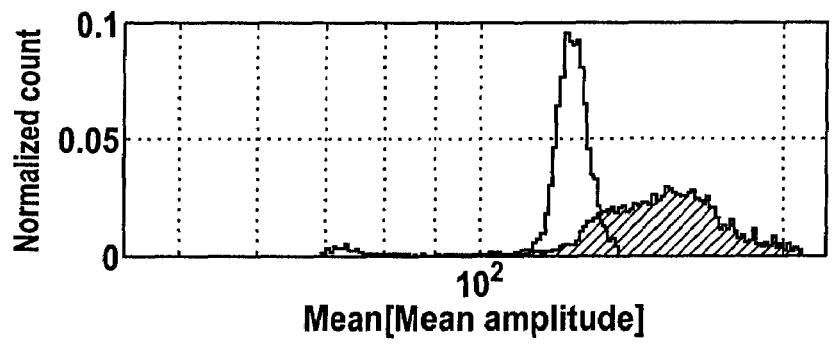
FIGS. 29a and 29b show normalized histograms of the avg_ma feature ($f_{15}$) for datasets one and three respectively with the solid red, and outlined blue histograms representing the aircraft and non-aircraft classes respectively.
Figure 29B:
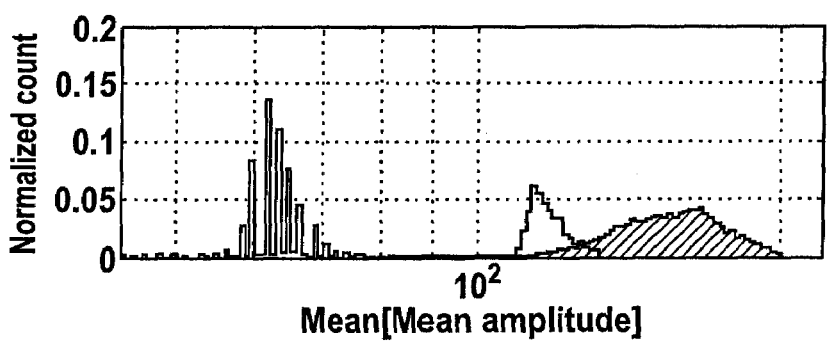
Figure 30A:
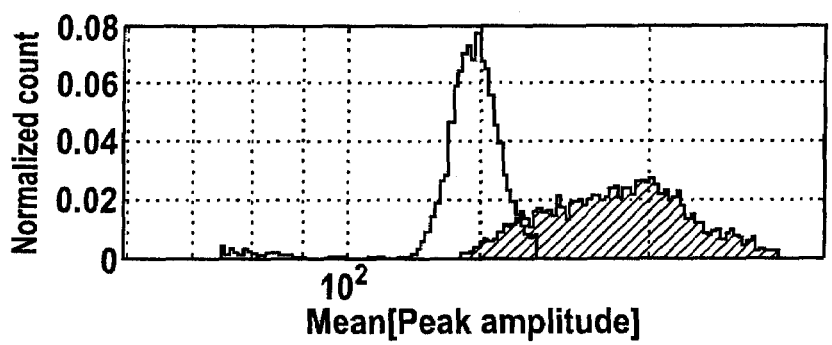
FIGS. 30a and 30b show normalized histograms of the avg_pa ($f_{16}$) feature for datasets one and three respectively with the solid red, and outlined blue histograms representing the aircraft and non-aircraft classes respectively.
Figure 30B:
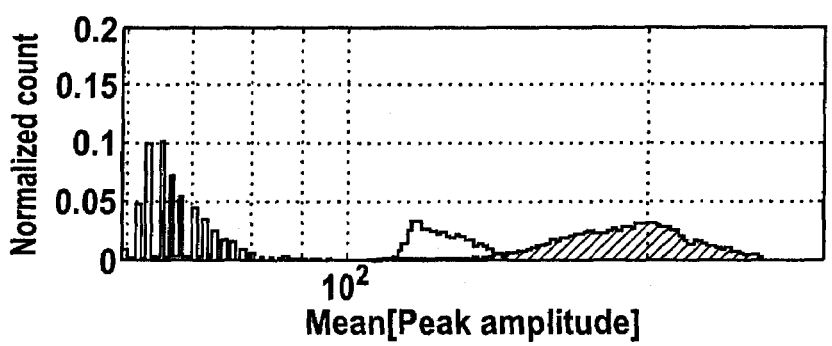
Figure 31A:
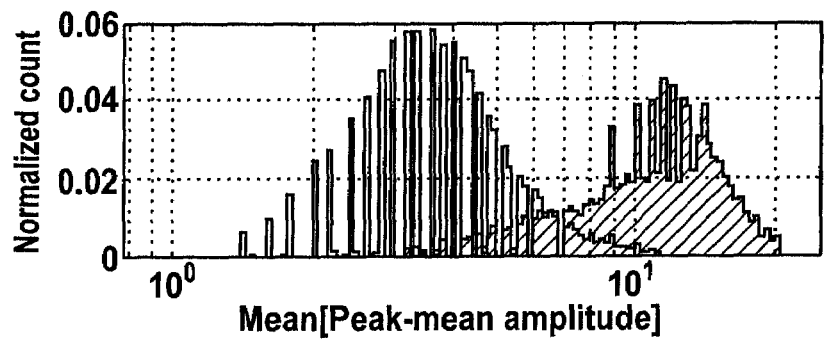
FIGS. 31a and 31b show normalized histograms of the avg_pa-ma feature ($f_{17}$) for datasets one and three respectively with the solid red, and outlined blue histograms representing the aircraft and non-aircraft classes respectively.
Figure 31B:
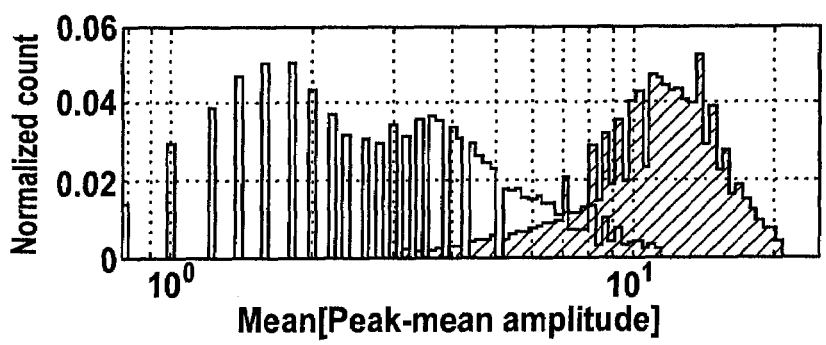
Figure 32A:
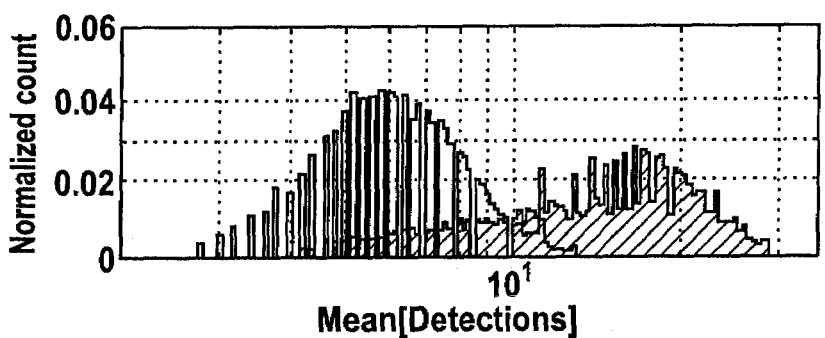
FIGS. 32a and 32b show normalized histograms of the avg_dts feature ($f_{18}$) for datasets one and three respectively with the solid red, and outlined blue histograms representing the aircraft and non-aircraft classes respectively.
Figure 32B:
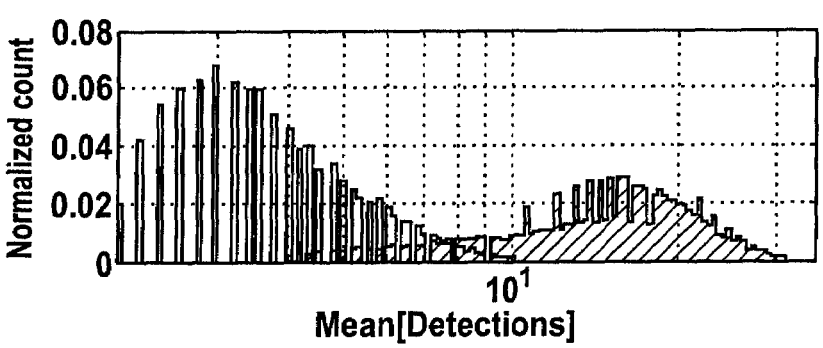

The type of non-aircraft has an influence on the mean range features as shown in FIGS. 28a and 28b, in which the non-aircraft class is undetected beyond a range of 41 nmi. This can also be attributed to the type of non-aircraft target observed in the dataset. Although the returns from birds or flocks of birds at long ranges may be detected by the radar, due to the presence of noise and the non-rigid form of the target (in the case of flocks), the targets may become untrackable.

For the cross sectional features, namely mean amplitude, peak amplitude and the number of detections combined to form a plot, the variance and mean of the features have observably inconsistent behaviour across the two datasets as shown in FIGS. 29a through 32b. This is attributed to the abundant presence of AP in dataset three. Specifically, two distributions can be observed for the non-aircraft class, with one corresponding to AP, and the other to the birds within the dataset.

It should be noted that although individual features may exhibit more or less discriminatory and consistent behaviour, it is the combination of features that determines the performance of a classifier. It may be the case that two features, each with overlapping class histograms, combine to form separable class clusters, whereas another two features with little overlap result in a combined feature space with some overlapping class clusters. In one exemplary implementation, the combination of three features will be described below. Although a select number of two feature combinations are shown herein, other combinations are possible.

FIGS. 33a through 36b extend the feature histogram plots to two features. As in the single feature case, the histograms have been normalized, however, only the class of interest, as labelled above each diagram, is shown in each plot. The overlap of clusters must be inferred by comparing histograms of the same features for the different classes. For instance, FIGS. 33a to 35b show feature combinations with some cluster overlap. Conversely, the histograms shown in FIG. 36a have poor separability as observed by the overlapped non-aircraft class by the aircraft class features, and are inconsistent with dataset three shown in FIG. 36b. These observations also help to validate the effectiveness of the proposed CPI.

Figure 33A:
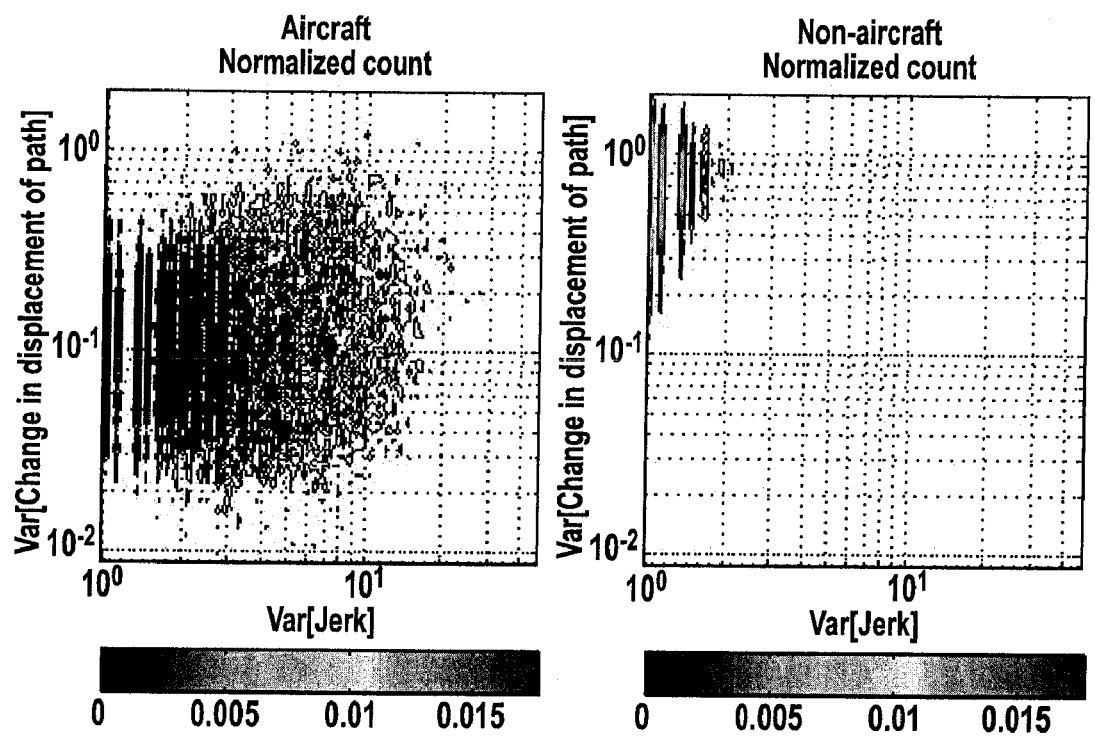
FIGS. 33a and 33b show normalized histograms of the var_spd feature ($f_8$) versus the var_delpth feature ($f_2$) for datasets one and three respectively.
Figure 33B:
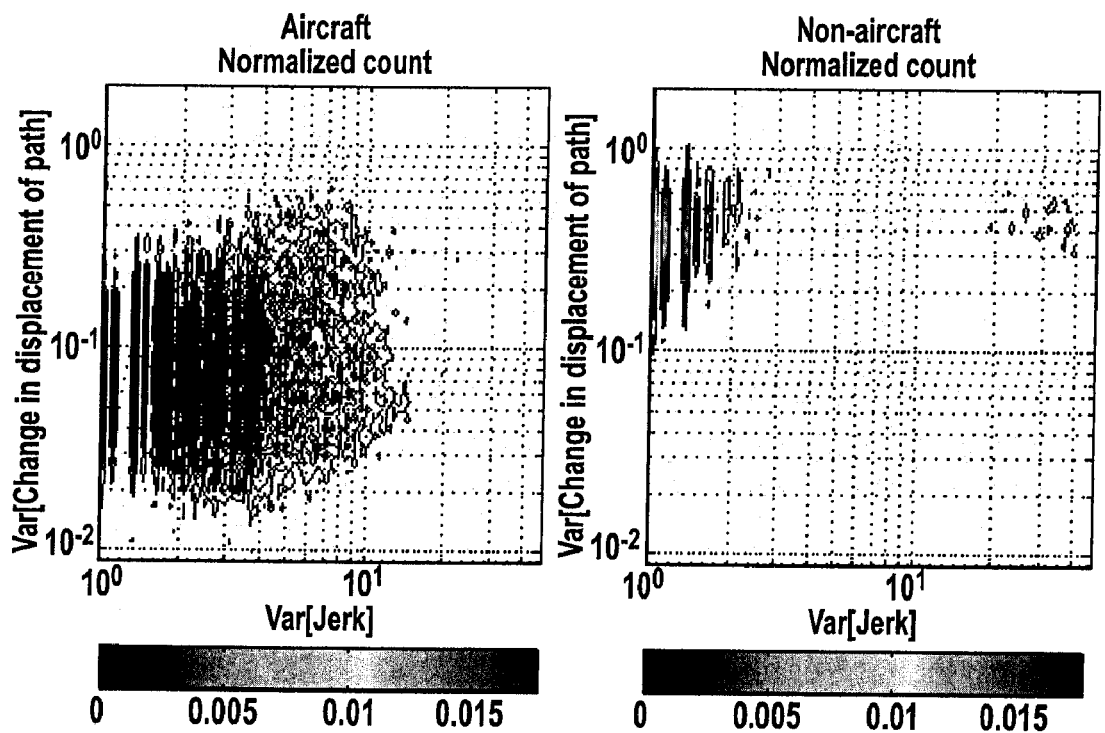
Figure 34A:
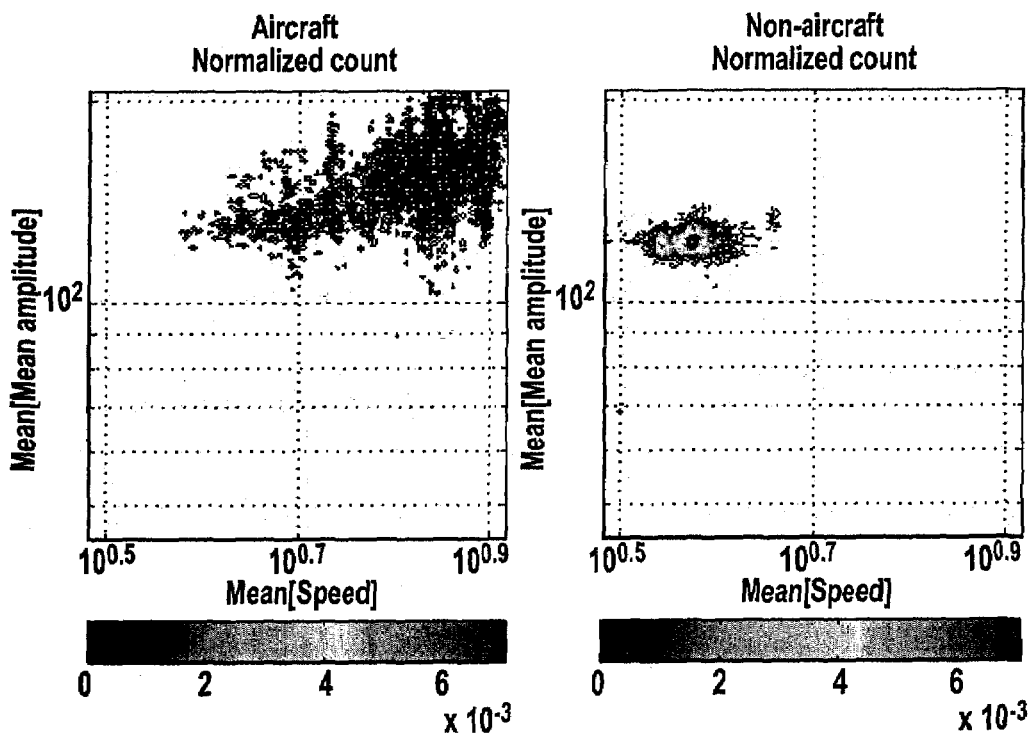
FIGS. 34a and 34b show normalized histograms of the avg_spd feature ($f_8$) versus the avg_ma feature ($f_{14}$) for datasets one and three respectively.
Figure 34B:
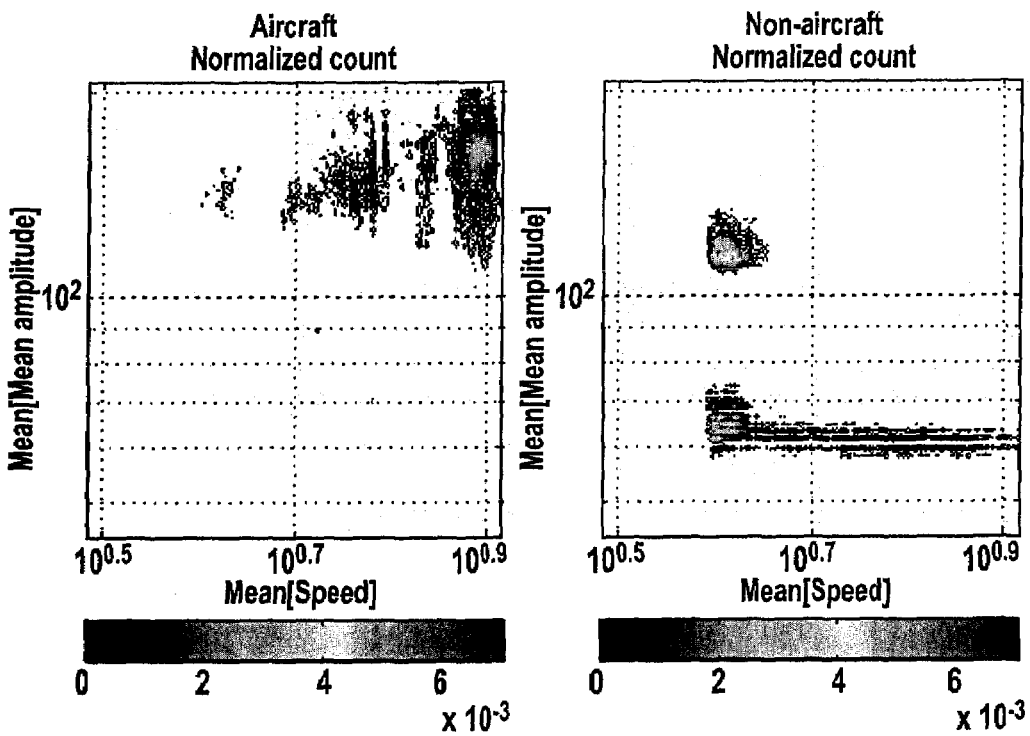
Figure 35A:
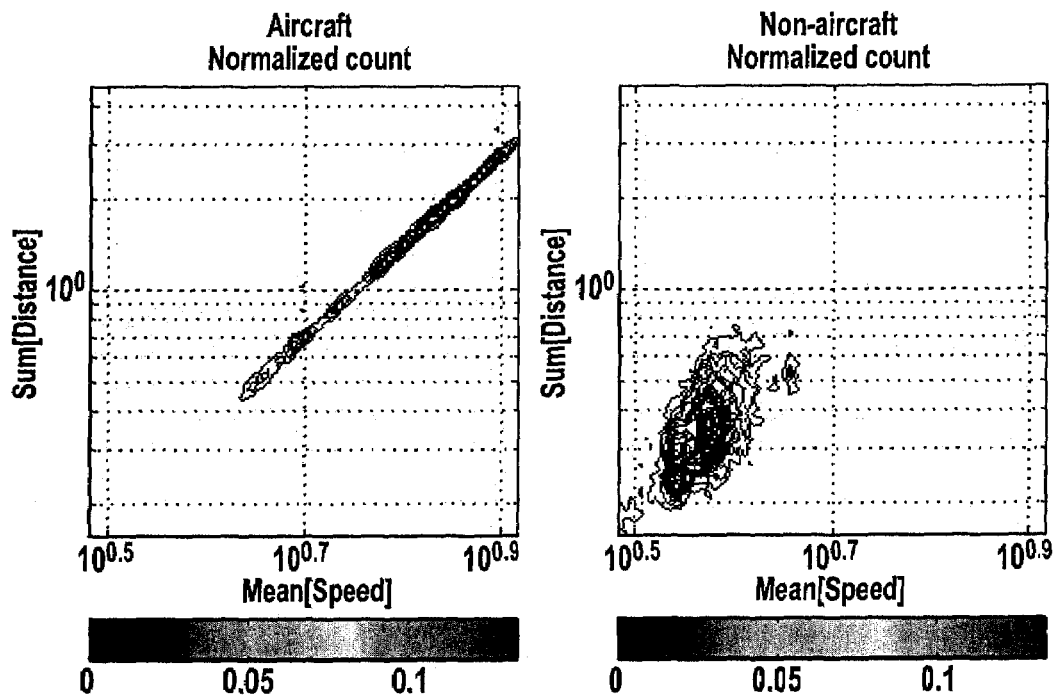
FIGS. 35a and 35b show normalized histograms of the avg_spd feature ($f_8$) versus the sum_dist feature ($f_5$) for datasets one and three respectively.
Figure 35B:
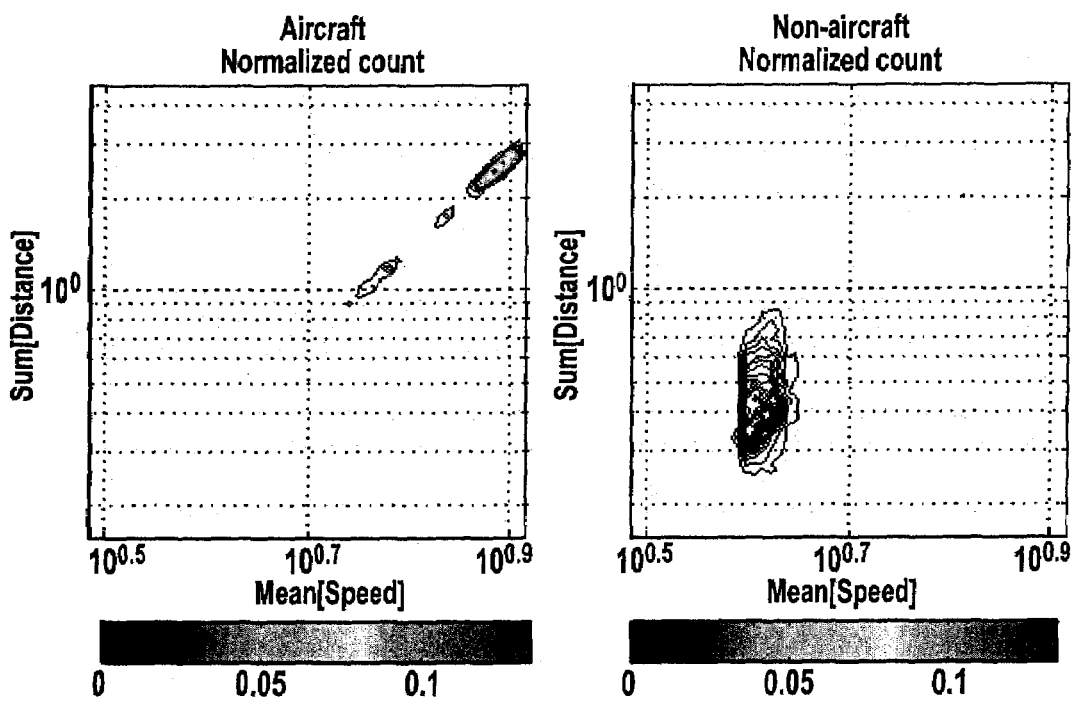
Figure 36A:
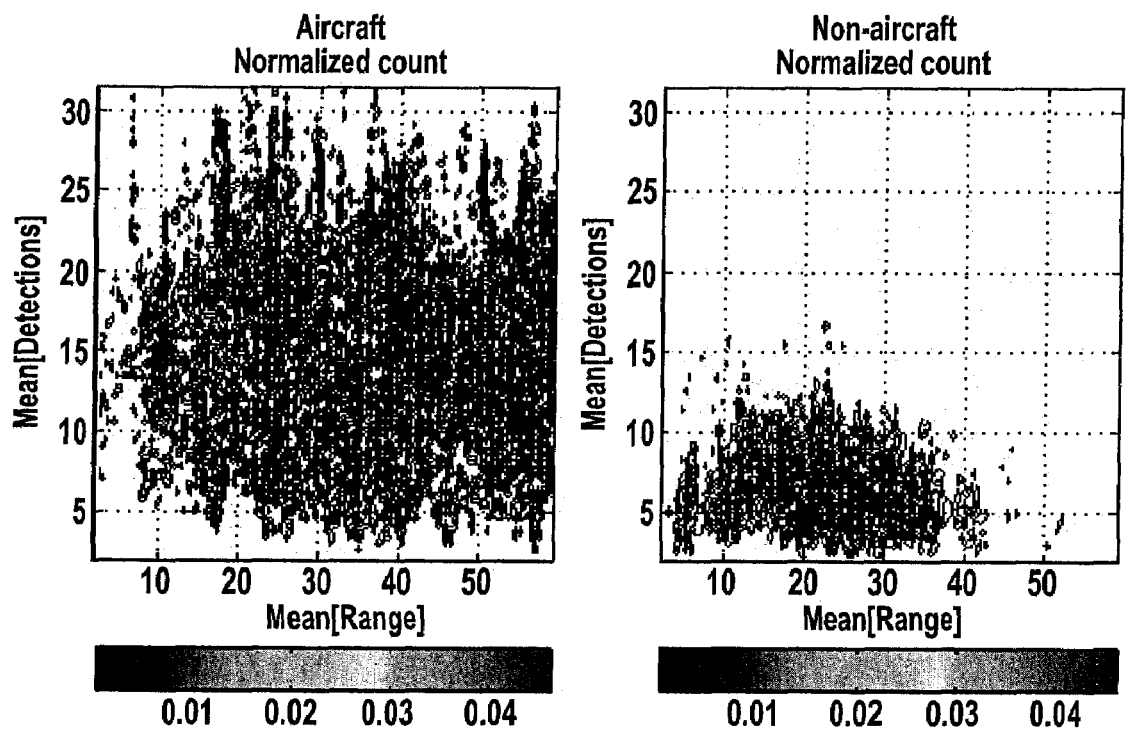
FIGS. 36a and 36b show normalized histograms of the avg_mg feature ($f_9$) versus the avg_dts feature ($f_{16}$) for datasets one and three respectively.
Figure 36B:
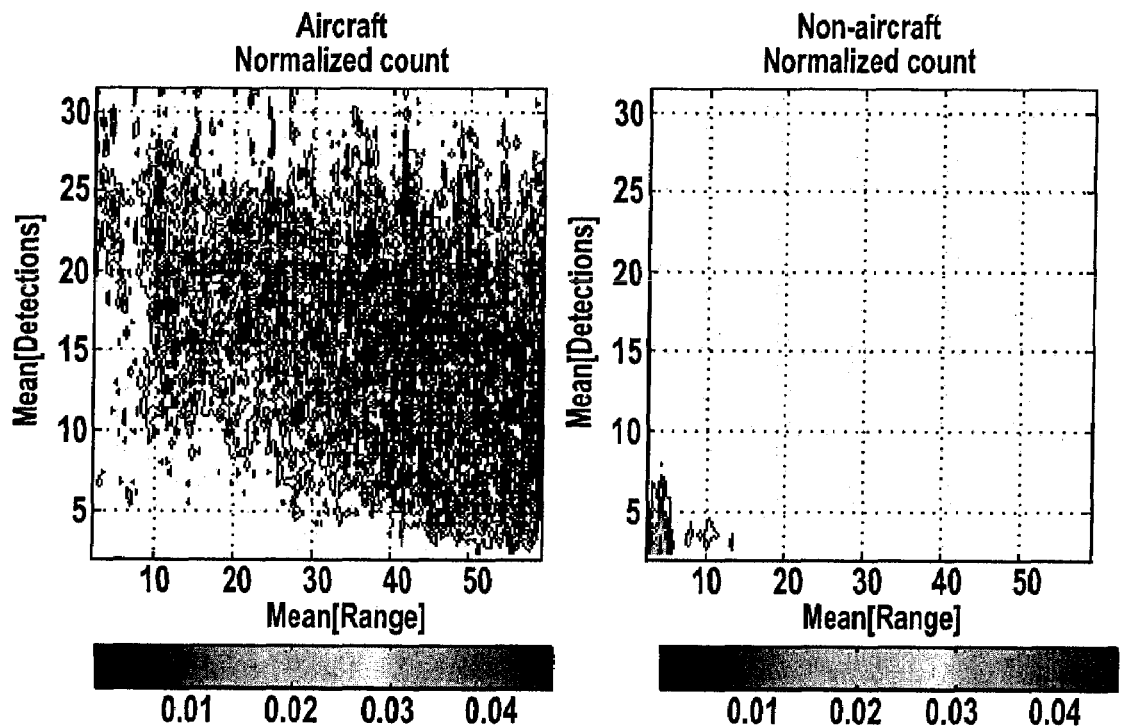

In FIGS. 33a and 33b, the cluster overlap in the variance of speed feature is shown to have improved separation with the inclusion of the variance in the change of displacement of path feature. The addition of a feature space cannot reduce separability or increase class overlap due to the orthogonal combination of the feature spaces. In the case of the combination shown in FIGS. 33a and 33b, improvement in the cluster separation and reduced overlap are evident, however, the combination of the mean of speed and mean of the mean amplitude features shown in FIG. 34a show very little improvement in separability in comparison to the mean speed feature alone. In contrast, FIG. 34b illustrates the case of improved separability over the mean of speed feature alone. FIGS. 35a and 35b show similar overlap to FIGS. 33a and 33b, whereas the separability is greatly improved. However, for the combination of the mean range and mean detection features shown in FIG. 36a, there is poor separability and a high degree of overlap for the classes. More notably, the non-aircraft class shows inconsistent behaviour among the datasets for the features shown in FIGS. 36a and 36b.

Figure 37A:
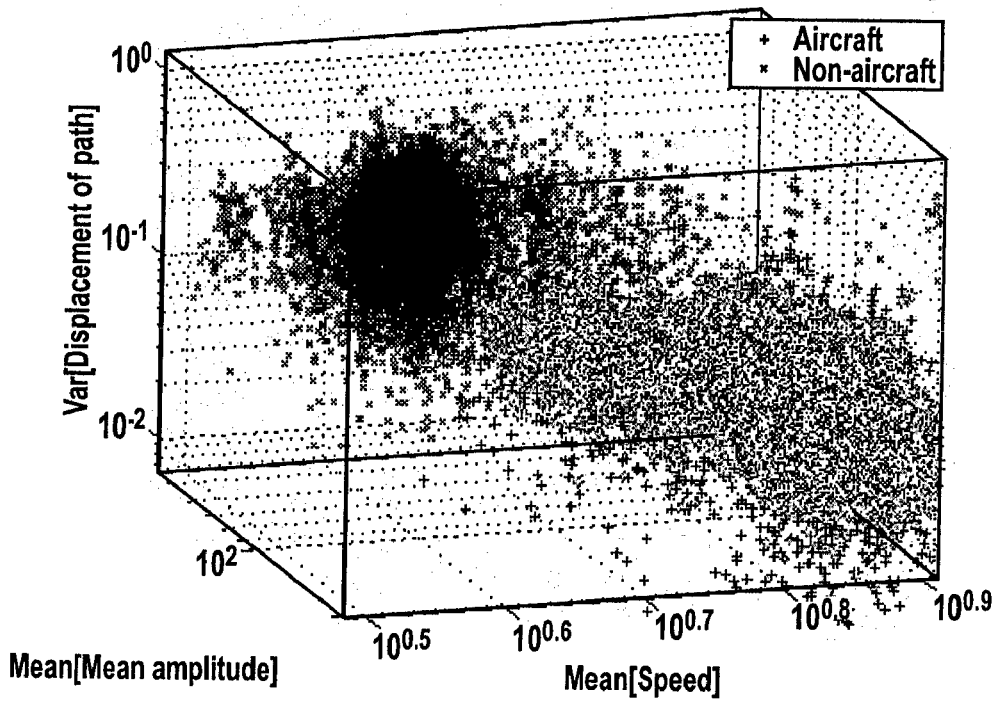
FIGS. 37a and 37b shows a Feature plot of the avg_spd feature ($f_8$) versus the avg_ma feature ($f_{14}$) and var_path feature ($f_1$) for datasets one and three respectively.
Figure 37B:
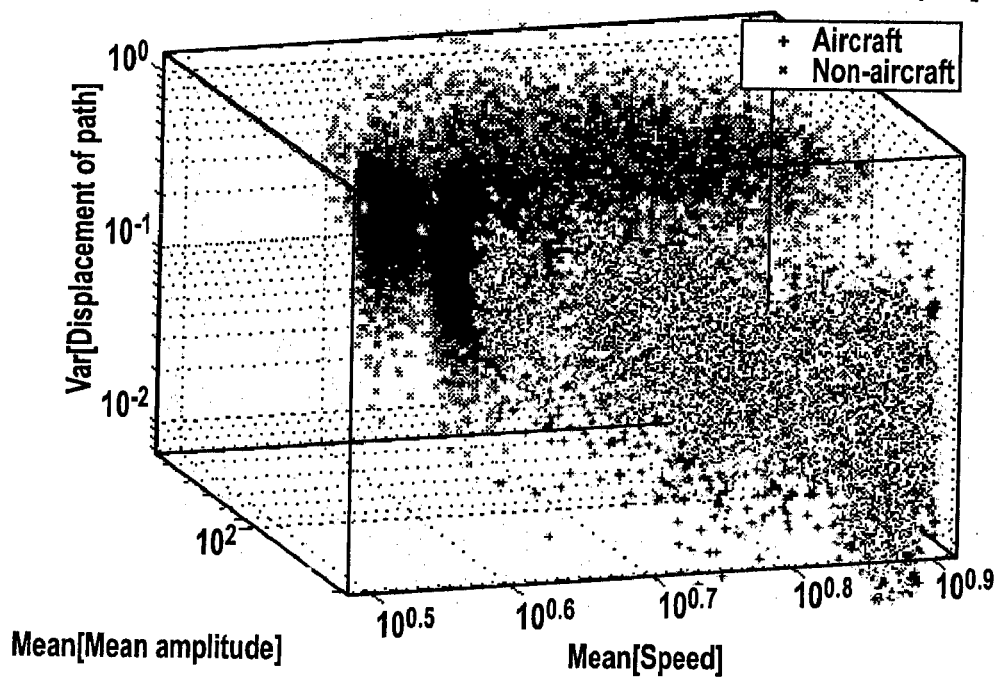

FIGS. 37a and 37b show the feature plots for three select features. In contrast to the histogram distribution plots presented in FIGS. 15 through 36, the feature distribution and class overlap must be inferred for the three feature plots. As shown, the feature combination exhibits good separability with slight overlap. This feature combination can be evaluated using the proposed $CPI_2$.

Figure 38:
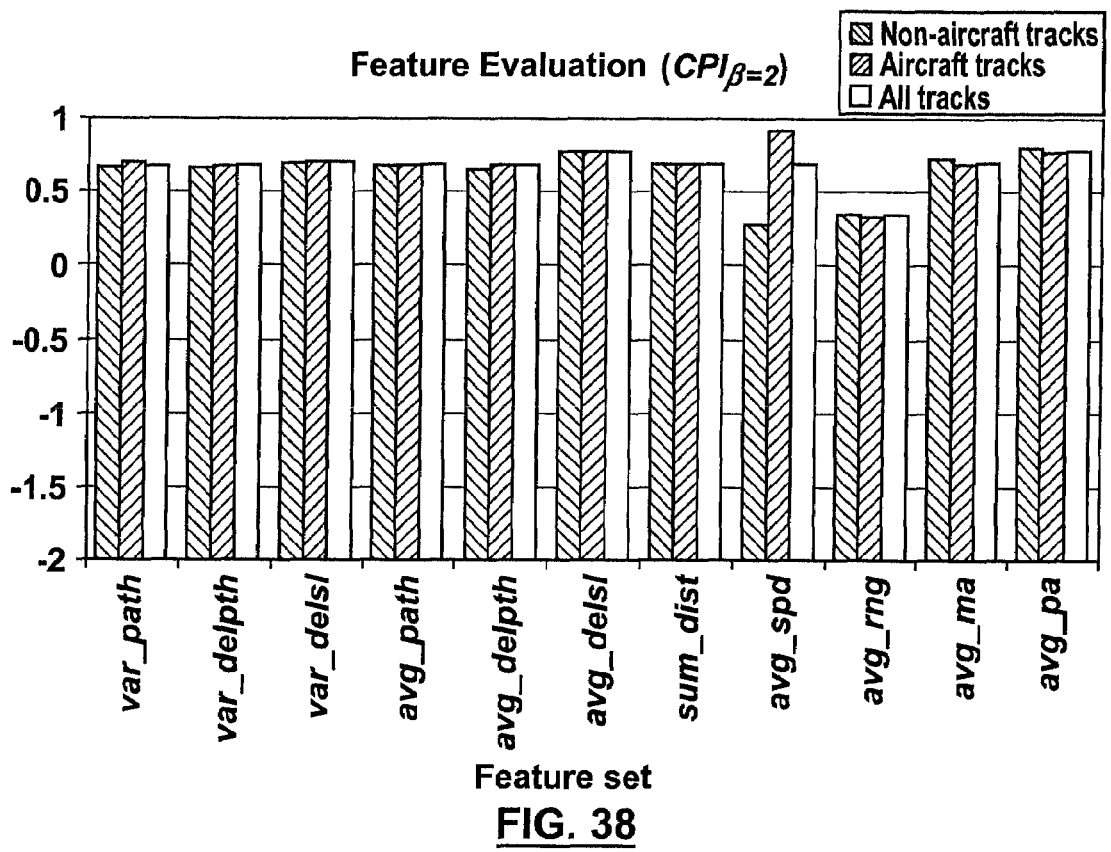
FIG. 38 shows a plot of $CPI_2$ values for various individual features.
Figure 39:
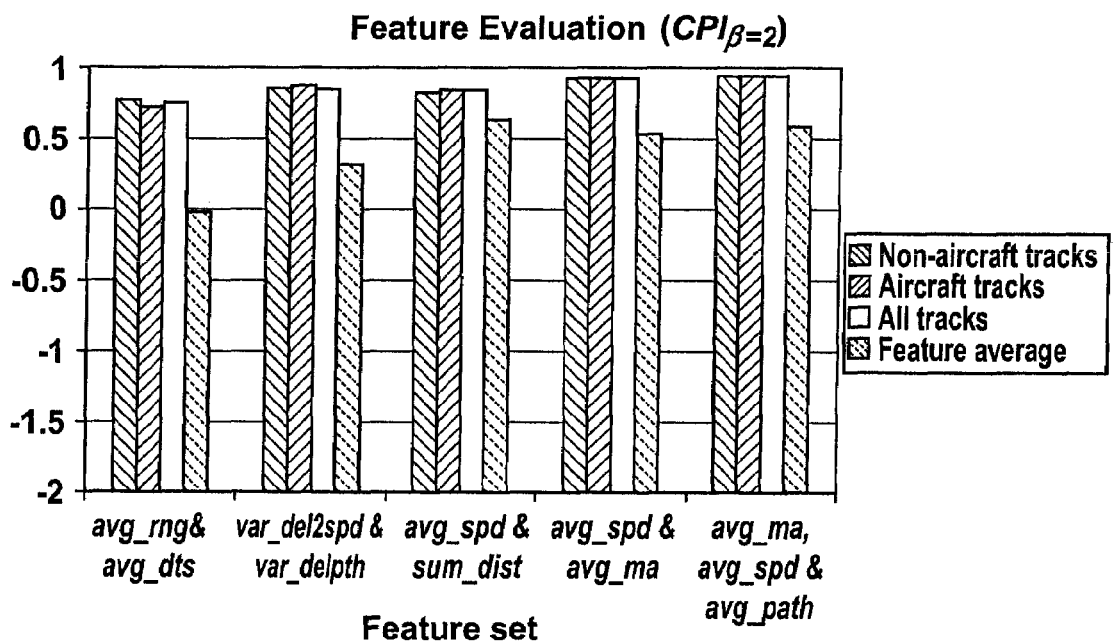
FIG. 39 shows a plot of $CPI_2$ values for various combinations of features.
Figure 40:
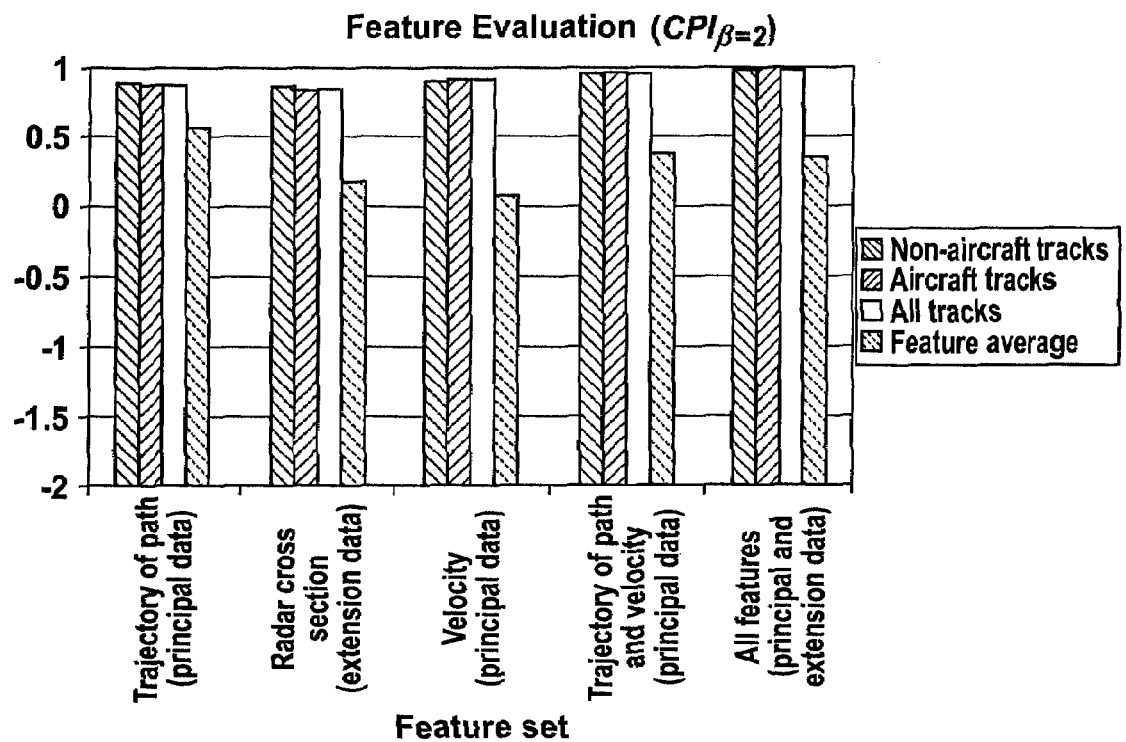
FIG. 40 shows a plot of $CPI_2$ values for various feature sets.
Figure 41:
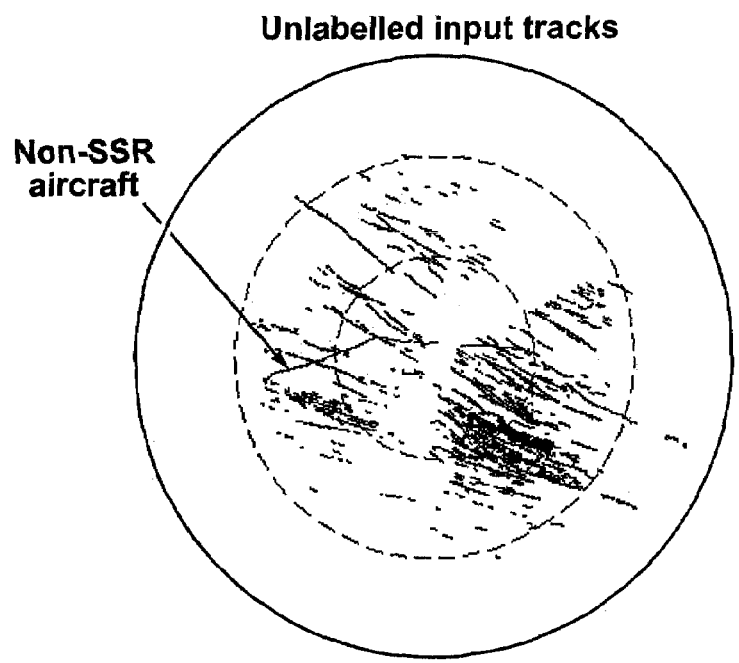
FIG. 41 shows PSR-solo tracks for dataset one.
Figure 42:
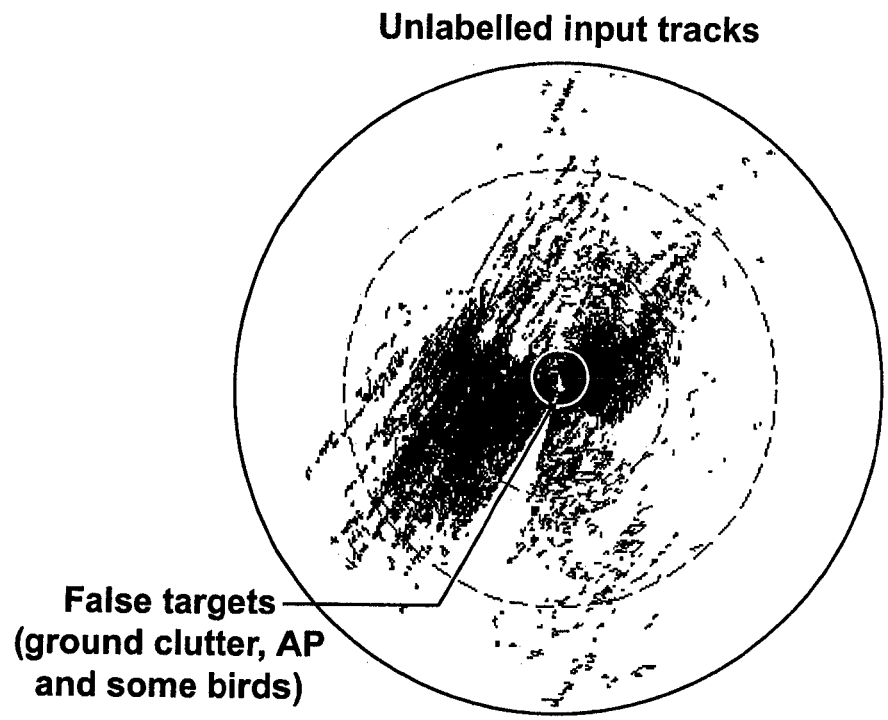
FIG. 42 shows PSR-solo tracks for dataset two.

Feature evaluation was performed to obtain $CPI_2$ values for individual features, feature combinations, and various feature sets as shown in FIGS. 38 to 40 respectively. For individual features, combination of features, and feature sets that include any extension derived features, segments without extension data are excluded in the $CPI_2$ calculation. This applies namely to features $f_{15}$ through $f_{18}$, and thus also to the all features and radar cross section sets, resulting in the exclusion of up to 45% of aircraft track segments in the datasets. This limitation only applies to feature evaluation from labeled data. In the case of an unknown track, the lack of extension data implies an SSR source, and thus it is definitively known that the target is in fact an aircraft. To illustrate feature evaluation without exclusion of any track segments, all principal sourced features have been combined into the Trajectory of path and velocity set shown in FIG. 40. In addition, by formally defining the function C(F) as the $CPI_2$ calculation on a combination of features F, where $F=[F_{l_1}, F_{l_2} \ldots F_{l_n}]$ and $\{l_i, i=1 \ldots n\} \subseteq \{1 \ldots 18\}$, herein defined, $$C(F)=C([F_{l_1} F_{l_2} \ldots F_{l_n}]) \tag{64}$$

comparisons can be made on the feature average, $$\overline{C_F} = \frac{1}{n}\sum_{i=1}^{n} C(F_{l_i}) \tag{65}$$

for the features under consideration.

The experimental results in FIGS. 38 through 40 show that principal features outperform extension derived features. However, the inventors have found that the combination of all features results in the most distinguishing feature set, indicating the robustness of the feature sets in capturing the unique characteristics of the data. This is further supported by observing that all combination of features shown outperform their individual constituents when comparing C(F) to the feature average, $\overline{C_F}$. More specifically, the $CPI_2$ for all observed feature sets well outperform the mean of $CPI_2$ values for individual features.

In one implementation, based on the experimental results shown herein, a non-linear SVM using the radial basis function kernel outlined in equation set 41 may be used to implement the classifier stages 62 and 66. Using a non-linear SVM to implement the classifier stages 62 and 66 should allow for non-linearly separable data to be classified better than by means of a linear classifier. Further, based on the experimental results herein, the SVM parameters have been empirically set to the values shown in Table 8. The values chosen provided good overall performance, without undue bias towards a single class.

TABLE 8

SVM parameters

| Parameter | Value | Description |
|---|---|---|
| σ | 2 | RBF kernel parameter |
| C | 1 | SVM control parameter |

The training procedure for the SVM classifiers 62 and 66 used to generate the experimental results is as outlined previously. The results presented herein have been obtained by randomly selecting a portion of the dataset for training with the remaining data left for testing the classifiers 62 and 66 in the case of test configuration 1, and distinct training sets for test configurations 2 through 4. This process has been repeated for random and independent iterations to obtain statistically reliable results as outlined in Table 9.

TABLE 9

Training and testing configuration parameters

|  | Config. 1 | Config. 2 | Config. 3 |
|---|---|---|---|
| Training set | Dataset one | Dataset one | Dataset one |
| Proportion of aircraft in training set | 25% | Up to 1000 segments | Up to 1000 segments |
| Proportion of non-aircraft in training | 25% | Up to 1000 segments taken | Up to 1000 segments taken |

TABLE 9-continued

Training and testing configuration parameters

|  | Config. 1 | Config. 2 | Config. 3 |
|---|---|---|---|
| set |  | from 250 random tracks | from 250 random tracks |
| Testing set | Dataset one | Dataset two | Dataset three |
| Proportion of aircraft in testing set | 75% | 100% | 100% |
| Proportion of non-aircraft in testing set | 75% | 100% | 100% |
| Iterations | 100 | 100 | 100 |

Figure 43:
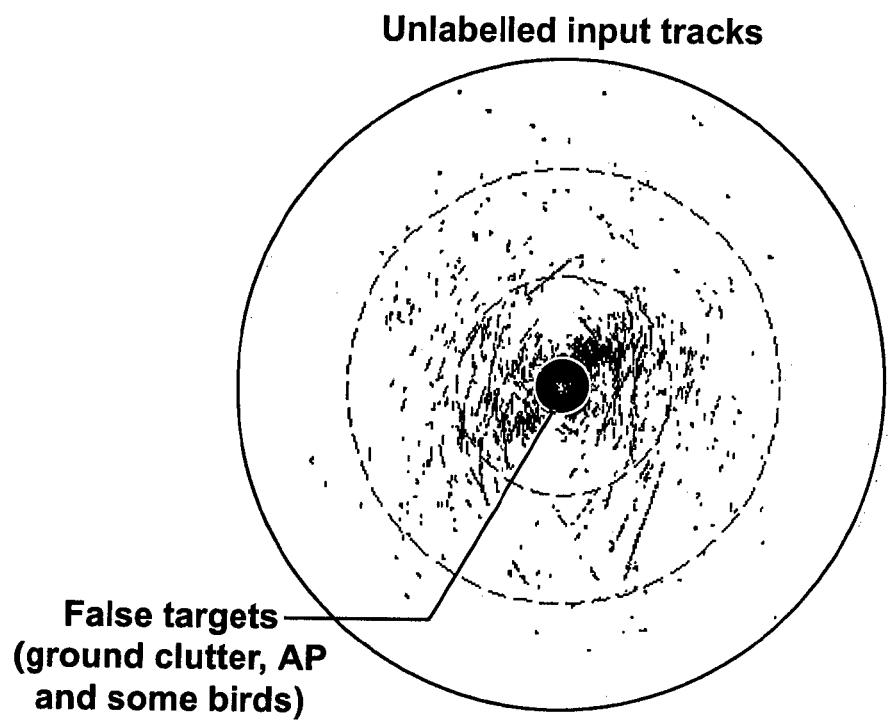
FIG. 43 shows PSR-solo tracks for dataset three.

To illustrate the behaviour of PSR-solo targets encountered in each dataset, time-elapsed track history plots have been generated as shown in FIGS. 41 to 44. In dataset one shown in FIG. 41, the PSR-solo targets appear to be migratory birds with the exception of one non-transponder aircraft track as indicated. The bird tracks possess a consistent heading indicative of migratory flight behaviour. For dataset two shown in FIG. 42, the PSR-solo data is typical of small birds and insects. Also as indicated in the figure, data from 0.25 nmi to 6.5 nmi are mainly attributed to false targets due to ground clutter and AP with some birds. It should be noted that the false targets generated by the short pulse Sensitivity Time Control (STC) steps exhibit themselves as rings within the 6.5 nmi range. These false targets become more evident in dataset three as shown in FIG. 43. The remainder of the PSR-solo tracks within this dataset can be attributed to large birds. Finally, FIG. 44 shows PSR-solo tracks belonging to birds within the regions outlined in the figure for dataset four.

As previously mentioned, these dataset are useful candidates for facilitating pattern analysis whereby ground truth can be reasonably inferred from the data by the presence of SSR data. Although this assumption fares well for these datasets, it may not be valid for other datasets. As such, ground truth may need to be established for subsequent training sets by other means, including manual classification. As an exercise to examine the robustness of the classifier 24 based on dataset four, the trained classifier 24 was tested against unlabelled data from other sources, and the classification results are presented herein as track labels in the form of probability values.

Figure 45C:
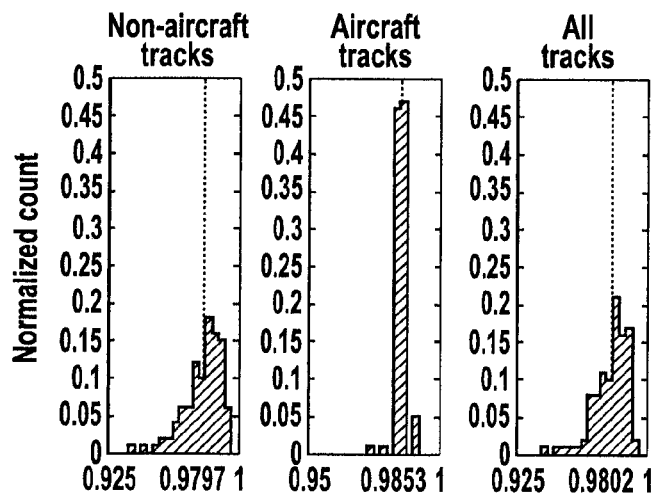

The evaluation of the experimental results is based on the correct recognition rate of entire tracks within the dataset. As such, classification of a track is taken as the accumulated result obtained after an entire track is processed by the classifier 24. In terms of the track label for a given track, this is represented by:

$$Y_{iT} = \text{sign}\left(\sum_{t=T_0}^{T_1} \sum_{j=1}^{2} [\theta_{it} k_j + (1 - \theta_{it})(2 - j)] y_{ijt}\right) \quad (66)$$

where the relative proportion of the features used are 0.778 for $k_1$ and 0.222 for $k_2$, $T_0$ represents the time instant of the first track segment, and $T_1$ is the time instant of the last segment for the track. The relative proportion of the features may be tuned for other embodiments for making the classifier 24 more sensitive to identifying certain types of target tracks. This is equivalent to equation 53 given $y_{ijt}$ is zero outside of this interval (i.e. $y_{ijt}=0$ for $t \notin [T_0, T_1]$). Histograms of individual class and overall correct recognition rates are shown in FIGS. 45a to 45c. The mean recognition rates are indicated on each normalized histogram and summarized in Tables 10 through 13 along with the standard deviation and range of recognition rates. For results for each configuration shown, the range values have been given for all recognition rates, [0,100], and after ignoring the highest and lowest 10% of values, [10,90].

TABLE 10

Recognition rate statistics for data configuration 1

| Track Class | Mean | Standard Deviation | Percentile Range [0, 100] | [10, 90] |
|---|---|---|---|---|
| Aircraft | 96.86% | 1.6229 | [89.62%, 98.91%] | [94.54%, 98.91%] |
| Non-aircraft | 99.14% | 0.3159 | [98.12%, 100.0%] | [98.65%, 99.55%] |
| All | 98.48% | 0.4874 | [96.33%, 99.68%] | [97.93%, 99.04%] |

TABLE 11

Recognition rate statistics for data configuration 2

| Track Class | Mean | Standard Deviation | Percentile Range [0, 100] | [10, 90] |
|---|---|---|---|---|
| Aircraft | 98.70% | 0.0908 | [98.06%, 98.71%] | [98.71%, 98.71%] |
| Non-aircraft | 95.74% | 0.9360 | [92.56%, 97.57%] | [94.72%, 96.94%] |
| All | 95.83% | 0.9067 | [92.75%, 97.59%] | [94.84%, 97.00%] |

TABLE 12

Recognition rate statistics for data configuration 3

| Track Class | Mean | Standard Deviation | Percentile Range [0, 100] | [10, 90] |
|---|---|---|---|---|
| Aircraft | 98.53% | 0.2787 | [97.46%, 99.15%] | [98.31%, 98.73%] |
| Non-aircraft | 97.97% | 1.0861 | [93.82%, 99.44%] | [96.57%, 99.18%] |
| All | 98.02% | 0.9905 | [94.18%, 99.38%] | [96.75%, 99.11%] |

Figure 46:
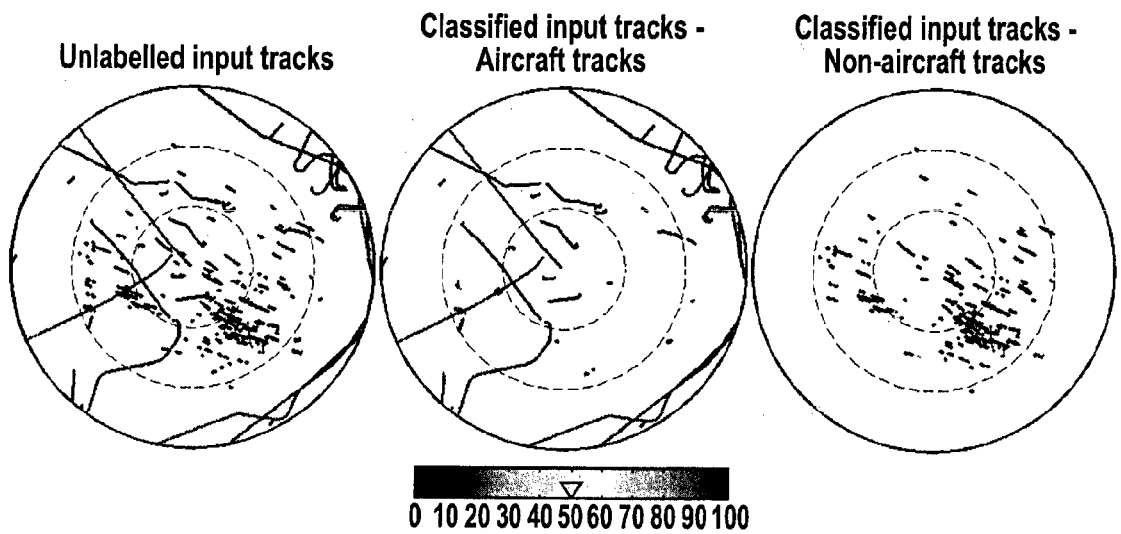
FIG. 46 shows classification results for a subset of input tracks for data configuration 1.
Figure 47:
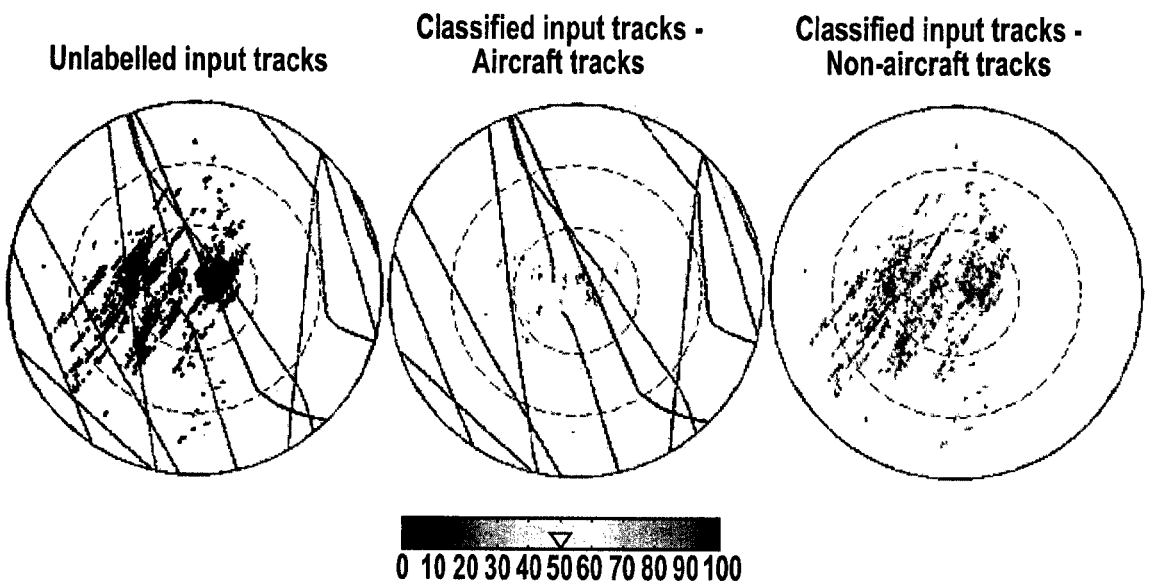
FIG. 47 shows classification results for a subset of input tracks for data configuration 2.
Figure 48:
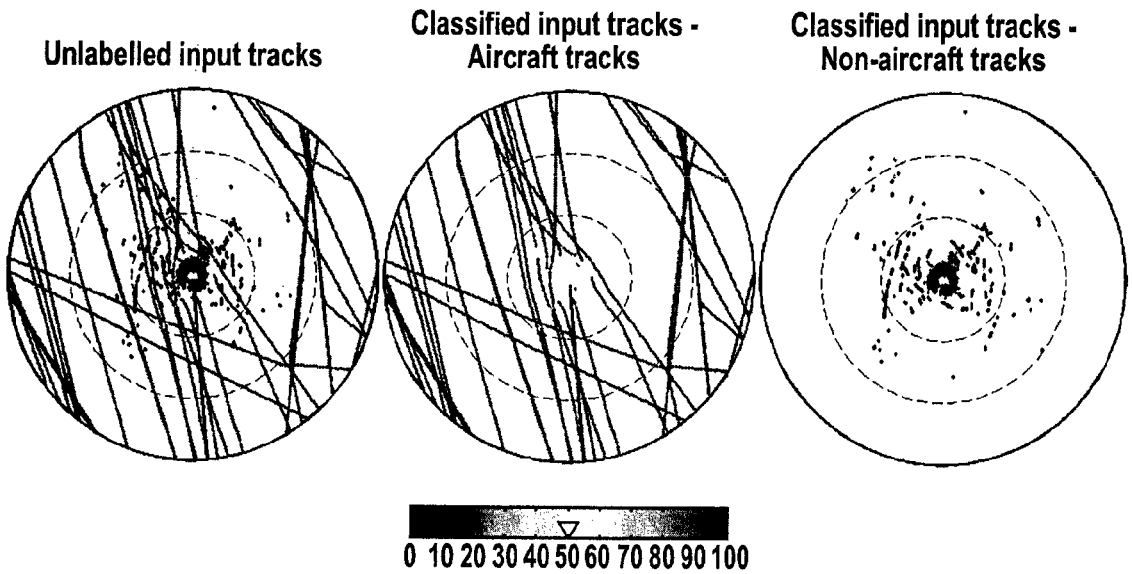
FIG. 48 shows classification results for a subset of input tracks for data configuration 3; and, FIGS. 49a, 49b, and 49c show misclassified aircraft and non-aircraft tracks for data configuration 1, data configuration 2, and data configuration 3 respectively.

FIG. 46 shows a randomly selected 25% subset of the tracks in the dataset with the corresponding classification results for configuration 1. Similarly, FIGS. 47 through 48 show the same results for a random 10% subset of configurations 2 through 4 respectively. In each case, a subset of the dataset has been selected to help in the presentation of the results without excessive obstruction of tracks due to congestion. In the figures, the color bar represents the degree of conformity to aircraft behaviour with 100 representing a classified aircraft track and 0 representing a classified non-aircraft track. Tracks classified as non-aircraft have lower colour value as indicated on the colour bar, and may be shown on a separate radar screen. The classification is based on a threshold value, which has been set at 50, for example, in this case. Other values may also be used for the classification. As shown by the experimental results for configuration 1 in Table 10, the mean recognition rates for the classes are in excess of 98% with low variance.

The false acceptance rate for a class is inferred by the incorrect recognition rate of the opposite class, and the false rejection rate inferred by the incorrect recognition rate of the class itself. The results favour the intended task of identifying aircraft. Specifically, the aircraft class has a false rejection rate of 3.14%, and a false acceptance rate of 0.86%. The relatively higher false acceptance rate is permissible when classifying to suppress excess tracks, since possible aircraft-like tracks will not be discarded. The false acceptance and rejection rates for all configurations are summarized in Table 13.

TABLE 13

False acceptance and rejection rates for the aircraft class

| | Data Configuration | | |
|---|---|---|---|
| Metric | 1 | 2 | 3 |
| False acceptance rate | 0.86% | 4.26% | 2.03% |
| False rejection rate | 3.14% | 1.30% | 1.47% |

The moderate false acceptance rate for data configurations 2 and 3 may be attributed to the presence of false tracks within the datasets resulting in non-SSR sourced high speed tracks, which are classified as behaving more closely to aircraft. These observations may change based on improved feature lists.

It is also observed that some non-aircraft tracks can arguably belong to a small aircraft or a large flock of birds, whereas the remaining tracks are too short to belong to any aircraft. It should be noted that the total length of an active track is unknown a priori and as such a criteria for the minimum length of a track cannot be used in classification, as it would not be applicable for a real-time system. For misclassified aircraft tracks, the short-lived or highly maneuvering behaviour is evident.

Figure 49A:
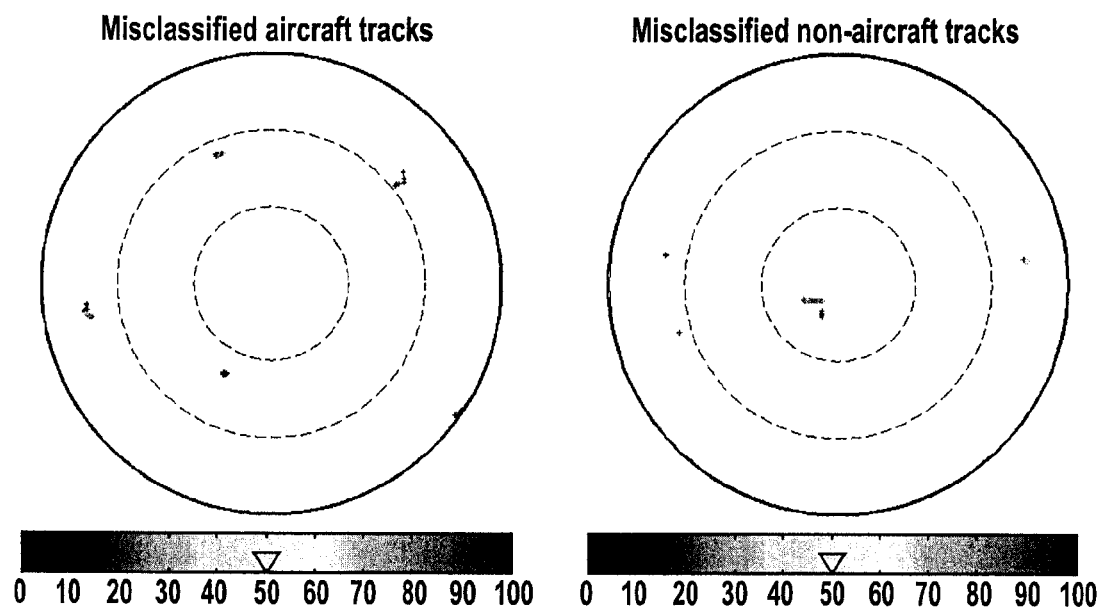
Figure 49B:
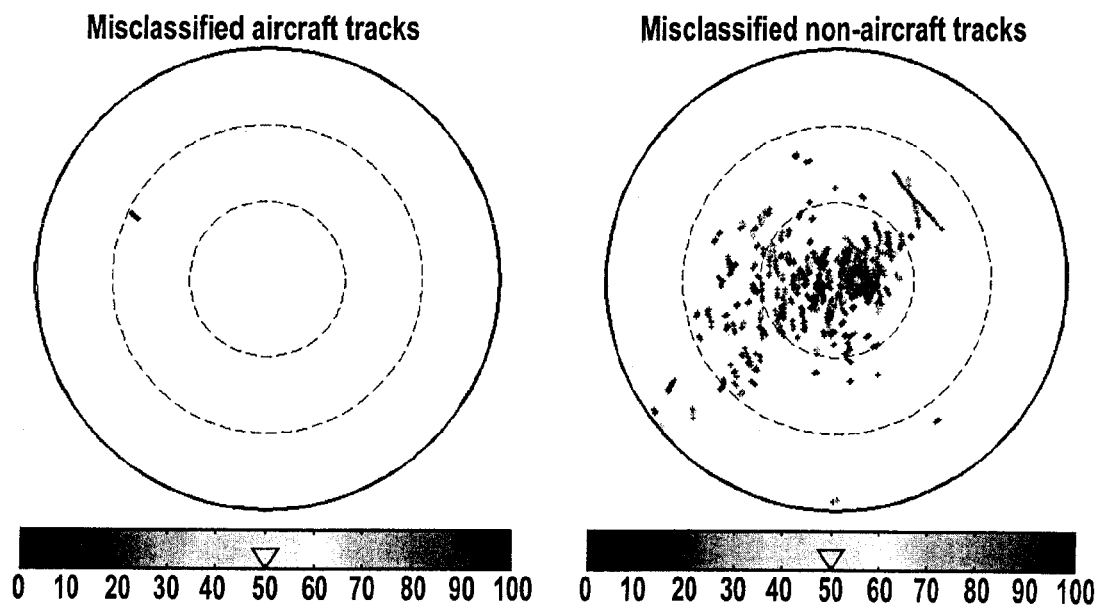
Figure 49C:
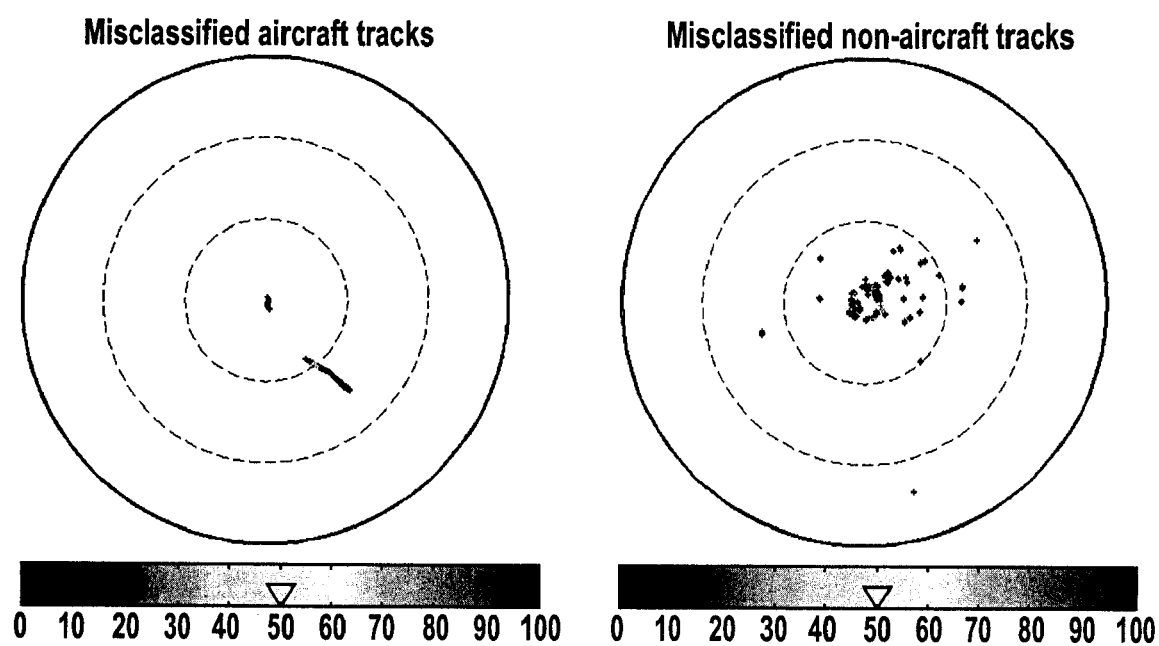

FIGS. 49a, 49b, and 49c show that the misclassified tracks appeared in at least 30% of the total trials. The color bar in these Figures represents the degree of nonconformity to the actual behaviour of the class, with 100 representing a misclassified track and 0 representing a correctly classified track. An exemplary threshold of 50 has been used in this exemplary implementation to distinguish between true and false classification. Misclassified aircraft tracks are inferred by the presence of SSR data, whereas misclassified non-aircraft tracks are inferred by the absence of SSR data, as shown for data configuration 1 (FIG. 49a), data configuration 2 (FIG. 49b), and data configuration 3 (FIG. 49c).

The experimental classification results provide good evidence that machine target classification is viable and can work in real time. An SVM-based classifier only requires support vectors to be saved and thus represents a data reduction from the original training set. This also reduces memory requirements during classification. The datasets used have provided a means of instantiating ground truth using SSR data, however in working with other datasets, other means to determine ground truth may be required.

The elements of the radar system 10 described herein may be implemented through any means known in the art although the use of dedicated hardware such as a digital signal processor may be preferable. Alternatively, discrete components such as filters, comparators, multipliers, shift registers, memory and the like may also be used. Furthermore, certain components of the radar system 10 may be implemented by the same structure and augmented to operate on different data such as providing a single classification stage that performs processing of the extension and principal feature processing stages 60 and 64, as well as the extension and principal classifier stages 62 and 66. The elements of the radar system 10 disclosed herein may also be implemented via computer programs which may be written in Matlab, C, C++, Labview™ or any other suitable programming language embodied in a computer readable medium on a computing platform having an operating system and the associated hardware and software that is necessary to implement the radar system 10. Such computer programs comprise computer instructions that are adapted to perform the steps performed by the classifier 24. The computer programs may comprise modules or classes, as is known to those skilled in object oriented programming, that are implemented and structured according to the structure of the classifier 24 and other components of the radar system 10.

It should be noted that it is optional to include the classification of previous track segments for a given radar track to classify the current radar track segment. Further, the pre-processing stage may be attached to the plot extractor or the detector and form a track segment from a number of previous detections belonging to a radar track in online operation or it may segment a given radar track into a plurality of radar track segments in off-line operation. There may also be a delay that is used so that the pre-processing stage segments a given radar track into a plurality of radar track segments. In addition, it should be noted that principal data includes velocity, range and beam information common to both the primary and secondary radar data. Also, extension data includes amplitude information.

It should be understood that various modifications can be made to the embodiments described and illustrated herein, without departing from the invention, the scope of which is defined in the appended claims.

The invention claimed is:

1. A classifier for classifying a given radar track segment obtained from a radar system, the radar system having a primary surveillance radar for providing primary radar data and a secondary surveillance radar for providing secondary radar data, wherein the classifier comprises:
   a) a pre-processing stage, the preprocessing stage forms the given radar track segment and generates principal data based on the primary radar data or a combination of secondary and primary radar data, and extension data based on the primary radar data;
   b) a feature extraction stage connected to the pre-processing stage, the feature extraction stage processes at least one of the primary and secondary radar data associated with the given radar track segment to provide a plurality of feature values;
   c) a classification stage connected to the feature extraction stage, the classification stage generates a principal classification result and an extension classification result for the given radar track segment based on at least a portion of the feature values; or the classification stage generates a combined classification result for combined principal and extension feature values; and,
   d) a combiner stage connected to the classification stage, the combiner stage combines the extension and principal classification results to provide a classification result for the given radar track segment when the classification stage provides the principal and extension classification results.

2. The classifier of claim 1, wherein one of the features calculated by the feature extraction stage includes at least one of:
   (1) calculating a variance in the second difference of the speed (jerk) of the target associated with the given radar track segment;
   (2) calculating a mean of the second difference of the speed (jerk) of the target associated with the given radar track segment;

(3) calculating a variance in the first difference of the speed (acceleration) of the target associated with the given radar track segment;
(4) calculating the total distance covered by the given radar track segment;
(5) calculating a mean of the first difference of the speed (acceleration) of the target associated with the given radar track segment;
(6) calculating the mean speed of the target associated with the given radar track segment;
(7) calculating the mean number of radar scans between successive plots used to generate the given radar track segment;
(8) calculating the mean range of the target associated with the given radar track segment;
(9) calculating a mean of the range-compensated mean amplitude of the data points in plots associated with the given radar track segment;
(10) calculating a mean of the range-compensated peak amplitude of the data points in plots associated with the given radar track segment;
(11) calculating a mean difference of the range-compensated peak and mean amplitudes of the data points in plots associated with the given radar track segment;
(12) calculating a mean of the total number of detection points in plots associated with the given radar track segment;
(13) calculating a variance in the displacement of the path of the given radar track segment from a polynomial least-squares best-fit line;
(14) calculating a variance in the first difference of the displacement of the path of the given radar track segment from a polynomial least-squares best-fit line;
(15) calculating a variance in the first difference of the slope of the given radar track segment;
(16) calculating a mean of the displacement of the path of the given radar track segment from a polynomial least-squares best-fit line;
(17) calculating a mean of the first difference of the displacement of the path of the given radar track segment from a polynomial least-squares best-fit line; or
(18) calculating a mean of the first difference of the slope of the given radar track segment.

3. A method for classifying a given radar track segment obtained from a radar system, the radar system having a primary surveillance radar for providing primary radar data and a secondary surveillance radar for providing secondary radar data, wherein the method comprises:
a) forming the given radar track segment and generating principal data based on the primary and secondary radar data, and extension data based on the primary radar data;
b) processing at least one of the primary and secondary radar data associated with the given radar track segment and a portion of a previous associated radar track segment to provide a plurality of feature values;
c) generating either a principal classification result and an extension classification result or a combined classification result for combined principal and extension feature values for the given radar track segment based on at least a portion of the feature values; and,
(d) combining the extension and principal classification results to provide a classification result for the given radar track segment when the principal and extension classification results are generated.

4. The method of claim 3, wherein step (b) includes one of:
calculating one of the features based on a variance in the displacement of the path of the given radar track segment from a polynomial least-squares best-fit line;
calculating one of the features based on a variance in the first difference of the displacement of the path of the given radar track segment from a polynomial least-squares best-fit line;
calculating one of the features based on a variance in the first difference of the slope of the given radar track segment;
calculating one of the features based on a mean of the displacement of the path of the given radar track segment from a polynomial least-squares best-fit line;
calculating one of the features based on a mean of the first difference of the displacement of the path of the given radar track segment from a polynomial least-squares best-fit line;
calculating one of the features based on a mean of the first difference of the slope of the given radar track segment;
calculating one of the features based on a variance in the second difference of the speed (jerk) of the target associated with the given radar track segment;
calculating one of the features based on a variance in the first difference of the speed (acceleration) of the target associated with the given radar track segment;
calculating one of the features based on the total distance covered by the given radar track segment;
calculating one of the features based on a mean of the second difference of the speed (jerk) of the target associated with the given radar track segment;
calculating one of the features based on a mean of the first difference of the speed (acceleration) of the target associated with the given radar track segment;
calculating one of the features based on a mean speed of the target associated with the given radar track segment;
calculating one of the features based on the mean number of radar scans between successive plots used to generate the given radar track segment;
calculating one of the features based on the mean range of the target associated with the given radar track segment;
calculating one of the features based on a mean of the range-compensated mean amplitude of the data points in plots associated with the given radar track segment;
calculating one of the features based on a mean of the range-compensated peak amplitude of the data points in plots associated with the given radar track segment;
calculating one of the features based on a mean difference of the range-compensated peak and mean amplitudes of the data points in plots associated with the given radar track segment; or
calculating one of the features based on a mean of the total number of detection points in plots associated with the given radar track segment.

5. The method of claim 3, wherein the method includes receiving a given radar track from a track generator of the radar system and step (a) includes segmenting the given radar track to provide the given radar track segment and associated radar track segments.

6. A classifier comprising:
a) a pre-processing stage adapted to receive raw track data and to segment the raw track data to provide a plurality of track segment data for a given track;
b) a feature extraction stage coupled to receive the track segment data from said pre-processing stage and to operate upon the track segment data to provide a plurality of feature values; and c) a classification stage coupled to operate upon the plurality of feature values provided by said feature extraction stage to provide a classification result.

7. The classifier of claim 6 adapted to classify a target obtained from a system having a sensor subsystem which provides primary data and optionally secondary data to the classifier.

8. A classifier comprising:
a) a pre-processing stage adapted to receive raw track data and to segment the raw track data to provide a plurality of track segment data for a given track;
b) a feature extraction stage coupled to receive the track segment data from said pre-processing stage and to operate upon the track segment data to provide a plurality of feature values; and
c) a classification stage coupled to operate upon the plurality of feature values provided by said feature extraction stage to provide a classification result wherein the classifier is adapted to classify a target obtained from a system having a sensor subsystem which provides primary data and optionally secondary data to the classifier and wherein the sensor subsystem includes a transponder subsystem for providing the optional secondary data.

9. The classifier of claim 7 wherein:
the preprocessing stage forms a track segment for the given track and generates principal data based upon the primary data or a combination of secondary and primary data, and extension data based upon the primary data;
the feature extraction stage processes at least one of the primary and secondary data associated with the given track to provide a plurality of feature values; and
the classification stage generates a principal classification result and an extension classification result for the track segment of the given track based upon at least a portion of the feature values or the classification stage generates a combined classification result based upon at least a portion of the feature values.

10. The classifier of claim 9 further comprising a combiner stage coupled to said classification stage wherein the combiner stage combines the extension and principal classification results to provide a classification result for the track segment when the classification stage provides the principal and extension classification results.

11. The classifier of claim 10 wherein the sensor subsystem comprises a radar system having a primary surveillance radar and a secondary surveillance radar and wherein the primary data corresponds to primary radar data provided by the primary surveillance radar and the secondary data corresponds to secondary radar data provided by the secondary surveillance radar and each track segment corresponds to a radar track segment.

12. The classifier of claim 11, wherein the combiner stage further combines the combined classification result or the extension and principal classification results with the classification result of at least one previous radar track segment associated with the given radar track segment to provide a classification result for the given radar track segment.

13. The classifier of claim 12, wherein the classification stage includes:
a) a principal feature classifier path coupled to the feature extraction stage, the principal feature classifier path generates the principal classification result; and,
b) an extension feature classifier path coupled to the feature extraction stage, the extension feature classifier path generates the extension classification result.

14. The classifier of claim 13, wherein the extension feature classifier path includes:

a) an extension feature processing stage coupled to the feature extraction stage, the extension feature processing stage receives the plurality of feature values based upon the extension data for the given radar track segment to generate an extension feature vector wherein each entry in the extension feature vector is calculated from either the given radar track segment or the given radar track segment and associated radar track segments, and post-processes the extension feature vector to determine characteristics that should be provided to a classifier; and,
b) an extension feature classifier stage coupled to the extension feature processing stage, the extension feature classifier stage classifies the post-processed extension feature vector to provide the extension classification result.

15. The classifier of claim 13, wherein the principal feature classifier path includes:
a) a principal feature processing stage coupled to the feature extraction stage, the principal feature processing stage receives the plurality of feature values based upon the principal data for the given radar track segment to generate a principal feature vector wherein each entry in the principal feature vector is calculated from either the given radar track segment or the given radar track segment and associated radar track segments, and post-processes the principal feature vector; and,
b) a principal feature classifier stage coupled to the principal feature processing stage, the principal feature classifier stage classifies post-processed principal feature vector to provide the principal classification result.

16. The classifier of claim 13, wherein at least one of the extension feature classifier path and the principal feature classifier path employ a machine learning technique for performing classification.

17. The classifier of claim 16, wherein the machine learning technique for performing classification includes at least one of: (a) a linear Support Vector machine; and (b) a non-linear Support Vector machine.

18. The classifier of claim 11, wherein the pre-processing stage is coupled to the combiner stage for providing an indication of whether secondary radar data is associated with the given radar track segment, wherein the indication is used to forego the feature extraction and classification stages and classify the given track segment as being indicative of an aircraft.

19. The classifier of claim 6, wherein the pre-processing stage generates the track segment data for the given track segment to overlap at least one previously related track segment.

20. The classifier of claim 15, wherein at least one of the feature processing stages generates one of the feature vectors based upon at least one of:
(a) the track segment for the given track and overlapping associated radar track segments; and
(b) a portion of the feature values for the track segment for the given radar track.

21. The classifier of claim 11, wherein the classifier is coupled to a track generator of the radar system to receive a given radar track and the pre-processing stage segments the given radar track to provide the given radar track segment and associated radar track segments.

22. The classifier of claim 11, wherein:
the classifier is coupled to a plot extractor of the radar system to receive a plurality of detections from a series of plots, the plurality of detections being associated with a given target; and the pre-processing stage forms the given radar track segment and associated radar track segments from the plurality of detections.

23. The classifier of claim 7, wherein at least one of the primary radar data and the secondary radar data are used for training and testing at least one of: (1) the feature extraction stage; (2) the classification stage; and (3) the combiner stage.

24. A method for classifying a given observation obtained from a sensor system, the sensor system having a sensor subsystem for providing primary data and optionally a transponder system for providing secondary data, wherein the method comprises:
 a) receiving raw track data;
 b) segmenting the raw track data to provide a plurality of track segment data for a given track;
 c) operating on the track segment data to provide a plurality of feature values; and
 d) operating on the plurality of feature values to provide a classification result for the given track segment.

25. A method for classifying a given observation obtained from a sensor subsystem, the sensor system having a sensor subsystem for providing primary data and optionally a transponder system for providing secondary data, wherein the method comprises:
 a) receiving new track data;
 b) segmenting the raw track data to provide a plurality of tract segment data for a given track;
 c) operating on the track segment data to provide a plurality of feature values; and
 d) operating on the plurality of feature values to provide a classification result for the given track segment wherein segmenting the raw track data to provide a plurality of track segment data for a given track includes:
  (1) generating principal data based upon the primary and secondary data; and
  (2) generating extension data based upon the primary data.

26. The method of claim 25 wherein operating on the plurality of feature values to provide a classification result for the given track segment includes:
 generating a principal classification result;
 generating an extension classification result;
 combining the extension classification result and the principal classification result to provide a classification result for the given track when the principal and extension classification results are generated and the method further comprises:
 combining one of the combined classification result or the extension and principal classification results with the classification result of at least one previous track segment associated with the given track segment to provide a classification result for the given track segment.

27. The method of claim 26, wherein (d) includes:
 1) receiving a plurality of feature values based upon the extension data for the given track segment;
 2) generating an extension feature vector using at least a plurality of feature values based upon the extension data wherein each entry in the extension feature vector is calculated from either the given track segment or the given track segment and associated track segments;
 3) post-processing the extension feature vector to determine characteristics that should be provided to a classifier; and
 4) classifying the post-processed extension feature vector to provide the extension classification result.

28. The method of claim 27 wherein step (d) further includes:
 5) receiving a plurality of feature values based upon the principal data for the given track segment;
 6) generating a principal feature vector using at least the plurality of feature values based upon the extension data wherein each entry in the principal feature vector is calculated from either the given track segment or the given track segment and associated track segments; 7) post-processing the principal feature vector to determine characteristics that should be provided to a classifier; and
 8) classifying the post-processed principal feature vector to provide the principal classification result.

29. The method of claim 28, wherein the sensor system is a radar system having a primary surveillance radar and a secondary surveillance radar and wherein the primary data corresponds to primary radar data and the secondary radar corresponds to secondary radar data and wherein (a) includes providing an indication of whether secondary radar data is associated with the given radar track segment, wherein the indication is used to forego processing and classification performed by (b)-(c) and classifying the given radar track segment as being indicative of an aircraft in (d).

30. The method of claim 29, wherein (b) includes forming the given track segment such that the given track segment overlaps at least one previous related track segment.

31. The method of claim 30, wherein at least one of (d)(2) and (d)(6) include at least one of:
 a) generating the feature vector based upon the given track segment and overlapping associated radar track signals; and
 b) generating the feature vector based upon repeating a portion of the feature values for the given radar track segment.

32. The method of claim 24, wherein the method includes assessing the features according to:
 a) calculating a plurality of feature values for several of the features based upon a plurality of training radar track segments;
 b) partitioning the plurality of feature values calculated for at least one feature into a plurality of classes;
 c) randomly picking classified points for each class and calculating the number of mis-classified radar track segments; and,
 d) computing a performance index based upon the number of mis-classified radar track segments for assessing either one of the features or a combination of the features.

* * * * *

UNITED STATES PATENT AND TRADEMARK OFFICE
CERTIFICATE OF CORRECTION

PATENT NO. : 7,567,203 B2
APPLICATION NO. : 11/401097
DATED : July 28, 2009
INVENTOR(S) : Reza M. Dizaji et al.

It is certified that error appears in the above-identified patent and that said Letters Patent is hereby corrected as shown below:

Column 1, line 20 delete "System (DASR) system" and replace with --Radar (DASR) system--.

Column 1, line 55 delete "aircrafts" and replace with --aircraft--.

Column 1, line 59 delete "aircrafts." and replace with --aircraft.--.

Column 1, line 60 delete "safety by" and replace with --safety is by--.

Column 1, line 63 delete "aircrafts" and replace with --aircraft--.

Column 2, line 34 delete "aircrafts" and replace with --aircraft--.

Column 2, line 37 delete "aircrafts" and replace with --aircraft--.

Column 2, line 52 delete "aircrafts," and replace with --aircraft,--.

Column 2, line 57 delete "aircrafts." and replace with --aircraft.--.

Column 2, line 66 delete "aircrafts and non-aircrafts" and replace with --aircraft and non-aircraft--.

Column 4, line 2 delete "preformed" and replace with --performed--.

Column 4, line 5 delete "preformed" and replace with --performed--.

Column 4, line 6 delete "stages" and replace with --stage--.

Column 5, line 20 delete "avg_mg" and replace with --avg_rng--.

Column 5, line 49 delete "avg_mg" and replace with --avg_rng--.

Column 7, line 47 delete "aircrafts," and replace with --aircraft,--.

Column 8, line 47 delete "aircrafts" and replace with --aircraft--.

Column 9, line 27 delete "preformed" and replace with --performed--.

Column 9, line 60 delete "preformed" and replace with --performed--.

UNITED STATES PATENT AND TRADEMARK OFFICE
CERTIFICATE OF CORRECTION

PATENT NO. : 7,567,203 B2
APPLICATION NO. : 11/401097
DATED : July 28, 2009
INVENTOR(S) : Reza M. Dizaji et al.

It is certified that error appears in the above-identified patent and that said Letters Patent is hereby corrected as shown below:

Column 10, line 16 delete "aircrafts." and replace with --aircraft.--.

Column 10, line 59 delete "exhibits" and replace with --exhibit--.

Column 11, line 24 delete "aircrafts" and replace with --aircraft--.

Column 22, line 35 delete "where,"

Column 27, lines 45-46 delete "to a select number" and replace with --to select a number--.

Column 28, line 37 delete "aircrafts," and replace with --aircraft,--.

Column 28, line 40 delete "aircrafts." and replace with --aircraft.--.

Column 31, line 33 delete "dataset" and replace with --datasets--.

Column 39, line 21 delete "subsystem," and replace with --system,--.

Signed and Sealed this

Twenty-fourth Day of November, 2009

David J. Kappos
*Director of the United States Patent and Trademark Office*